United States Patent
Yu et al.

(10) Patent No.: US 12,531,425 B2
(45) Date of Patent: Jan. 20, 2026

(54) CIRCUIT, POWER SUPPLY METHOD, ELECTRONIC DEVICE, AND COMPUTER PROGRAM PRODUCT

(71) Applicant: Huawei Technologies Co., Ltd., Shenzhen (CN)

(72) Inventors: Wenchao Yu, Shanghai (CN); Ronglong Tan, Shanghai (CN); Jianbo Ye, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/907,898

(22) Filed: Oct. 7, 2024

(65) Prior Publication Data

US 2025/0030266 A1     Jan. 23, 2025

Related U.S. Application Data

(63) Continuation of application No. PCT/CN2023/084733, filed on Mar. 29, 2023.

(30) Foreign Application Priority Data

Apr. 6, 2022    (CN) .......................... 202210353890.9

(51) Int. Cl.
    *H02J 7/34*        (2006.01)
    *H01M 10/42*     (2006.01)
    (Continued)

(52) U.S. Cl.
    CPC ............. *H02J 7/34* (2013.01); *H01M 10/425* (2013.01); *H02J 1/084* (2020.01); *H02J 7/0068* (2013.01);
(Continued)

(58) Field of Classification Search
    CPC ............ H02J 7/34; H02J 1/084; H02J 7/0068; H02J 2207/20; H02J 1/086; H02J 7/0063;
(Continued)

(56) References Cited

U.S. PATENT DOCUMENTS 9,825,478 B2 * 11/2017   Odaohhara ....... H02J 7/007182
2006/0119322 A1 * 6/2006   Maleki ................ H01M 10/486
                                                         320/150
(Continued)

FOREIGN PATENT DOCUMENTS

CA          3166343 A1     7/2021
CN        101350530 A     1/2009
(Continued)

*Primary Examiner* — Lincoln D Donovan
*Assistant Examiner* — Alex W Lam
(74) *Attorney, Agent, or Firm* — Conley Rose, P.C.

(57) ABSTRACT

An electronic device includes at least a battery, a working circuit, and a boost circuit. When the battery supplies power to the working circuit, the boost circuit supplies power to the working circuit in response to that the electronic device meets a low-temperature or low-voltage condition. In a power supply path switching process, the boost circuit first supplies power to the working circuit through a diode, and then disconnects a path for supplying power to the working circuit by the battery. Before the path for supplying power to the working circuit by the battery is disconnected, a voltage for supplying power to the working circuit by the boost circuit through the diode is controlled not to be higher than a voltage for supplying power to the working circuit by the battery.

20 Claims, 60 Drawing Sheets

(51) Int. Cl.
  *H02J 1/08*    (2006.01)
  *H02J 7/00*    (2006.01)
(52) U.S. Cl.
  CPC .............. *H01M 2010/4271* (2013.01); *H02J 2207/20* (2020.01)
(58) Field of Classification Search
  CPC .............. H02J 7/007194; H02J 7/0047; H02J 7/00712; H02J 7/007182; H02J 7/007192; H01M 10/425; H01M 2010/4271; H02M 3/156; H02M 1/32; H02M 1/088; H02M 3/04; Y02E 60/10
  See application file for complete search history.

(56) References Cited

U.S. PATENT DOCUMENTS

| | | | | |
|---|---|---|---|---|
| 2013/0264873 | A1* | 10/2013 | Katou | H02J 5/00 307/31 |
| 2022/0289057 | A1* | 9/2022 | Tsuchiya | B60L 53/20 |

FOREIGN PATENT DOCUMENTS

| | | |
|---|---|---|
| CN | 201349211 Y | 11/2009 |
| CN | 105337374 A | 2/2016 |
| CN | 109716613 A | 5/2019 |
| CN | 111490567 A | 8/2020 |
| CN | 115001065 A | 9/2022 |

* cited by examiner

CIRCUIT, POWER SUPPLY METHOD, ELECTRONIC DEVICE, AND COMPUTER PROGRAM PRODUCT

CROSS-REFERENCE TO RELATED APPLICATIONS

This is a continuation of International Patent Application No. PCT/CN2023/084733 filed Mar. 29, 2023, which claims priority to Chinese Patent Application No. 202210353890.9 filed Apr. 6, 2022. The disclosures of the aforementioned applications are hereby incorporated by reference in their entireties.

TECHNICAL FIELD

This disclosure relates to the field of electronic technologies, and in particular, to a circuit, a power supply method, an electronic device, and a computer program product.

BACKGROUND

Currently, in a low-temperature scenario, an internal resistance of a battery increases exponentially. As a result, an output voltage of the battery drops sharply, and an electronic device cannot work normally. Further, the electronic device works abnormally or even is powered off. This greatly reduces user experience. In addition, in a scenario in which the output voltage of the battery is low but there is still available power, because the voltage of the battery is lower than a preset working voltage threshold of the electronic device, the electronic device may also work abnormally. Consequently, the power of the battery cannot be fully used by the electronic device.

SUMMARY

This disclosure provides a circuit, a power supply method, an electronic device, and a computer program product. When a battery is in a low-temperature or low-voltage state and cannot normally supply power to the electronic device, a boost circuit supplies power to a working circuit, to improve a battery life of the electronic device in the low-temperature or low-voltage state.

According to a first aspect, this disclosure provides a circuit, used in an electronic device including a battery and a first working circuit. The circuit may include a processing circuit, a battery 110, a first working circuit, a first power supply path 160 electrically connected in series between the battery and the first working circuit, a second power supply path 1611 electrically connected in series between the battery and the first working circuit, and a third power supply path 1612 electrically connected in series between the battery and the first working circuit. The first power supply path 160 may include a first switch 120, the first power supply path 160 may provide a voltage of the battery for the first working circuit through the first switch 120, the first switch 120 may include a first control end, and the first control end may be configured to receive a control signal of the processing circuit. The second power supply path 1611 may include a first boost circuit 131, and the first boost circuit 131 may perform boost conversion based on the voltage of the battery. The second power supply path 1611 may further include a first unidirectional conductive switch 1301, the first boost circuit 131 is electrically connected in series between the battery 110 and the first unidirectional conductive switch 1301, the first unidirectional conductive switch 1301 is electrically connected in series between the first boost circuit 131 and the first working circuit, and a conduction direction of the first unidirectional conductive switch 1301 is a direction from the first boost circuit 131 to the first working circuit. The third power supply path 1612 may include the first boost circuit 131 and a second switch 1304, the second switch 1304 is electrically connected in parallel to the first unidirectional conductive switch 1301, the third power supply path 1612 may provide, for the first working circuit through the second switch 1304, a voltage obtained by performing boost conversion by the first boost circuit 131, the second switch 1304 may include a second control end, and the second control end may be configured to receive a control signal of the processing circuit. When the second power supply path 1611 and the third power supply path 1612 are in a disconnected state, and power is supplied to the first working circuit through the first power supply path 160, if the processing circuit detects that the electronic device 100 meets a first preset condition, the processing circuit controls the second power supply path 1611 to be connected, and the second power supply path 1611 provides, for the first working circuit through the first unidirectional conductive switch 1301, the voltage obtained by performing boost conversion by the first boost circuit 131; when the second power supply path 1611 is connected, the processing circuit controls the first switch 120 to be turned off, so that the first power supply path 160 is disconnected; and when the first switch 120 is turned off, the processing circuit controls the second switch 1304 to be turned on, so that the third power supply path 1612 is connected, and the third power supply path 1612 may provide, for the first working circuit through the second switch 1304, the voltage obtained by performing boost conversion by the first boost circuit 131. In this case, the first unidirectional conductive switch 1301 is turned off, so that the second power supply path 1611 is disconnected.

Before the first power supply path 160 is disconnected, the second power supply path 1611 has been connected. In this way, when power is stopped from being supplied to the first working circuit through the first power supply path 160, power may be supplied to the first working circuit through the second power supply path 1611, so that the first working circuit is not powered off because the first power supply path 160 is disconnected. When the voltage provided by the second power supply path 1611 for the first working circuit is lower than the voltage provided by the first power supply path 160 for the first working circuit, because the first unidirectional conductive switch 1301 has unidirectional conductivity, the first unidirectional conductive switch 1301 is turned off. This can prevent an output current of the battery 110 from being excessively large, and further prevent the excessively large output current of the battery 110 from exceeding an overcurrent threshold of the battery 110. This avoids a case in which the battery 110 stops working, and then the first working circuit is powered off. After the second power supply path 1611 is connected, the third power supply path 1612 is further connected. In this case, the first unidirectional conductive switch 1301 is turned off, and the second power supply path 1611 is disconnected. This can reduce power consumption of the first unidirectional conductive switch 1301, and prolong power supply duration of the battery 110.

With reference to the first aspect, in this embodiment of this disclosure, when the second power supply path 1611 and the third power supply path 1612 are in the disconnected state, and power is supplied to the first working circuit through the first power supply path 160, if the processing circuit detects that the electronic device 100 meets the first preset condition, the processing circuit controls the second power supply path 1611 to be connected, and the second power supply path 1611 provides, for the first working circuit through the first unidirectional conductive switch 1301, the voltage obtained by performing boost conversion by the first boost circuit 131, where the voltage provided by the second power supply path 1611 for the first working circuit is not higher than the voltage provided by the first power supply path 160 for the first working circuit.

Because the voltage provided by the second power supply path 1611 for the first working circuit is not higher than the voltage provided by the first power supply path 160 for the first working circuit, when the voltage provided by the second power supply path 1611 for the first working circuit is higher than the voltage provided by the first power supply path 160 for the first working circuit, an output current of the second power supply path 1611 is not excessively large, and further, an output current of the first boost circuit 131 is not excessively large and does not exceed an overcurrent threshold of the first boost circuit 131. This avoids a case in which the first boost circuit 131 stops working, and then the first working circuit cannot work normally because a voltage obtained by the first working circuit from the first power supply path 160 is excessively low.

With reference to the first aspect, in this embodiment of this disclosure, when the second power supply path 1611 is connected, the voltage obtained by performing boost conversion by the first boost circuit 131 is a first voltage. When the first unidirectional conductive switch 1301 is turned off, the second power supply path 1611 is disconnected. In this case, the voltage obtained by performing boost conversion by the first boost circuit 131 may be adjusted to a second voltage, and the first boost circuit 131 supplies power to the first working circuit through the second switch 1304, where the second voltage is lower than the first voltage. After the first unidirectional conductive switch 1301 is turned off, an output voltage of the first boost circuit 131 is reduced, so that a voltage difference between an input voltage and an output voltage of the first boost circuit 131 can be reduced, conversion efficiency of the first boost circuit 131 can be improved, and power supply duration of the battery 110 can be prolonged.

With reference to the first aspect, in this embodiment of this disclosure, the first switch 120 may include a triode or a metal-oxide-semiconductor field-effect transistor (MOSFET), and the second switch 1304 may include a triode or a MOSFET.

With reference to the first aspect, in this embodiment of this disclosure, the first unidirectional conductive switch 1301 may include a diode.

In some embodiments, the first unidirectional conductive switch 1301 may be a part of the second switch 1304, so that an area of a circuit board occupied by the first unidirectional conductive switch 1301 can be reduced, and more electronic components can be placed on the circuit board.

In some embodiments, the first switch 120 may be a PMOS transistor, does not need to be driven by an additional power supply, and has a small impedance after being turned on, so that power consumption of the switch can be reduced.

With reference to the first aspect, in this embodiment of this disclosure, the circuit may further include a first temperature sensor 111, a second temperature sensor 151, a power detection circuit, and a voltage detection circuit. The first temperature sensor 111 may be disposed in the battery 110. The first temperature sensor 111 and the second temperature sensor 151 each may be configured to detect a temperature, the power detection circuit may be configured to detect power of the battery 110, and the voltage detection circuit may be configured to detect a voltage of the battery 110. The first preset condition includes at least one of the following: the temperature detected by the first temperature sensor 111 is not higher than a first preset temperature threshold, the power of the battery 110 detected by the power detection circuit is not higher than a first preset battery capacity threshold, the voltage of the battery 110 detected by the voltage detection circuit is not higher than a first preset voltage threshold, or the temperature detected by the second temperature sensor 115 is not higher than a second preset temperature threshold.

When the electronic device 100 meets the first preset condition, the battery 110 is in a low-voltage state, and the battery 110 cannot provide, for the first working circuit, a voltage required by the first working circuit. In this case, the first boost circuit 131 performs boost conversion on the voltage of the battery 110, and then the first boost circuit 131 may provide a boosted voltage for the first working circuit after boosting the voltage of the battery 110, so that the first working circuit can work normally.

In some embodiments, the battery 110 may be a silicon negative electrode lithium-ion battery. Compared with another graphite negative electrode lithium-ion battery, the silicon negative electrode lithium-ion battery can improve energy density of the battery. In addition, because a voltage of the silicon negative electrode lithium-ion battery is lower than that of the graphite negative electrode lithium-ion battery in terms of same power, use of the silicon negative electrode lithium-ion battery can make it easier for the electronic device 100 to meet the first preset condition, so that the first boost circuit 131 provides the boosted voltage for the first working circuit after boosting the voltage of the battery 110. Because the boosted voltage can reach a working voltage required by the first working circuit, the first working circuit can work normally, and a battery life of the silicon negative electrode lithium-ion battery is improved.

With reference to the first aspect, in this embodiment of this disclosure, when power is supplied to the first working circuit through the third power supply path 1612 and the second switch 1304, if the processing circuit detects that the electronic device 100 meets a second preset condition, the processing circuit controls the second power supply path 1611 to be connected, the third power supply path 1612 is disconnected, and the second power supply path 1611 may provide, for the first working circuit through the first unidirectional conductive switch 1301, the voltage obtained by performing boost conversion by the first boost circuit 131. When the second power supply path 1611 is connected, the processing circuit may further control the first switch 120 to be turned on, so that the first power supply path 160 is connected, and power may be supplied to the first working circuit through the first power supply path 160 and the first switch 120. When the first switch 120 is turned on, the processing circuit controls the second power supply path 1611 to be disconnected.

Before the second power supply path 1611 is disconnected, the first power supply path 160 has been connected. In this way, when power is stopped from being supplied to the first working circuit through the second power supply path 1611, power may be supplied to the first working circuit through the first power supply path 160, so that the first working circuit is not powered off because the second power supply path 1611 is disconnected. In addition, after the first power supply path 160 is connected, the second power supply path 1611 is disconnected, so that the first unidirectional conductive switch 1301 is turned off. Therefore, power consumption of the first unidirectional conductive switch 1301 can be reduced, a power loss caused when the first boost circuit 131 performs boost conversion on the voltage of the battery 110 can be further reduced, and power supply duration of the battery 110 can be prolonged.

In some embodiments, the second preset condition may include at least one of the following: a temperature detected by a first temperature sensor 111 is higher than a third preset temperature threshold, power of the battery 110 detected by a power detection circuit is higher than a second preset battery capacity threshold, a voltage of the battery 110 detected by a voltage detection circuit is higher than a second preset voltage threshold, or a temperature detected by a second temperature sensor 115 is higher than a fourth preset temperature threshold.

When the processing circuit detects that the electronic device 100 meets the second preset condition, the battery 110 is not in a low-voltage state, the battery 110 may provide, for the first working circuit, a voltage required by the first working circuit. In this case, the second power supply path 1611 is disconnected after the first power supply path 160 is connected, so that the first unidirectional conductive switch 1301 is turned off. In this way, power consumption of the first unidirectional conductive switch 1301 can be reduced, and a power loss caused when the first boost circuit performs boost conversion on the voltage of the battery 110 can be reduced, and power supply duration of the battery 110 can be prolonged.

In some embodiments, the first preset temperature threshold is different from the third preset temperature threshold, the first preset battery capacity threshold is different from the second preset battery capacity threshold, the first preset voltage threshold is different from the second preset voltage threshold, and the second preset temperature threshold is different from the fourth preset temperature threshold.

With reference to the first aspect, in this embodiment of this disclosure, the circuit may further include an external power supply interface, and the first switch 120 may be electrically connected in series between the battery 110 and the external power supply interface. The external power supply interface may be configured to be electrically connected to an external power supply device. When the external power supply device is electrically connected to the external power supply interface, the processing circuit may control the external power supply device to provide a charging current for the battery 110 through the first switch 120.

When the electronic device 100 meets the first preset condition, the battery 110 is in the low-voltage state, and the battery 110 cannot provide, for the first working circuit, the voltage required by the first working circuit. In this case, the external power supply device charges the battery 110, so that the voltage of the battery 110 can be changed to be in a normal state. In addition, the external power supply device can provide, for the first working circuit, the voltage required by the first working circuit, so that the first working circuit can work normally.

With reference to the first aspect, in this embodiment of this disclosure, the circuit may further include an external power supply interface. When the third power supply path 1612 provides, for the first working circuit through the second switch 1304, the voltage obtained by performing boost conversion by the first boost circuit 131, and the processing circuit detects that an external power supply device is electrically connected to the external power supply interface, the processing circuit may control the second power supply path 1611 to be connected, and the second power supply path 1611 may provide, for the first working circuit through the first unidirectional conductive switch 1301, the voltage obtained by performing boost conversion by the first boost circuit 131; and when the second power supply path 1611 is connected, the third power supply path 1612 is disconnected, and the processing circuit may further control the external power supply device to supply power to the first working circuit through the external power supply interface, where a voltage provided by the external power supply device for the first working circuit is not lower than the voltage provided by the second power supply path 1611 for the first working circuit.

Because the voltage provided by the external power supply device for the first working circuit is not lower than the voltage provided by the second power supply path 1611 for the first working circuit, when the voltage provided by the external power supply device for the first working circuit is lower than the voltage provided by the second power supply path 1611 for the first working circuit, an output current of the second power supply path 1611 is not excessively large, and further an output current of the first boost circuit 131 is not excessively large and does not exceed an overcurrent threshold of the first boost circuit 131, so that the first boost circuit 131 does not stop working. However, when the voltage provided by the external power supply device for the first working circuit is higher than the voltage provided by the first power supply path 160 for the first working circuit, because the first unidirectional conductive switch 1301 has unidirectional conductivity, the first unidirectional conductive switch 1301 is turned off. This can prevent an output current of the external power supply device from being excessively large, and further prevent the excessively large output current of the external power supply device from exceeding an overcurrent threshold of the external power supply device. This avoids a case in which the external power supply device stops working, resulting in reduced working duration of the first working circuit when the first working circuit obtains power only through the first boost circuit 131. However, when the electronic device 100 meets the first preset condition, the battery 110 is in the low-voltage state, and the battery 110 cannot provide, for the first working circuit, the voltage required by the first working circuit. In this case, the external power supply device charges the battery 110, and then the voltage required by the first working circuit can be provided for the first working circuit, so that the first working circuit can work normally.

In some embodiments, when power is supplied to the first working circuit through the second power supply path 1611 and the external power supply device, the second power supply path 1611 is disconnected.

With reference to the first aspect, in this embodiment of this disclosure, the circuit may further include an external power supply interface. When the third power supply path 1612 provides, for the first working circuit through the second switch 1304, the voltage obtained by performing boost conversion by the first boost circuit 131, and the processing circuit detects that an external power supply device is electrically connected to the external power supply interface, the processing circuit may control the second power supply path 1611 to be connected, and the second power supply path 1611 may provide, for the first working circuit through the first unidirectional conductive switch 1301, the voltage obtained by performing boost conversion by the first boost circuit 131; and when the second power supply path 1611 is connected, the third power supply path 1612 is disconnected, the processing circuit may control the first switch 120 to be turned on, and power is supplied to the first working circuit through the first power supply path 160 and the first switch 120, where the voltage provided by the first power supply path 160 for the first working circuit through the first switch 120 is not lower than the voltage provided by the second power supply path 1611 for the first working circuit. The first switch 120 may further be electrically connected in series between the battery 110 and the external power supply interface. When the first switch 120 is turned on, the processing circuit may control the external power supply device to separately provide a power supply current and a charging current for the first working circuit and the battery 110 through the external power supply interface, where a voltage provided by the external power supply device for the first working circuit is not lower than the voltage provided by the second power supply path 1611 for the first working circuit.

Because the voltage provided by the external power supply device for the first working circuit is not lower than the voltage provided by the second power supply path 1611 for the first working circuit, when the voltage provided by the external power supply device for the first working circuit is lower than the voltage provided by the second power supply path 1611 for the first working circuit, an output current of the second power supply path 1611 is not excessively large, and further an output current of the first boost circuit 131 is not excessively large and does not exceed an overcurrent threshold of the first boost circuit 131, so that the first boost circuit 131 does not stop working. However, when the voltage provided by the external power supply device for the first working circuit is higher than the voltage provided by the first power supply path 160 for the first working circuit, because the first unidirectional conductive switch 1301 has unidirectional conductivity, the first unidirectional conductive switch 1301 is turned off. This can prevent an output current of the external power supply device from being excessively large, and further prevent the excessively large output current of the external power supply device from exceeding an overcurrent threshold of the external power supply device. This avoids a case in which the external power supply device stops working, resulting in reduced working duration of the first working circuit when the first working circuit obtains power only through the first boost circuit 131. However, when the electronic device 100 meets the first preset condition, the battery 110 is in the low-voltage state, and the battery 110 cannot provide, for the first working circuit, the voltage required by the first working circuit. In this case, the external power supply device charges the battery 110, and then the voltage required by the first working circuit can be provided for the first working circuit, so that the first working circuit can work normally.

In some embodiments, when power is supplied to the first working circuit through the second power supply path 1611 and the external power supply device, the second power supply path 1611 is disconnected.

With reference to the first aspect, in this embodiment of this disclosure, the circuit may further include a second working circuit, and the voltage obtained by performing boost conversion by the first boost circuit 131 may further supply power to the second working circuit.

Because the voltage obtained by performing boost conversion by the first boost circuit 131 may further directly supply power to the second working circuit, the voltage obtained by performing boost conversion by the first boost circuit 131 does not need to be converted by another electronic component to supply power to the second working circuit. This avoids a power loss caused when the other electronic component performs voltage conversion, improves use efficiency of the first boost circuit, avoids adding an additional boost circuit, and reduces an occupied area of a circuit board.

In some embodiments, the circuit may further include a third switch 1303 and a second unidirectional conductive switch 1302. The second unidirectional conductive switch 1302 is electrically connected in series between the first working circuit and the first unidirectional conductive switch 1301, the third switch 1303 is electrically connected in parallel to the second unidirectional conductive switch 1302, and a conduction direction of the second unidirectional conductive switch 1302 is a direction from the first working circuit to the first unidirectional conductive switch 1301. The second switch 1304 is electrically connected in parallel to the first unidirectional conductive switch 1301. The second power supply path 1611 may further include the third switch 1303, and the third switch 1303 is electrically connected in series between the first unidirectional conductive switch 1301 and the first working circuit. The third power supply path 1612 may further include the third switch 1303, and the third switch 1303 is electrically connected in series to the third power supply path 1612. When power is supplied to the first working circuit through the first power supply path 160, the third switch 1303 may be in a turn-off state, the first boost circuit 131 may be in a working state, and the voltage obtained by performing boost conversion by the first boost circuit 131 may supply power to the second working circuit.

When the voltage obtained by performing boost conversion by the first boost circuit 131 directly supplies power to the second working circuit, if the voltage provided by the first boost circuit 131 for the second working circuit is higher than the voltage provided by the first power supply path 160 for the first working circuit, because the second unidirectional conductive switch 1302 has unidirectional conductivity, the second unidirectional conductive switch 1302 is turned off. This can prevent an output current of the first boost circuit 131 from being excessively large and exceeding an overcurrent threshold of the first boost circuit 131, and prevent the second working circuit from being powered off caused by a fact that the first boost circuit 131 stops working; or if the voltage provided by the first boost circuit 131 for the second working circuit is lower than the voltage provided by the first power supply path 160 for the first working circuit, because the first unidirectional conductive switch 1301 has unidirectional conductivity, the first unidirectional conductive switch 1301 is turned off. This can prevent an output current of the battery 110 from being excessively large, and further prevent the excessively large output current of the battery 110 from exceeding an overcurrent threshold of the battery 110. This avoids a case in which the battery 110 stops working, and then the first working circuit and the second working circuit is powered off.

In some embodiments, the third switch 1303 may include a triode or a MOSFET.

With reference to the first aspect, in this embodiment of this disclosure, the circuit further includes an output component, where the output component may output prompt information, and the prompt information may indicate that the electronic device 100 meets the first preset condition.

In some embodiments, the second unidirectional conductive switch 1302 may be a part of the third switch 1303, so that an area of a circuit board occupied by the second unidirectional conductive switch 1302 can be reduced, and more electronic components can be placed on the circuit board.

In some embodiments, the circuit may further include a fourth power supply path 165, where the fourth power supply path 165 includes a second boost circuit 132, a third switch 1303, and a third unidirectional conductive switch. A circuit input end of the second boost circuit 132 is electrically connected to the battery 110, and the third unidirectional conductive switch is electrically connected in series between a circuit output end of the second boost circuit 132 and the third switch 1303. A voltage provided by the fourth power supply path 165 for the first working circuit is not higher than the voltage provided by the second power supply path 1611 for the first working circuit. Because the circuit may boost the voltage of the battery 110 simultaneously through both boost circuits to supply power to the first working circuit, a larger input current can be provided for the first working circuit, so that a higher system load can be supported.

In some embodiments, the second power supply path 1611 may further include a first resistor R1, where the first resistor R1 is electrically connected in series between the first boost circuit 131 and the first unidirectional conductive switch 1301. The fourth power supply path 165 may further include a second resistor R2, where the second resistor R2 is electrically connected in series between the second boost circuit 132 and the third unidirectional conductive switch. When the voltage provided by the fourth power supply path 165 for the first working circuit is not equal to the voltage provided by the second power supply path 1611 for the first working circuit, the first resistor R1 and the second resistor R2 may be used, so that a current provided by the second power supply path 1611 for the first working circuit is equal to a current provided by the fourth power supply path 165 for the first working circuit. This avoids a case in which the current provided by either of the second power supply path 1611 or the fourth power supply path 165 for the first working circuit is excessively large, resulting in an excessively large output current of a boost circuit on a path, enabling of overcurrent protection, and abnormal working.

According to a second aspect, this disclosure provides a power supply method, where the method is applied to an electronic device 100. The electronic device 100 includes a battery 110, a first working circuit, and a first power supply path 160, a second power supply path 1611, and a third power supply path 1612 that are electrically connected in series between the battery and the first working circuit. The first power supply path 160 may include a first switch 120, and the first power supply circuit 160 may provide a voltage of the battery for the first working circuit through the first switch 120. The second power supply path 1611 may include a first boost circuit 131, the first boost circuit 131 may perform boost conversion based on the voltage of the battery, and power may be supplied to the first working circuit through the second power supply path 1611 based on a voltage obtained by performing boost conversion by the first boost circuit 131. The third power supply path 1612 may include the first boost circuit 131, and power may be supplied to the first working circuit through the third power supply path 1612 based on the voltage obtained by performing boost conversion by the first boost circuit 131. The second power supply path 1611 may further include a first unidirectional conductive switch 1301, the first boost circuit 131 is electrically connected in series between the battery 110 and the first unidirectional conductive switch 1301, the first unidirectional conductive switch 1301 is electrically connected in series between the first boost circuit 131 and the first working circuit, and a conduction direction of the first unidirectional conductive switch 1301 is a direction from the first boost circuit 131 to the first working circuit. The method includes: when the second power supply path 1611 and the third power supply path 1612 are in a disconnected state, and power is supplied to the first working circuit through the first power supply path 160, if the electronic device 100 meets a first preset condition, connecting the second power supply path 1611, and supplying power to the first working circuit through the first power supply path 160 and the second power supply path 1611, where a voltage provided by the second power supply path 1611 for the first working circuit is not higher than the voltage provided by the first power supply path 160 for the first working circuit; when the second power supply path 1611 is connected, disconnecting the first power supply path 160, and connecting the third power supply path 1612; and when the third power supply path 1612 is connected, disconnecting the second power supply path 1611, and supplying power to the first working circuit through the third power supply path 1612.

Before the first power supply path 160 is disconnected, the second power supply path 1611 has been connected. In this way, when power is stopped from being supplied to the first working circuit through the first power supply path 160, power may be supplied to the first working circuit through the second power supply path 1611, so that the first working circuit is not powered off because the first power supply path 160 is disconnected. When the voltage provided by the second power supply path 1611 for the first working circuit is lower than the voltage provided by the first power supply path 160 for the first working circuit, because the first unidirectional conductive switch 1301 has unidirectional conductivity, the first unidirectional conductive switch 1301 is turned off. This can prevent an output current of the battery 110 from being excessively large, and further prevent the excessively large output current of the battery 110 from exceeding an overcurrent threshold of the battery 110. This avoids a case in which the battery 110 stops working, and then the first working circuit is powered off. After the second power supply path 1611 is connected, the third power supply path 1612 is further connected. In this case, the first unidirectional conductive switch 1301 is turned off, and the second power supply path 1611 is disconnected. This can reduce power consumption of the first unidirectional conductive switch 1301, and prolong power supply duration of the battery 110.

With reference to the second aspect, in this embodiment of this disclosure, when the second power supply path 1611 and the third power supply path 1612 are in the disconnected state, and power is supplied to the first working circuit through the first power supply path 160, if the electronic device 100 meets the first preset condition, the second power supply path 1611 is connected, and power may be supplied to the first working circuit through the first power supply path 160 and the second power supply path 1611, where a voltage provided by the first boost circuit 131 for the first working circuit through the first unidirectional conductive switch 1301 is not higher than the voltage provided by the first power supply path 160 for the first working circuit.

Because the voltage provided by the second power supply path 1611 for the first working circuit is not higher than the voltage provided by the first power supply path 160 for the first working circuit, when the voltage provided by the second power supply path 1611 for the first working circuit is higher than the voltage provided by the first power supply path 160 for the first working circuit, an output current of the second power supply path 1611 is not excessively large, and further an output current of the first boost circuit 131 is not excessively large and does not exceed an overcurrent threshold of the first boost circuit 131. This avoids a case in which the first boost circuit 131 stops working, and then the first working circuit cannot work normally because a voltage obtained by the first working circuit from the first power supply path 160 is excessively low.

With reference to the second aspect, in this embodiment of this disclosure, the electronic device 100 may further include a first temperature sensor 111, a second temperature sensor 151, a power detection circuit, and a voltage detection circuit. The first temperature sensor 111 may be disposed in the battery 110. The first temperature sensor 111 and the second temperature sensor 151 each may be configured to detect a temperature, the power detection circuit may be configured to detect power of the battery 110, and the voltage detection circuit may be configured to detect a voltage of the battery 110. The first preset condition includes at least one of the following: the temperature detected by the first temperature sensor 111 is not higher than a first preset temperature threshold, the power of the battery 110 detected by the power detection circuit is not higher than a first preset battery capacity threshold, the voltage of the battery 110 detected by the voltage detection circuit is not higher than a first preset voltage threshold, or the temperature detected by the second temperature sensor 115 is not higher than a second preset temperature threshold.

When the electronic device 100 meets the first preset condition, the battery 110 is in a low-voltage state, and the battery 110 cannot provide, for the first working circuit, a voltage required by the first working circuit. In this case, the first boost circuit 131 performs boost conversion on the voltage of the battery 110, and then the first boost circuit 131 may provide a boosted voltage for the first working circuit after boosting the voltage of the battery 110, so that the first working circuit can work normally.

With reference to the second aspect, in this embodiment of this disclosure, when power is supplied to the first working circuit through the third power supply path 1612, if the electronic device 100 meets a second preset condition, the second power supply path 1611 is connected, the third power supply path 1612 is disconnected, and power may be supplied to the first working circuit through the second power supply path 1611. When the second power supply path 1611 is connected, the first power supply path 160 is connected, and power may be supplied to the first working circuit through the first power supply path 160 and the second power supply path 1611. When the first power supply path 160 is connected, the second power supply path 1611 is disconnected, and power may be supplied to the first working circuit through the first power supply path 160.

Before the second power supply path 1611 is disconnected, the first power supply path 160 has been connected. In this way, when power is stopped from being supplied to the first working circuit through the second power supply path 1611, power may be supplied to the first working circuit through the first power supply path 160, so that the first working circuit is not powered off because the second power supply path 1611 is disconnected. In addition, after the first power supply path 160 is connected, the second power supply path 1611 is disconnected, so that the first unidirectional conductive switch 1301 is turned off. Therefore, power consumption of the first unidirectional conductive switch 1301 can be reduced, a power loss caused when the first boost circuit 131 performs boost conversion on the voltage of the battery 110 can be further reduced, and power supply duration of the battery 110 can be prolonged.

In some embodiments, the first preset temperature threshold is different from the third preset temperature threshold, the first preset battery capacity threshold is different from the second preset battery capacity threshold, the first preset voltage threshold is different from the second preset voltage threshold, and the second preset temperature threshold is different from the fourth preset temperature threshold.

In some embodiments, the electronic device 100 may further include a first temperature sensor 111, a second temperature sensor 151, a power detection circuit, and a voltage detection circuit. The first temperature sensor 111 may be disposed in the battery 110. The first temperature sensor 111 and the second temperature sensor 151 each may be configured to detect a temperature, the power detection circuit may be configured to detect power of the battery 110, and the voltage detection circuit may be configured to detect a voltage of the battery 110. The second preset condition may include at least one of the following: the temperature detected by the first temperature sensor 111 is higher than a third preset temperature threshold, the power of the battery 110 detected by the power detection circuit is higher than a second preset battery capacity threshold, the voltage of the battery 110 detected by the voltage detection circuit is higher than a second preset voltage threshold, or the temperature detected by the second temperature sensor 115 is higher than a fourth preset temperature threshold.

When the electronic device 100 meets the second preset condition, the battery 110 is not in a low-voltage state, the battery 110 may provide, for the first working circuit, a voltage required by the first working circuit. In this case, the second power supply path 1611 is disconnected after the first power supply path 160 is connected, so that the first unidirectional conductive switch 1301 is turned off. In this way, power consumption of the first unidirectional conductive switch 1301 can be reduced, and a power loss caused when the first boost circuit performs boost conversion on the voltage of the battery 110 can be reduced, and power supply duration of the battery 110 can be prolonged.

In some embodiments, after the second power supply path 1611 is connected and before the first power supply path 160 is connected, an output voltage of the first boost circuit 131 is adjusted. In this way, after the first power supply path 160 is connected, the voltage provided by the second power supply path 1611 for the first working circuit is not higher than the voltage provided by the first power supply path 160 for the first working circuit.

Because the voltage provided by the second power supply path 1611 for the first working circuit is not higher than the voltage provided by the first power supply path 160 for the first working circuit, when the voltage provided by the second power supply path 1611 for the first working circuit is higher than the voltage provided by the first power supply path 160 for the first working circuit, an output current of the second power supply path 1611 is not excessively large, and further an output current of the first boost circuit 131 is not excessively large and does not exceed an overcurrent threshold of the first boost circuit 131, so that the first boost circuit 131 does not stop working. However, when the voltage provided by the second power supply path 1611 for the first working circuit is lower than the voltage provided by the first power supply path 160 for the first working circuit, because the first unidirectional conductive switch 1301 has unidirectional conductivity, the first unidirectional conductive switch 1301 is turned off. This can prevent an output current of the battery 110 from being excessively large, and further prevent the excessively large output current of the battery 110 from exceeding an overcurrent threshold of the battery 110. This avoids a case in which the battery 110 stops working, and then the first working circuit is powered off.

With reference to the second aspect, in this embodiment of this disclosure, the method further includes: when power is supplied to the first working circuit through the third power supply path 1612, and an external power supply device is electrically connected to a power supply interface of the electronic device 100, connecting the second power supply path 1611, disconnecting the third power supply path 1612, and supplying power to the first working circuit through the second power supply path 1611; and when the second power supply path 1611 is connected, further supplying power to the first working circuit through the external power supply device, where a voltage provided by the external power supply device for the first working circuit is not lower than the voltage provided by the second power supply path 1611 for the first working circuit.

Because the voltage provided by the external power supply device for the first working circuit is not lower than the voltage provided by the second power supply path 1611 for the first working circuit, when the voltage provided by the external power supply device for the first working circuit is lower than the voltage provided by the second power supply path 1611 for the first working circuit, an output current of the second power supply path 1611 is not excessively large, and further an output current of the first boost circuit 131 is not excessively large and does not exceed an overcurrent threshold of the first boost circuit 131, so that the first boost circuit 131 does not stop working. However, when the voltage provided by the external power supply device for the first working circuit is higher than the voltage provided by the first power supply path 160 for the first working circuit, because the first unidirectional conductive switch 1301 has unidirectional conductivity, the first unidirectional conductive switch 1301 is turned off. This can prevent an output current of the external power supply device from being excessively large, and further prevent the excessively large output current of the external power supply device from exceeding an overcurrent threshold of the external power supply device. This avoids a case in which the external power supply device stops working, resulting in reduced working duration of the first working circuit when the first working circuit obtains power only through the first boost circuit 131. However, when the electronic device 100 meets the first preset condition, the battery 110 is in the low-voltage state, and the battery 110 cannot provide, for the first working circuit, the voltage required by the first working circuit. In this case, the external power supply device charges the battery 110, and then the voltage required by the first working circuit can be provided for the first working circuit, so that the first working circuit can work normally.

In some embodiments, the first switch 120 may further be electrically connected in series between the battery 110 and the power supply interface of the electronic device 100. When the second power supply path 1611 is connected, the external power supply device may supply power to the first working circuit. When the first switch 120 is turned on, the external power supply device may charge the battery 110. A voltage provided by the external power supply device for the first working circuit is not lower than the voltage provided by the second power supply path 1611 for the first working circuit.

When the electronic device 100 meets the first preset condition, the battery 110 is in the low-voltage state, and the battery 110 cannot provide, for the first working circuit, the voltage required by the first working circuit. In this case, the external power supply device charges the battery 110, so that the voltage of the battery 110 can be changed to be in a normal state. In addition, the external power supply device can provide, for the first working circuit, the voltage required by the first working circuit, so that the first working circuit can work normally.

In some embodiments, when power is supplied to the first working circuit through the second power supply path 1611 and the external power supply device, the second power supply path 1611 is disconnected.

With reference to the second aspect, in this embodiment of this disclosure, when power is supplied to the first working circuit through the third power supply path 1612, and the external power supply device is electrically connected to the electronic device 100, the second power supply path 1611 may be connected, and power may be supplied to the first working circuit through the second power supply path 1611; and when the second power supply path 1611 is connected, the third power supply path 1612 is disconnected, the first power supply path 160 may be connected, and power is supplied to the first working circuit through the first power supply path 160 and the second power supply path 1611, where the voltage provided by the first power supply path 160 for the first working circuit is not lower than the voltage provided by the second power supply path 1611 for the first working circuit. The first switch 120 may further be electrically connected in series between the battery 110 and the power supply interface of the electronic device 100. When the first power supply path 160 is connected, the first switch 120 is turned on, and the external power supply device may separately provide a power supply current and a charging current for the first working circuit and the battery 110, where the voltage provided by the external power supply device for the first working circuit is not lower than the voltage provided by the second power supply path 1611 for the first working circuit.

Because the voltage provided by the external power supply device for the first working circuit is not lower than the voltage provided by the second power supply path 1611 for the first working circuit, when the voltage provided by the external power supply device for the first working circuit is lower than the voltage provided by the second power supply path 1611 for the first working circuit, an output current of the second power supply path 1611 is not excessively large, and further an output current of the first boost circuit 131 is not excessively large and does not exceed an overcurrent threshold of the first boost circuit 131, so that the first boost circuit 131 does not stop working. However, when the voltage provided by the external power supply device for the first working circuit is higher than the voltage provided by the first power supply path 160 for the first working circuit, because the first unidirectional conductive switch 1301 has unidirectional conductivity, the first unidirectional conductive switch 1301 is turned off. This can prevent an output current of the external power supply device from being excessively large, and further prevent the excessively large output current of the external power supply device from exceeding an overcurrent threshold of the external power supply device. This avoids a case in which the external power supply device stops working, resulting in reduced working duration of the first working circuit when the first working circuit obtains power only through the first boost circuit 131. However, when the electronic device 100 meets the first preset condition, the battery 110 is in the low-voltage state, and the battery 110 cannot provide, for the first working circuit, the voltage required by the first working circuit. In this case, the external power supply device charges the battery 110, and then the voltage required by the first working circuit can be provided to the first working circuit, so that the first working circuit can work normally.

In some embodiments, when power is supplied to the first working circuit through the second power supply path 1611 and the external power supply device, the second power supply path 1611 is disconnected.

With reference to the second aspect, in this embodiment of this disclosure, the electronic device 100 may further include a second working circuit, and the voltage obtained by performing boost conversion by the first boost circuit 131 may further supply power to the second working circuit.

Because the voltage obtained by performing boost conversion by the first boost circuit 131 may further directly supply power to the second working circuit, the voltage obtained by performing boost conversion by the first boost circuit 131 does not need to be converted by another electronic component to supply power to the second working circuit. This avoids a power loss caused when the other electronic component performs voltage conversion.

In some embodiments, the third power supply path 1612 may further include a second switch 1304, where the second switch 1304 is electrically connected in series to the third power supply path 1612, and the second switch 1304 is electrically connected in parallel to the first unidirectional conductive switch 1301. When the electronic device 100 meets the first preset condition, the first unidirectional conductive switch may be turned on, so that the second power supply path 1611 is connected. In this case, the second switch 1304 is turned off. When the second power supply path 1611 is connected, the electronic device 100 turns off the first switch 120, so that the first power supply path 160 is disconnected. When the electronic device 100 disconnects the first power supply path 160, the electronic device 100 turns on the second switch 1304, so that the third power supply path 1612 is connected, and the first unidirectional conductive switch 1301 is turned off. When the first unidirectional conductive switch 1301 is turned off, the second power supply path 1611 is disconnected, and power may be supplied to the first working circuit through the third power supply path 1612 and the second switch 1304.

Because the second switch 1304 is electrically connected in parallel to the first unidirectional conductive switch 1301, when power is supplied to the first working circuit through the second power supply path 1611, the third power supply path 1612 may be connected by turning on the second switch 1304, so that the first unidirectional conductive switch 1301 is turned off. This can reduce power consumption of the first unidirectional conductive switch 1301, and prolong power supply duration of the battery 110.

In some embodiments, the electronic device 100 may further include a third switch 1303 and a second unidirectional conductive switch 1302. The third switch 1303 is electrically connected in parallel to the second unidirectional conductive switch 1302. The third switch 1303 and the second switch 1304 may further be electrically connected in series to the third power supply path 1612. The third switch 1303 and the first unidirectional conductive switch 1301 may further be electrically connected in series to the second power supply path 1611. When the second power supply path 1611 and the third power supply path 1612 are in a disconnected state, and power is supplied to the first working circuit through the first power supply path 160, the first boost circuit 131 may be in a working state, the voltage obtained by performing boost conversion by the first boost circuit may supply power to the second working circuit, the second power supply path 1611 is in a disconnected state, and the second switch 1304 is in a turn-off state.

When the voltage obtained by performing boost conversion by the first boost circuit 131 directly supplies power to the second working circuit, if the voltage provided by the first boost circuit 131 for the second working circuit is higher than the voltage provided by the first power supply path 160 for the first working circuit, because the second unidirectional conductive switch 1302 has unidirectional conductivity, the second unidirectional conductive switch 1302 is turned off. This can prevent an output current of the first boost circuit 131 from being excessively large and exceeding an overcurrent threshold of the first boost circuit 131, and prevent the second working circuit from being powered off caused by a fact that the first boost circuit 131 stops working; or if the voltage provided by the first boost circuit 131 for the second working circuit is lower than the voltage provided by the first power supply path 160 for the first working circuit, because the first unidirectional conductive switch 1301 has unidirectional conductivity, the first unidirectional conductive switch 1301 is turned off. This can prevent an output current of the battery 110 from being excessively large, and further prevent the excessively large output current of the battery 110 from exceeding an overcurrent threshold of the battery 110. This avoids a case in which the battery 110 stops working, and then the first working circuit and the second working circuit is powered off. When the electronic device 100 meets the first preset condition, the third switch 1303 and the first unidirectional conductive switch 1301 may be turned on, so that the second power supply path 1611 is connected. In this case, the second switch 1304 is turned off. When the second power supply path 1611 is connected, the electronic device 100 turns off the first switch 120, so that the first power supply path 160 is disconnected. When the electronic device 100 disconnects the first power supply path 160, the electronic device 100 turns on the second switch 1304, so that the third power supply path 1612 is connected, and the first unidirectional conductive switch 1301 is turned off. When the first unidirectional conductive switch 1301 is turned off, the second power supply path 1611 is disconnected, and power may be supplied to the first working circuit through the third power supply path 1612, the second switch 1304, and the third switch 1303.

With reference to the second aspect, in this embodiment of this disclosure, the electronic device 100 may further include an output component, and the method further includes: outputting prompt information by using the output component, where the prompt information indicates that the electronic device 100 meets the first preset condition.

In some embodiments, the prompt information may be alternatively used to prompt the user whether to enable the method in any possible implementation of the second aspect.

With reference to the second aspect, in this embodiment of this disclosure, the first unidirectional conductive switch 1301 may include a diode, the second unidirectional conductive switch 1302 may include a diode, and the third unidirectional conductive switch 1303 may include a diode. The first switch 120 may include a triode or a MOSFET, the second switch may include a triode or a MOSFET, and the third switch may include a triode or a MOSFET.

According to a third aspect, this disclosure provides an electronic device 100. The electronic device 100 may include a battery 110, a first working circuit, and a first power supply path 160, a second power supply path 1611, and a third power supply path 1612 that are electrically connected in series between the battery and the first working circuit. Power may be supplied to the first working circuit through the first power supply path 160 based on a voltage of the battery. The second power supply path 1611 may include a first boost circuit 131, the first boost circuit 131 may perform boost conversion based on the voltage of the battery, and power may be supplied to the first working circuit through the second power supply path 1611 based on a voltage obtained by performing boost conversion by the first boost circuit 131. The third power supply path 1612 may include the first boost circuit 131, and power may be supplied to the first working circuit through the third power supply path 1612 based on the voltage obtained by performing boost conversion by the first boost circuit 131. The second power supply path 1611 may further include a first unidirectional conductive switch 1301, the first boost circuit 131 is electrically connected in series between the battery 110 and the first unidirectional conductive switch 1301, the first unidirectional conductive switch 1301 is electrically connected in series between the first boost circuit 131 and the first working circuit, and a conduction direction of the first unidirectional conductive switch 1301 is a direction from the first boost circuit 131 to the first working circuit. The electronic device 100 may further include at least one processing circuit, at least one memory, a plurality of applications, and at least one computer program. The at least one computer program is stored in the memory, and one or more computer programs include instructions. When the instructions are executed by the electronic device 100, the electronic device 100 is enabled to perform the method in any possible implementation of the second aspect.

According to a fourth aspect, this disclosure provides a computer program product including instructions. When the instructions are run on an electronic device 100, the electronic device 100 is enabled to perform the method according to any possible implementation of the second aspect. The electronic device 100 may include a battery 110, a first working circuit, and a first power supply path 160, a second power supply path 1611, and a third power supply path 1612 that are electrically connected in series between the battery and the first working circuit. Power may be supplied to the first working circuit through the first power supply path 160 based on a voltage of the battery. The second power supply path 1611 may include a first boost circuit 131, the first boost circuit 131 may perform boost conversion based on the voltage of the battery, and the second power supply path 1611 may be configured to supply power to the first working circuit based on a voltage obtained by performing boost conversion by the first boost circuit 131. The third power supply path 1612 may include the first boost circuit 131, and power may be supplied to the first working circuit through the third power supply path 1612 based on the voltage obtained by performing boost conversion by the first boost circuit 131. The second power supply path 1611 may further include a first unidirectional conductive switch 1301, the first boost circuit 131 is electrically connected in series between the battery 110 and the first unidirectional conductive switch 1301, the first unidirectional conductive switch 1301 is electrically connected in series between the first boost circuit 131 and the first working circuit, and a conduction direction of the first unidirectional conductive switch 1301 is a direction from the first boost circuit 131 to the first working circuit.

DESCRIPTION OF EMBODIMENTS

The following further provides detailed descriptions with reference to accompanying drawings. In embodiments of this disclosure, the word "example" or "for example" is used to represent giving an example, an illustration, or a description. Exactly, use of the term "example", "for example", or the like is intended to present a related concept in a specific manner. It should be understood that, in descriptions of embodiments of this disclosure, "coupling" includes direct coupling or indirect coupling, and "connection" includes a direct connection or an indirect connection.

For example, embodiments of this disclosure provide a power supply circuit, a power supply method, and an electronic device, which may be applied to an electronic device, for example, a mobile phone, a foldable electronic device, a tablet computer, a desktop computer, a laptop computer, a handheld computer, a notebook computer, an ultra-mobile personal computer (UMPC), a netbook, a cellular phone, a personal digital assistant (PDA), an augmented reality (AR) device, a virtual reality (VR) device, an artificial intelligence device, a wearable device, a vehicle-mounted device, a smart home device, or a smart city device. This is not limited in embodiments of this disclosure.

Figure 1A:
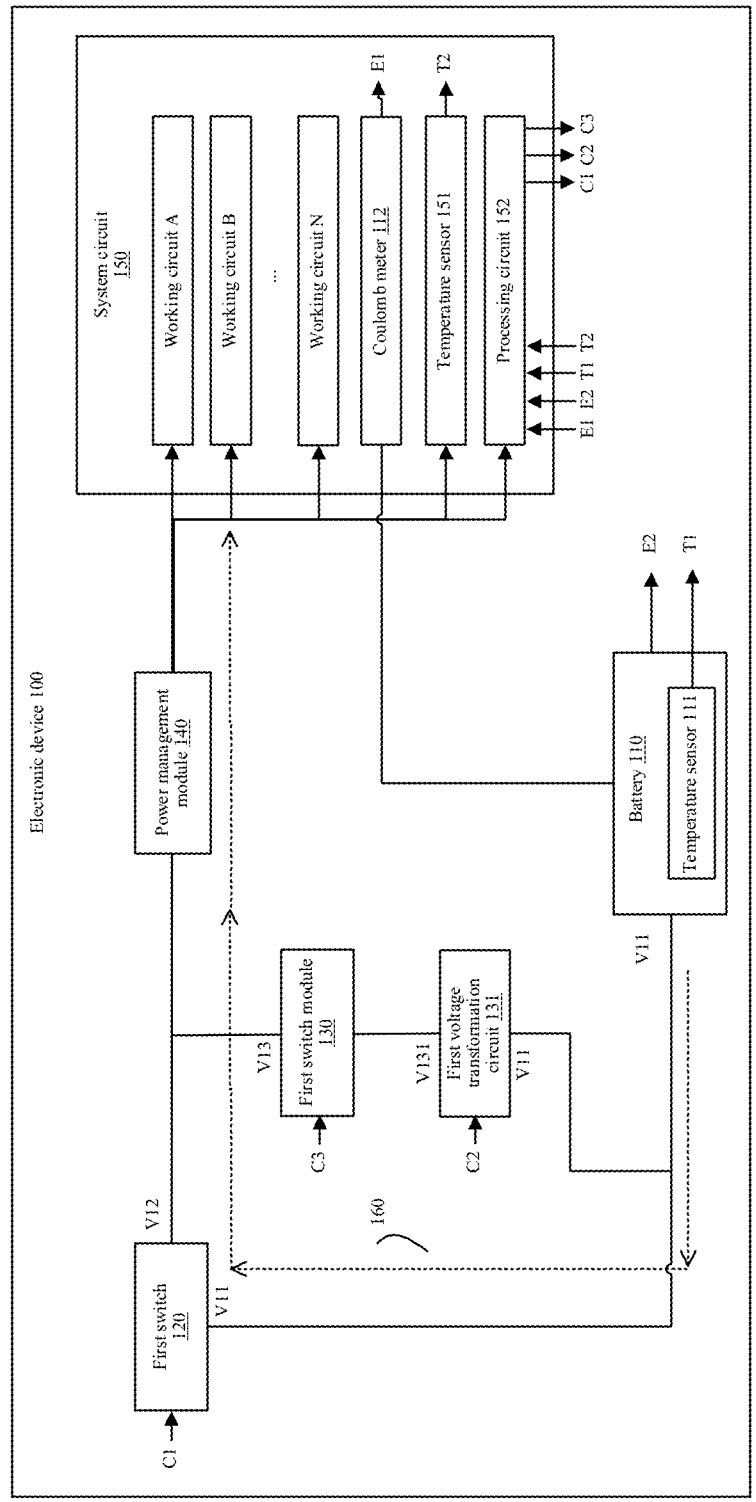
FIG. 1A to FIG. 1C are diagrams of structures of a group of electronic devices according to an embodiment of this disclosure.
Figure 1B:
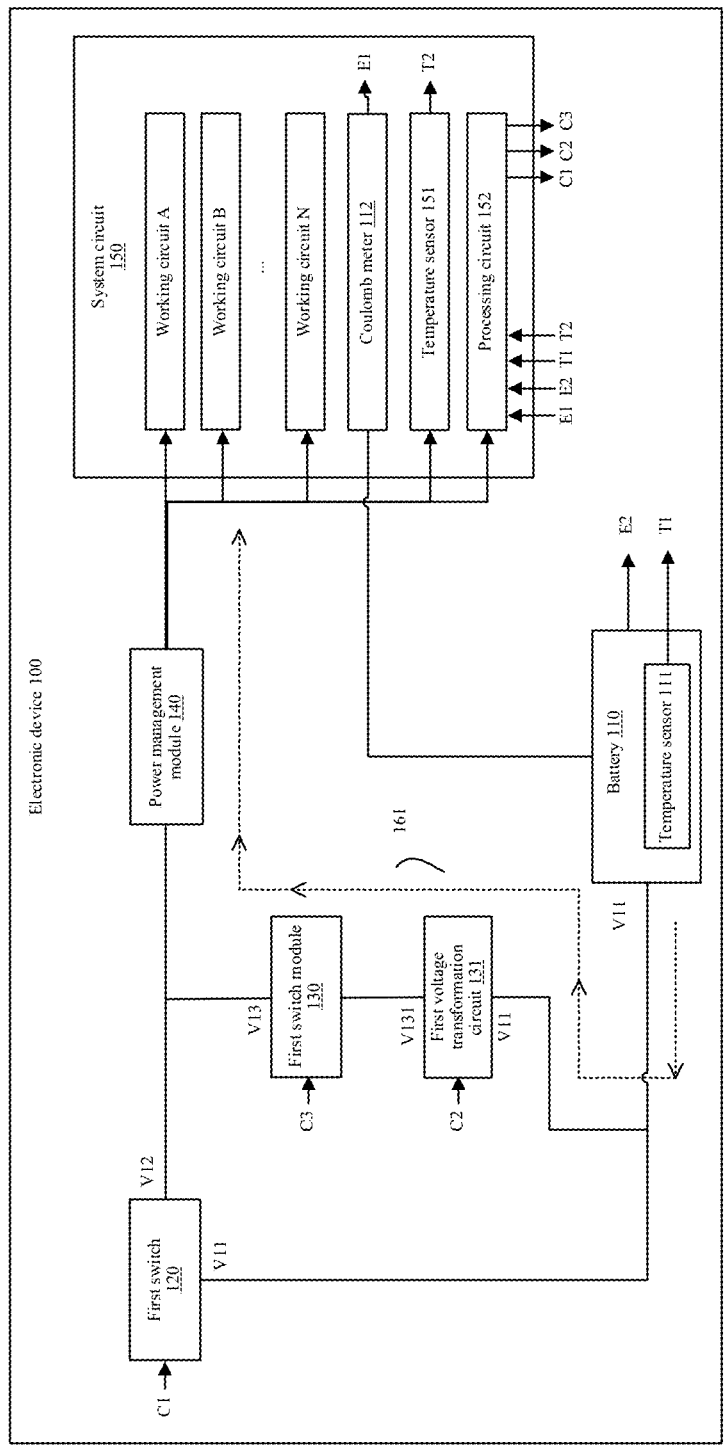
Figure 1C:
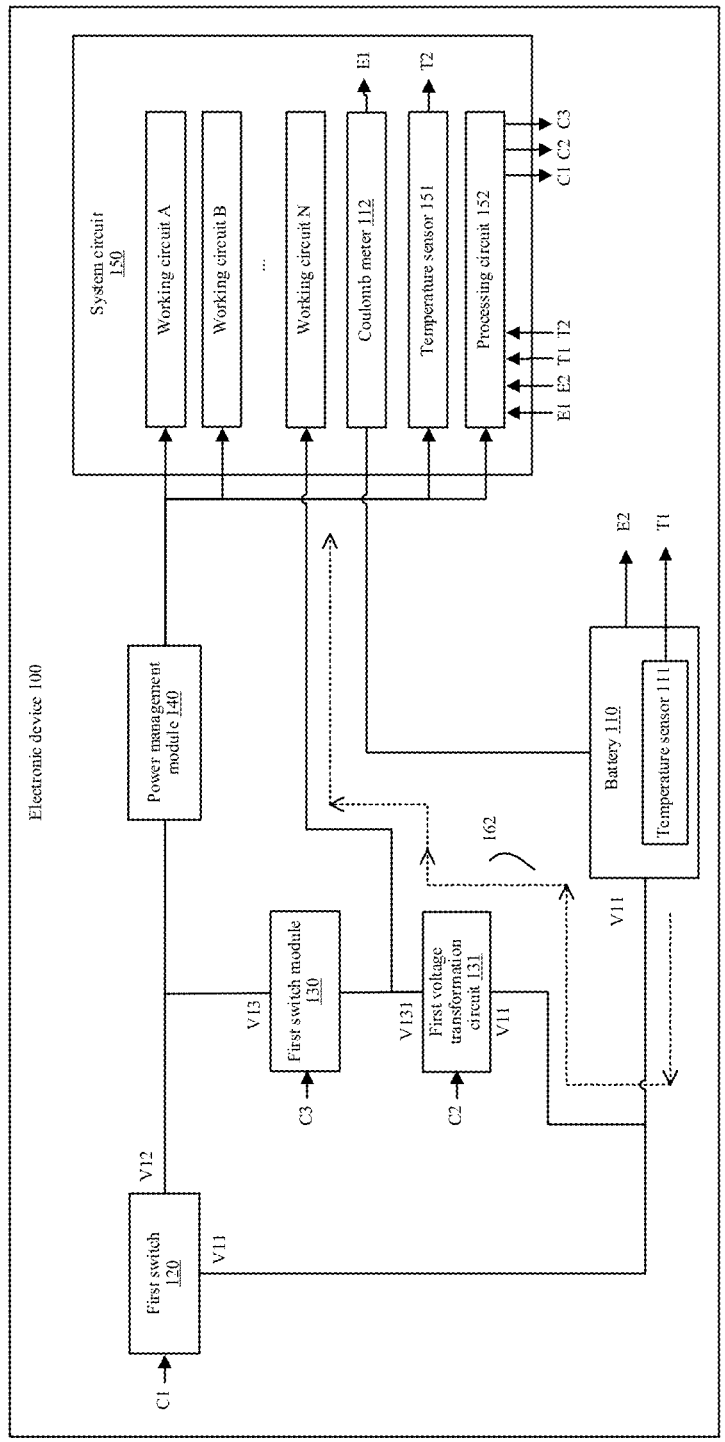

FIG. 1A to FIG. 1C are diagrams of structures of a group of electronic devices according to an embodiment of this disclosure. An electronic device 100 may include a battery 110, a first switch 120, a first switch module 130, a first voltage transformation circuit 131, a power management module 140, and a system circuit 150. The battery 110 may include a temperature sensor 111. The system circuit 150 may include one or more working circuits (such as a working circuit A to a working circuit N), a coulomb meter 112, a temperature sensor 151, and a processing circuit 152. The battery 110 may be electrically connected to the coulomb meter 112, the processing circuit 152 may be electrically connected to the coulomb meter 112, the temperature sensor 111, and the temperature sensor 151, and the processing circuit 152 may control working statuses of the first switch 120, the first switch module 130, and the first voltage transformation circuit 131.

It should be noted that the processing circuit 152 may include one or more processing units, and the processing circuit 152 may control, through a signal circuit C1, the first switch 120 to be turned on or turned off. In response to that an input signal of a control end of the first switch 120 is a turn-off signal (for example, the turn-off signal received by the control end of the first switch 120 may be a signal output by the processing circuit 152, or may be a signal generated based on a signal output by the processing circuit 152), the first switch 120 is turned off, or in response to that an input signal of a control end of the first switch 120 is a turn-on signal (for example, the turn-on signal received by the control end of the first switch 120 may be a signal output by the processing circuit 152, or may be a signal generated based on a signal output by the processing circuit 152), the first switch 120 is turned on. For ease of description, that the processing circuit 152 may control, through the signal circuit C1, the first switch 120 to be turned on or turned off, and in response to that the input signal of the control end of the first switch 120 is the turn-on signal or the turn-off signal, the first switch 120 is turned on or turned off is used as a uniform description in the following embodiments. The processing circuit 152 may control, through a signal circuit C3, the first switch module 130 to be turned on or turned off. In response to that an input signal of a control end of the first switch module 130 is a turn-off signal (for example, the turn-off signal received by the control end of the first switch module 130 may be a signal output by the processing circuit 152, or may be a signal generated based on a signal output by the processing circuit 152), the first switch module 130 is turned off; or in response to that an input signal of a control end of the first switch module 130 is a turn-on signal (for example, the turn-on signal received by the control end of the first switch module 130 may be a signal output by the processing circuit 152, or may be a signal generated based on a signal output by the processing circuit 152), the first switch module 130 is turned on. For ease of description, that the processing circuit 152 may control, through the signal circuit C3, the first switch module 130 to be turned on or turned off, and in response to that the input signal of the control end of the first switch module 130 is the turn-on signal or the turn-off signal, the first switch module 130 is turned on or turned off is used as a uniform description in the following embodiments. The processing circuit 152 may control, through a signal circuit C2, the first voltage transformation circuit 131 to work or be disconnected. In response to that an input signal of a control end of the first voltage transformation circuit 131 is a working signal (for example, the working signal received by the control end of the first voltage transformation circuit 131 may be a signal output by the processing circuit 152, or may be a signal generated based on a signal output by the processing circuit 152), the first voltage transformation circuit 131 works; or in response to that an input signal of a control end of the first voltage transformation circuit 131 is a disconnected signal (for example, the disconnected signal received by the control end of the first voltage transformation circuit 131 may be a signal output by the processing circuit 152, or may be a signal generated based on a signal output by the processing circuit 152), the first voltage transformation circuit 131 is disconnected. For ease of description, that the processing circuit 152 may control, through the signal circuit C2, the first voltage transformation circuit 131 to work or be disconnected, and in response to that the input signal of the control end of the first voltage transformation circuit 131 is the working signal or the disconnected signal, the first voltage transformation circuit 131 works or is disconnected is used as a uniform description in the following embodiments.

In this embodiment of this disclosure, the first voltage transformation circuit 131 may include a buck circuit and a boost circuit.

In this embodiment of this disclosure, the working circuit may include any one or more circuits of a memory, a logic circuit, an input/output module (for example, a display or an audio module), a communication module (for example, a BLUETOOTH module or a cellular module), and an electronic component. It should be noted that a quantity of circuits and a circuit type that are included in the working circuit are not limited in embodiments of this disclosure.

As shown in FIG. 1A, the battery 110 may be electrically connected to a first end of the first switch 120, the battery 110 may provide a voltage V11 for the first switch 120, a second end of the first switch 120 may be electrically connected to an input end of the power management module 140, and an output end of the power management module 140 may be electrically connected to the system circuit 150. The processing circuit 152 controls, through the signal circuit C1, the first switch 120 to be turned on. In response to that the input signal of the control end of the first switch 120 is the turn-on signal, the first switch 120 is turned on. The battery 110 may supply power to the power management module 140 through the first switch 120, and the second end of the first switch 120 may provide a voltage V12 for the power management module 140. Then, the power management module 140 performs voltage conversion to supply power to the system circuit 150. For example, as shown in FIG. 1A, the battery 110 may supply power to the system circuit 150 through a path 160, where the path 160 indicates a current flow direction from the battery 110 to the system circuit 150 through the first switch 120 and the power management module 140. An output voltage and an output current of the battery 110 may be coupled to the system circuit 150 through the first switch 120 and the power management module 140 to supply power to the system circuit 150. The processing circuit 152 may be electrically connected to the temperature sensor 111, the coulomb meter 112, and the temperature sensor 151 separately. When the battery 110 supplies power to the system circuit 150 through the path 160, the processing circuit 152 may detect a temperature T1 by using the temperature sensor 111 or detect a temperature T2 by using the temperature sensor 152. The processing circuit 152 may also detect power E1 of the battery by using the coulomb meter 112, and the processing circuit 152 may further detect a voltage of the battery by using the coulomb meter 112. The processing circuit 152 may determine, by detecting at least one of the voltage of the battery, the power of the battery, the temperature of the battery, or an ambient temperature, that the electronic device 100 meets a first condition. The first condition may include at least one of four conditions: the temperature of the battery 110 is not higher than a first preset temperature threshold, the power of the battery 110 is not higher than a first preset battery capacity threshold, the voltage of the battery 110 is not higher than a first preset voltage threshold, or the ambient temperature is not higher than a second preset temperature threshold. A preset working voltage threshold of the electronic device 100 may be a second preset voltage threshold. Therefore, the first preset voltage threshold needs to be not lower than the second preset voltage threshold. To ensure that the electronic device 100 can work normally, the voltage V11 of the battery 110 is not lower than the second preset voltage threshold. It should be noted that a manner in which the processing circuit 152 detects each of the temperature of the battery, the power of the battery, the voltage of the battery, and the ambient temperature is not limited in embodiments of this disclosure.

In this embodiment of this disclosure, the system circuit 150 may include one or more working circuits, and the power management module 140 may include a boost circuit and a buck circuit. The power management module 140 performs boost conversion or buck conversion on an input voltage through at least one of the boost circuit or the buck circuit, to output a boosted or bucked voltage through a voltage output end. The power management module 140 may have one or more voltage output ends, and the one or more voltage output ends of the power management module 140 separately supply power to one or more working circuits of the system circuit 150.

In this embodiment of this disclosure, either of the temperature T1 and the temperature T2 may be the temperature of the battery or the ambient temperature.

In this embodiment of this disclosure, the first condition may be that the temperature of the battery 110 is not higher than the first preset temperature threshold, and the power of the battery 110 is not higher than the first preset battery capacity threshold. For example, the first preset temperature threshold may be −15 degrees, and the first preset battery capacity threshold may be 20% of a battery capacity. That the processing circuit 152 detects that the electronic device 100 meets the first condition may include that the processing circuit 152 detects that the temperature of the battery 110 is lower than or equal to −15 degrees and the power of the battery 110 is lower than or equal to 20% of the battery capacity.

In some embodiments, the first condition may alternatively be that the voltage of the battery 110 is not higher than the first preset voltage threshold. For example, the first preset voltage threshold may be 3.5 volts (V). That the processing circuit 152 detects that the electronic device 100 meets the first condition may include that the processing circuit 152 detects that the voltage of the battery 110 is lower than or equal to 3.5 V.

In some embodiments, the first condition may alternatively be that the temperature of the battery 110 is not higher than the first preset temperature threshold, the power of the battery 110 is not higher than the first preset battery capacity threshold, and the ambient temperature is not higher than the second preset temperature threshold. For example, the first preset temperature threshold may be −15 degrees, the first preset battery capacity threshold may be 20% of the battery capacity, and the second preset temperature threshold may be −25 degrees. That the processing circuit 152 detects that the electronic device 100 meets the first condition may include that the processing circuit 152 detects that the temperature of the battery 110 is lower than or equal to −15 degrees, the power of the battery 110 is lower than or equal to 20% of the battery capacity, and the ambient temperature is lower than or equal to −25 degrees. An inner core temperature of the battery 110 is usually lower than the battery temperature detected by the temperature sensor. When the temperature sensor detects that the battery temperature is lower than or equal to the first preset temperature threshold, the inner core temperature of the battery is already lower than the first preset temperature threshold, and the ambient temperature is usually lower than the inner core temperature of the battery 110. Therefore, whether the battery 110 is in a low-temperature state can be detected in a more timely manner by detecting the temperature of the battery and the ambient temperature, and further whether the battery 110 is in a low-voltage state can be detected in a more timely manner. In this way, the output voltage of the battery 110 is boosted in a timely manner, so that the electronic device 100 can work normally.

It should be noted that the first preset temperature threshold, the first preset battery capacity threshold, the first preset voltage threshold, and the second preset temperature threshold are not limited in embodiments of this disclosure.

As shown in FIG. 1B, the battery 110 may be electrically connected to an input end of the first voltage transformation circuit 131, and the battery 110 may provide the voltage V11 for the first voltage transformation circuit 131. A first output end of the first voltage transformation circuit 131 may be electrically connected to a first end of the first switch module 130, a second end of the first switch module 130 may be electrically connected to the input end of the power management module 140, and the output end of the power management module 140 may be electrically connected to the system circuit 150. The processing circuit 152 may be electrically connected to the first voltage transformation circuit 131. When the processing circuit 152 detects that the electronic device 100 meets the first condition, the processing circuit 152 may control, through the signal circuit C2, the first voltage transformation circuit 131 to work. In response to that an input signal of a control end of the first voltage transformation circuit 131 is a working signal, the first voltage transformation circuit 131 works. After performing voltage conversion on the voltage of the battery, the first voltage transformation circuit 131 may output a voltage V131 through the first output end. The processing circuit 152 may control, through the signal circuit C3, the first switch module 130 to be turned on. In response to that an input signal of a control end of the first switch module 130 is a turn-on signal, the first switch module 130 is turned on. The power management module 140 performs voltage conversion by using an output voltage V13 of the first switch module 130 as an input voltage, to supply power to the system circuit 150. For example, as shown in FIG. 1B, the battery 110 may supply power to the system circuit 150 through a path 161, where the path 161 indicates a current flow direction from the battery 110 to the system circuit 150 through the first voltage transformation circuit 131, the first switch module 130, and the power management module 140. An output voltage and current of the battery 110 may be coupled to the system circuit 150 through the first voltage transformation circuit 131, the first switch module 130, and the power module 140, to supply power to the electronic device 100. When the battery 110 supplies power to the system circuit 150 through the path 161, the processing circuit 152 may control, through the signal circuit C1, the first switch 120 to be turned off. In response to the signal circuit C1 output by the processing circuit 152, the first switch 120 is turned off, and the battery 110 stops supplying power to the system circuit 150 through the path 160. Before the battery 110 stops supplying power to the system circuit 150 through the path 160, the battery 110 has supplied power to the system circuit 150 through the path 161, so that the electronic device 100 is not powered off because the first switch 120 is turned off.

In this embodiment of this disclosure, the battery 110 may be a silicon negative electrode lithium-ion battery. Compared with another graphite negative electrode lithium-ion battery, the silicon negative electrode lithium-ion battery can improve energy density of the battery. In addition, because a voltage of the silicon negative electrode lithium-ion battery is lower than that of the graphite negative electrode lithium-ion battery in terms of same power, use of the silicon negative electrode lithium-ion battery may make it easier for the electronic device to meet the first condition. In this way, the path 161 is connected, and the battery 110 may supply power to the system circuit 150 through the path 161, so that the electronic device 100 can work normally.

In this embodiment of this disclosure, when the first switch 120 is turned on, and before the battery 110 supplies power to the system circuit 150 through the path 161, it needs to be ensured that an output current of the first voltage transformation circuit 131 cannot exceed an overcurrent threshold of the first voltage transformation circuit 131 when the battery 110 supplies power to the system circuit 150 through the path 161. When the first switch module 130 is turned on, the first switch module 130 is used as a switch, and an impedance of the first switch module 130 is small or even ignored. Therefore, the output voltage V13 of the first switch module 130 may be considered as the same as the output voltage V131 of the first voltage transformation circuit 131. In embodiments of this disclosure, "same" does not mean absolute same. A person skilled in the art may understand that, because a person skilled in the art may appropriately adjust selection of an electronic component based on a design requirement, because of selection of different electronic components and design tolerances, a difference within a specific range is allowed when two voltages are "the same", for example, a difference is 0.1 V, 0.2 V, or 0.5 V. Therefore, in the solution provided in this embodiment of this disclosure, before the battery 110 supplies power to the system circuit 150 through the path 161, the processing circuit 152 may control, to be lower than or equal to the output voltage V12 of the first switch 120, the output voltage V13 obtained after the output voltage V131 of the first voltage transformation circuit 131 passes through the first switch module 130. This avoids a case in which when the first switch module 130 is turned on, and the battery 110 supplies power to the system circuit 150 through the path 161, because the first switch 120 is electrically connected to the first switch module 130 through a wire, and an impedance of the wire is small, when the output voltage V13 of the first switch module 130 is higher than the output voltage V12 of the first switch 120, an output current of the first switch module 130 is excessively large; further, the output current of the first voltage transformation circuit 131 is excessively large and exceeds the overcurrent threshold of the first voltage transformation circuit 131; and consequently the first voltage transformation circuit 131 enables overcurrent protection and cannot work normally. The output voltage V131 of the first voltage transformation circuit 131 needs to be higher than the second preset voltage threshold, to ensure that after the first switch 120 is turned off, the output voltage V13 of the first switch module 130 can ensure normal working of the electronic device 100, and the electronic device is not powered off because the first switch 120 is turned off.

In this embodiment of this disclosure, the battery 110 is electrically connected to the input end of the first voltage transformation circuit 131, the first output end of the first voltage transformation circuit 131 may also be electrically connected to some circuits of the system circuit 150, and the first output end of the first voltage transformation circuit 131 is configured to supply power to some circuits of the system circuit 150. For example, as shown in FIG. 1C, the first output end of the first voltage transformation circuit 131 outputs the voltage V131, and the battery 110 may supply power to some circuits of the system circuit 150 through the first output end of the first voltage transformation circuit 131. For example, as shown in FIG. 1C, the battery 110 may supply power to some circuits of the system circuit 150 through a path 162, where the path 162 indicates a current flow direction from the battery 110 to the system circuit 150 through the first voltage transformation circuit 131. An output voltage and current of the battery 110 may be coupled to the system circuit 150 through the first voltage transformation circuit 131 to supply power to the system circuit 150. Because the battery 110 directly supplies power to some circuits of the system circuit 150 through the first voltage transformation circuit 131, and the power management module 140 does not need to perform voltage conversion, a power loss caused by working of an electronic component in the power management module 140 when the power management module 140 performs voltage conversion is reduced, and utilization of power output by the battery 110 can be improved.

In some embodiments, when the battery 110 supplies power to some circuits of the system circuit 150 through the first output end of the first voltage transformation circuit 131, where some circuits of the system circuit 150 may be any one or more of a memory card, a Universal Flash Storage (UFS), a time-of-flight camera (TOF camera), a screen (touch panel (TP)), or a compass.

In the foregoing embodiment, when the battery 110 supplies power to the system circuit 150 through the path 160, if the processing circuit 152 detects that the electronic device 100 meets the first condition, the processing circuit 152 may control the first voltage transformation circuit 131 to work, the first switch module 130 is turned on. The path 161 is connected, and power may be supplied to the system circuit 150 through the path 161. In this case, the output voltage of the first switch module 130 is higher than the second preset voltage threshold and is not higher than the output voltage of the first switch 120, so that the battery 110 can supply power to the system circuit 150 through the path 161, and system power-off caused by overcurrent protection enabled by the first voltage transformation circuit 131 due to an excessively large output current of the first voltage transformation circuit 131 is avoided. After the first voltage transformation circuit 131 works and the first switch module 130 is turned on, the processing circuit 152 may control the first switch 120 to be turned off, so that the path 160 is disconnected. Before the first switch 120 is turned off, the output voltage of the first switch module 130 is higher than the second preset voltage threshold, and the first switch module 130 has a capability of supplying power to the system circuit 150. Therefore, after the first switch 120 is turned off, the battery 110 may supply power to the electronic device 100 through the path 161, so that the electronic device 100 is not powered off because the first switch 120 is turned off.

For example, when the processing circuit 152 detects that the electronic device 100 meets the first condition, the first condition includes that the voltage of the battery 110 is not higher than the first preset voltage threshold. For example, the second preset voltage threshold is 3.4 V, and the first preset voltage threshold is 3.5 V. When the processing circuit detects that an output voltage of the battery 110 is 3.5 V, the processing circuit 152 first controls the first voltage transformation circuit 131 to work, the first switch module 130 is turned on, and the first voltage transformation circuit 131 outputs the voltage 3.5 V, so that the battery 110 can supply power to the system circuit 150 through the path 161; then, the processing circuit 152 controls the switch module 120 to be turned off, and after the switch module 120 is turned off, the battery 110 may supply power to the electronic device 100 through the first voltage transformation circuit 131.

As shown in FIG. 1B, when the battery 110 supplies power to the system circuit 150 through the path 161, the processing circuit 152 may also detect a temperature by using a temperature sensor, for example, detect a temperature T1 by using the temperature sensor 111 or detect a temperature T2 by using the temperature sensor 152. The processing circuit 152 may also detect power and a voltage of the battery 110, for example, detect power E1 of the battery and a voltage of the battery by using the coulomb meter 112. The processing circuit 152 may determine, by detecting at least one of the voltage of the battery, the power of the battery, the temperature of the battery, or an ambient temperature, that the electronic device 100 meets a second condition. The second condition may include at least one of four conditions: the temperature of the battery 110 is higher than a third preset temperature threshold, the power of the battery 110 is higher than a second preset battery capacity threshold, the voltage of the battery 110 is higher than a third preset voltage threshold, or the ambient temperature is higher than a fourth preset temperature threshold. When the processing circuit 152 detects that the electronic device 100 meets the second condition, the processing circuit 152 controls, through the signal circuit C1, the first switch 120 to be turned on, and in response to that an input signal of a control end of the first switch 120 is a turn-on signal, the first switch 120 is turned on, so that the path 160 is connected. For example, as shown in FIG. 1A, when the first switch 120 is turned on, the battery 110 may supply power to the system circuit 150 through the path 160. When the battery 110 supplies power to the system circuit 150 through the path 160, the processing circuit 152 may output the signal circuit C2 to the control end of the first voltage transformation circuit 131. In response to the signal circuit C2, the first voltage transformation circuit 131 stops working, the first output end has no output voltage V131, and the battery 110 stops supplying power to the system circuit 150 through the path 161. Before the battery 110 stops supplying power to the system circuit 150 through the path 161, the first switch 120 is turned on, the path 160 is connected, and the battery 110 may supply power to the system circuit 150 through the path 160, so that the electronic device 100 is not powered off because the first voltage transformation circuit 131 is disconnected.

In some embodiments, the first preset temperature threshold is different from the third preset temperature threshold, the first preset battery capacity threshold is different from the second preset battery capacity threshold, the first preset voltage threshold is different from the third preset voltage threshold, and the second preset temperature threshold is different from the fourth preset temperature threshold. For the first preset temperature threshold, the first preset battery capacity threshold, the first preset voltage threshold, and the second preset temperature threshold, refer to specific descriptions in the foregoing embodiments. Details are not described herein again.

In this embodiment of this disclosure, when the battery 110 supplies power to the system circuit 150 through the path 161, and before the processing circuit 152 controls the first switch 120 to be turned on, it needs to be ensured that when the first switch 120 is turned on, an output current of the first voltage transformation circuit 131 cannot exceed an overcurrent threshold of the first voltage transformation circuit 131. When the first switch 120 is turned on, the first switch module 120 is used as a switch, and an impedance of the first switch 120 is small or even ignored. Therefore, the output voltage V12 of the first switch 120 may be considered as the same as the output voltage V11 of the battery 110. In embodiments of this disclosure, "same" does not mean absolute same. A person skilled in the art may understand that, because a person skilled in the art may appropriately adjust selection of an electronic component based on a design requirement, because of selection of different electronic components and design tolerances, a difference within a specific range is allowed when two voltages are "the same", for example, a difference is 0.1 V, 0.2 V, or 0.5 V. Therefore, in the solution provided in this embodiment of this disclosure, before the processing circuit 152 controls the first switch 120 to be turned on, the processing circuit 152 may control, to be not higher than the output voltage V11 of the battery 110, the output voltage V13 obtained after the output voltage V131 of the first voltage transformation circuit 131 passes through the first switch module 130. This avoids a case in which when the first switch 120 is turned on, and the battery 110 supplies power to the system circuit 150 through the path 160, because the first switch 120 is electrically connected to the first switch module 130 through a wire, and an impedance of the wire is small, when the output voltage V13 obtained after the output voltage V131 of the first voltage transformation circuit 131 passes through the first switch module 130 is higher than the output voltage V12 of the first switch 120, an output current of the first switch module 130 is excessively large; further, the output current of the first voltage transformation circuit 131 is excessively large and exceeds the overcurrent threshold of the first voltage transformation circuit 131; and consequently the first voltage transformation circuit 131 enables overcurrent protection and cannot work normally.

In this embodiment of this disclosure, the battery 110 is electrically connected to the input end of the first voltage transformation circuit 131, and the first output end of the first voltage transformation circuit 131 may be electrically connected to some circuits of the system circuit 150. When the path 161 is disconnected, the first voltage transformation circuit 131 may supply power to the system circuit 150 through the first output end. For example, as shown in FIG. 1C, the battery 110 may further supply power to the system circuit 150 through the path 162. For a manner in which the first voltage transformation circuit 131 directly supplies power to the system circuit 150 through the first output end, refer to descriptions in the foregoing other embodiments. Details are not described herein again.

In some embodiments, when the battery 110 stops supplying power to the system circuit 150 through the path 161, the processing circuit 152 may alternatively control the first voltage transformation circuit 131 to stop working. In this case, the first output end of the first voltage transformation circuit 131 has no output, so that power consumption of the first voltage transformation circuit 131 can be reduced.

Figure 2A:
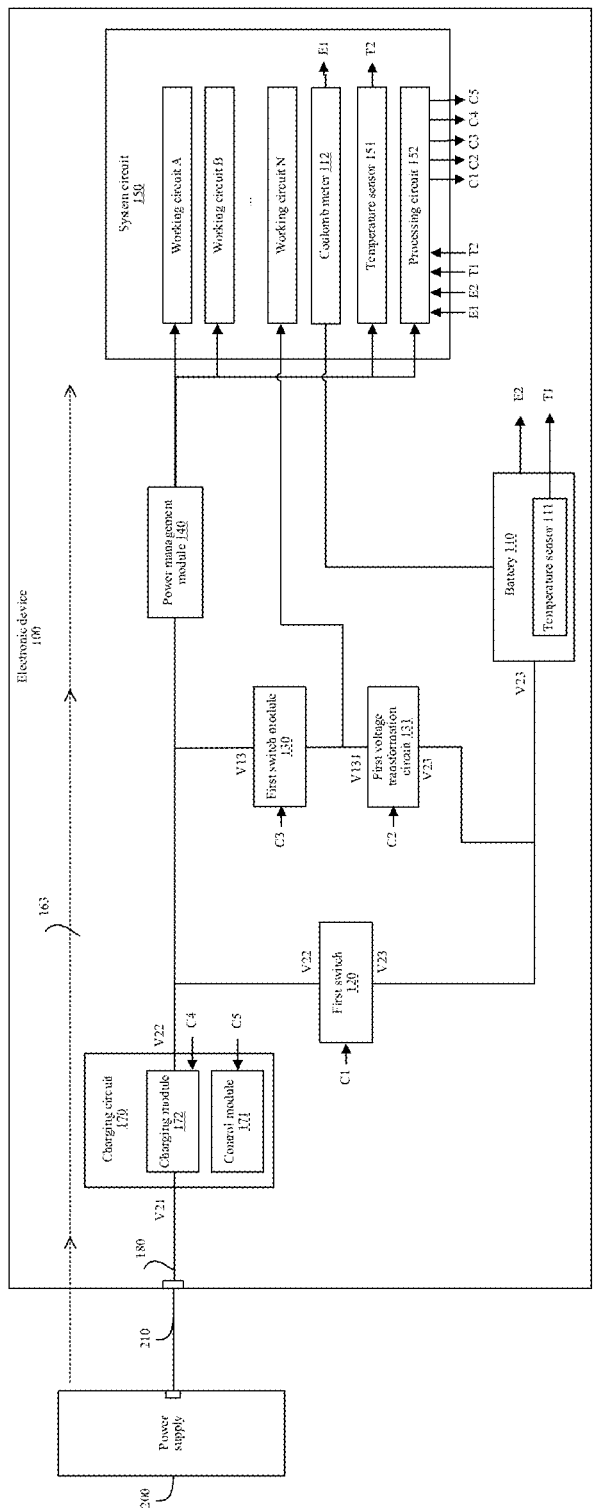
FIG. 2A to FIG. 2C are diagrams of structures of another group of electronic devices according to an embodiment of this disclosure.
Figure 2B:
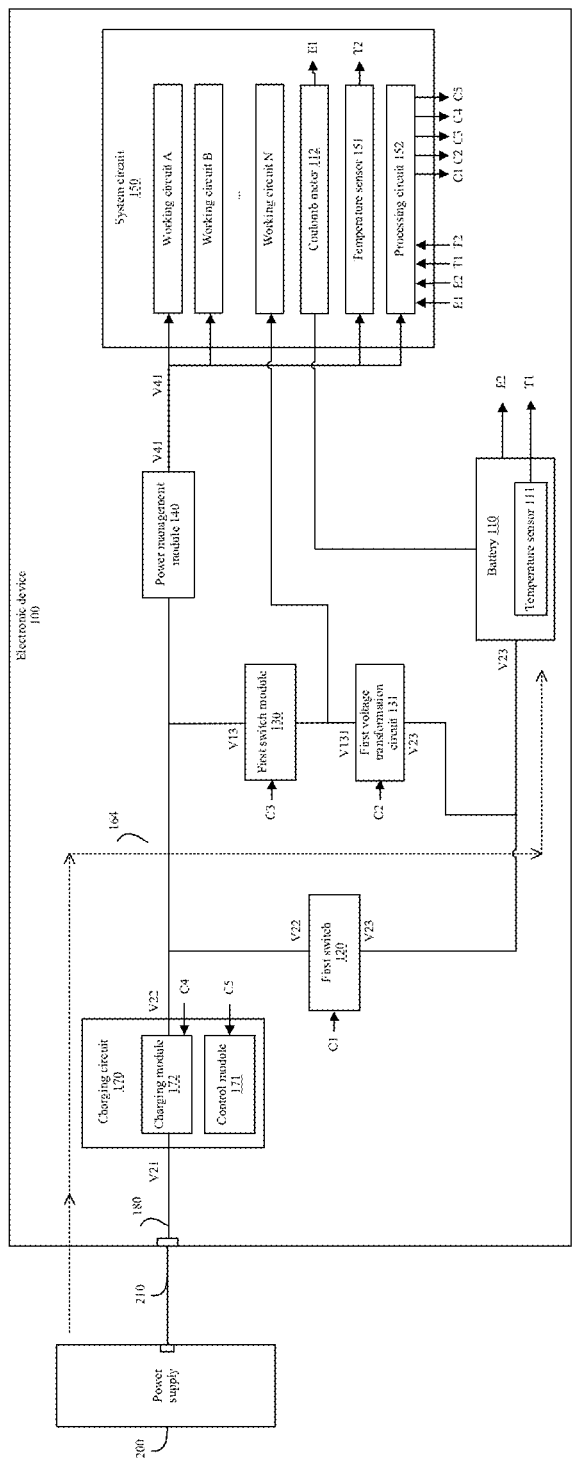
Figure 2C:
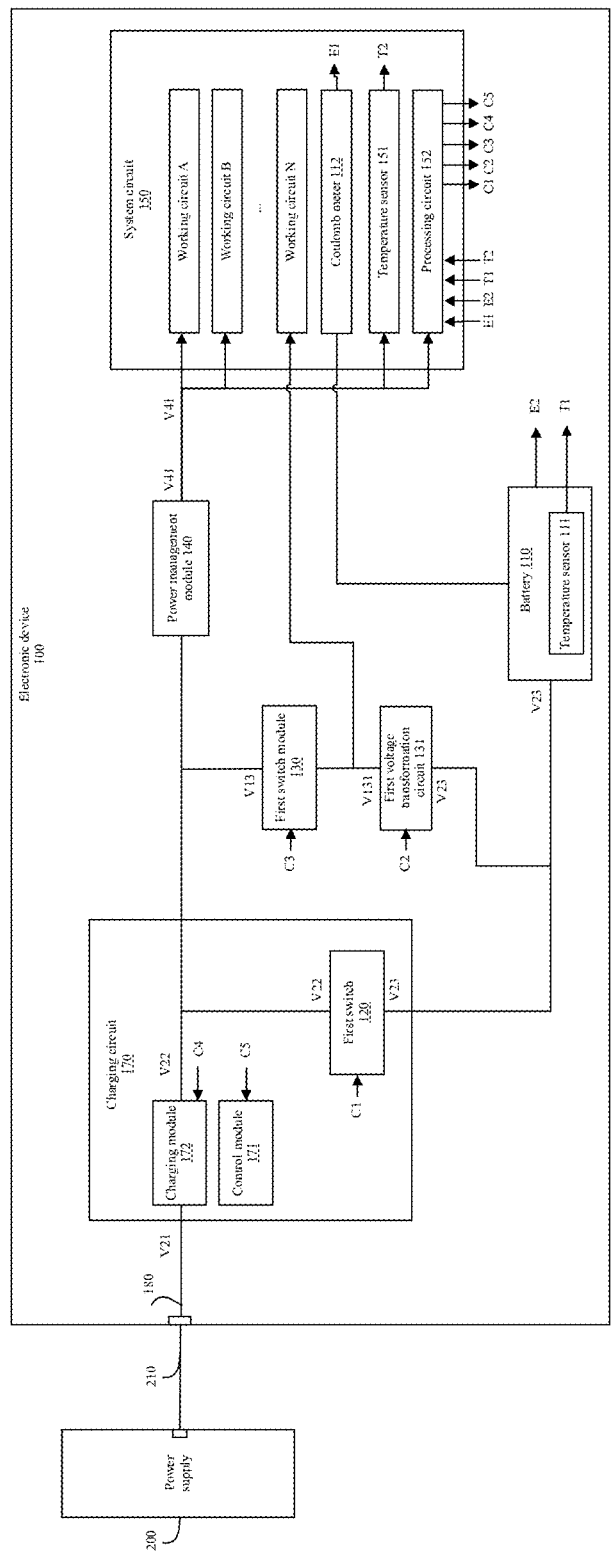

FIG. 2A to FIG. 2C each are a diagram of a structure of another electronic device according to an embodiment of this disclosure. As shown in FIG. 2A to FIG. 2C, based on the electronic device 100 shown in FIG. 1A to FIG. 1C, the electronic device 100 may further include a charging circuit 170 and an external power supply interface 180. The charging circuit 170 may include a control module 171 and a charging module 172. The electronic device 100 may further be connected to an external power supply 200, and the external power supply 200 may be electrically connected to the electronic device 100 through the external power supply interface 180. The external power supply 200 may be electrically connected to the charging module 172 through the external power supply interface 180, and the external power supply 200 may be coupled to the charging module 172 through one or more conducting wires 210 (for example, a cable) to supply power to the charging module 172. The processing circuit 152 may be electrically connected to the control module 171 and the charging module 172, and the processing circuit 152 may control working statuses of the charging module 172 and the control module 171.

In this embodiment of this disclosure, the charging circuit 170 may include an integrated charging chip.

In this embodiment of this disclosure, the external power supply 200 may be a charger, or the external power supply 200 may be a portable charging device.

In this embodiment of this disclosure, as shown in FIG. 2C, the first switch 120 may be alternatively disposed in the charging circuit 170, so that an area of a circuit board occupied by the first switch 120 can be reduced, and more electronic components can be placed on the circuit board.

It should be noted that the processing circuit 152 may include one or more processing units, and the processing circuit 152 may control, through a signal circuit C4, the charging module 172 to work or be disconnected. In response to that an input signal of a control end of the charging module 172 is a working signal (for example, the working signal received by the control end of the charging module 172 may be a signal output by the processing circuit 152, or may be a signal generated based on a signal output by the processing circuit 152), the charging module 172 works; or in response to that an input signal of a control end of the charging module 172 is a disconnected signal (for example, the disconnected signal received by the control end of the charging module 172 may be a signal output by the processing circuit 152, or may be a signal generated based on a signal output by the processing circuit 152), the charging module 172 is disconnected. For ease of description, that the processing circuit 152 may control, through the signal circuit C4, the charging module 172 to work or be disconnected, and in response to that the input signal of the control end of the charging module 172 is the working signal or the disconnected signal, the charging module 172 works or is disconnected is used as a uniform description in the following embodiments.

As shown in FIG. 2A to FIG. 2C, when the electronic device 100 is connected to the external power supply 200, the external power supply 200 may be electrically connected to the charging module 172, and the external power supply 200 may provide a voltage V21 for the charging module 172. The charging module 172 may be electrically connected to an input end of the power management module 140, and an output end of the power management module 140 may be electrically connected to the system circuit 150.

In a possible embodiment, when the processing circuit 152 detects that the electronic device 100 meets a first condition, for example, as shown in FIG. 1B, the battery 110 may supply power to the system circuit 150 through a path 161. When the processing circuit 152 detects that the external power supply 200 is connected, the processing circuit 152 may control, through the signal circuit C4, the charging module 172 to work. In response to that the input signal of the control end of the charging module 172 is the working signal, the charging module 172 works, and the charging module 172 may provide a voltage V22 for the power management module 140. Then, the power management module 140 performs voltage conversion to supply power to the system circuit 150. For example, as shown in FIG. 2A, the external power supply 200 may supply power to the system circuit 150 through a path 163, where the path 163 indicates a current flow direction from the external power supply 200 to the system circuit 150 through the charging module 172 and the power management module 140. An output voltage and current of the external power supply 200 may be coupled to the system circuit 150 through the charging module 172 and the power management module 140 to supply power to the system circuit 150.

In this embodiment of this disclosure, when the path 161 is connected, and before the external power supply 200 supplies power to the system circuit 150 through the path 163, it needs to be ensured that an output current of the first voltage transformation circuit 131 cannot exceed an overcurrent threshold of the first voltage transformation circuit 131 when the external power supply 200 supplies power to the system circuit 150 through the path 163. In the solution provided in this embodiment of this disclosure, before the path 163 is connected, the processing circuit 152 may control, to be not higher than the output voltage V22 of the charging module 172, an output voltage V13 that is of a second end of a first switch module 130 and that is obtained after an output voltage V131 of the first voltage transformation circuit 131 passes through the first switch module 130. This avoids a case in which when the voltage V13 is higher than the voltage V22 after the external power supply 200 supplies power to the system circuit 150 through the path 163, because the first switch module 130 is electrically connected to the charging module 172 through a wire, and an impedance of the wire is small, an output current of the first switch module 130 is excessively large; further, the output current of the first voltage transformation circuit 131 is excessively large and exceeds the overcurrent threshold of the first voltage transformation circuit 131; and consequently the first voltage transformation circuit 131 enables overcurrent protection and cannot work normally.

In this embodiment of this disclosure, when the external power supply 200 may supply power to the system circuit 150 through the path 163, the processing circuit 152 may control, through a signal circuit C3, the first switch module 130 to be turned off. In response to that an input signal of a control end of the first switch module 130 is a turn-off signal, the first switch module 130 is turned off, the path 161 is disconnected, and the battery 110 stops supplying power to the system circuit 150 through the path 161. Before the battery 110 stops supplying power to the system circuit 150 through the path 161, the external power supply 200 has supplied power to the system circuit 150 through the path 163, so that the electronic device 100 is not powered off when the path 161 is disconnected.

In this embodiment of this disclosure, the external power supply 200 may be electrically connected to the charging module 172, the charging module 172 may be electrically connected to the first switch 120, and the first switch 120 may be electrically connected to the battery 110. When the external power supply 200 supplies power to the system circuit 150 through the path 163, the processing circuit 152 may control, through a signal circuit C1, the first switch 120 to be turned on, and in response to that an input signal of a control end of the first switch 120 is a turn-on signal, the first switch 120 is turned on. For example, as shown in FIG. 2B, the external power supply 200 may also provide a charging current for the battery 110 through a path 164, where the path 164 indicates a charging current flow direction from the external power supply 200 to the battery 110 through the charging circuit 170 and the first switch 120. An output voltage and current of the external power supply 200 may be coupled to the battery 110 through the charging circuit 170 and the first switch 120 to provide the charging current for the battery 110.

In some embodiments, the control module 171 may further control a working status of the first switch 120. The processing circuit 152 may control the control module 171 through a signal circuit C5, so that the control module 171 may control the first switch 120 to be turned on. When the first switch 120 is turned on, the external power supply 200 may also provide the charging current for the battery 110 through the path 164.

In some embodiments, when the external power supply 200 separately supplies power to the system circuit 150 through the path 163 and charges the battery 110 through the path 164, and a system load of the electronic device 100 is high, the processing circuit 152 detects that an output current of the battery 110 is greater than a first preset current threshold, the output voltage and the output current of the external power supply 200 may be all supplied to the system circuit 150, and the battery 110 may also supply power to the system circuit 150 through the path 160. In other words, the system circuit 150 may obtain input currents through both the path 160 and the path 163, so that the electronic device 100 can support a higher system load.

In this embodiment of this disclosure, the battery 110 is electrically connected to an input end of the first voltage transformation circuit 131, and the first output end of the first voltage transformation circuit 131 may be electrically connected to some circuits of the system circuit 150. For a manner in which the first voltage transformation circuit 131 supplies power to the system circuit 150 directly through the first output end, refer to descriptions in the foregoing other embodiments. Details are not described herein again.

In some embodiments, when the battery 110 stops supplying power to the system circuit 150 through the path 161, the processing circuit 152 may output a signal to the first voltage transformation circuit 131 to control the first voltage transformation circuit 131 to stop working. In this case, the first output end of the first voltage transformation circuit 131 has no output, so that power consumption of the first voltage transformation circuit 131 can be reduced.

In this embodiment of this disclosure, the control module 171 may further control a working status of the charging module 172. The processing circuit 152 may control the control module 171 through the signal circuit C5, so that the control module 171 may control the charging module 172 to output a voltage and a current to the power management module 140, and the external power supply 200 may supply power to the system circuit 150 through the path 163.

In another possible embodiment, when the processing circuit 152 detects that the electronic device 100 meets a first condition, for example, as shown in FIG. 1B, the battery 110 may supply power to the system circuit 150 through a path 161. When the electronic device 100 is connected to the external power supply 200, the processing circuit 152 may control, through a signal circuit C1, the first switch 120 to be turned on, and in response to that an input signal of a control end of the first switch 120 is a turn-on signal, the first switch 120 is turned on. For example, as shown in FIG. 1A, the path 160 is connected, and the battery 110 may supply power to the system circuit 150 through the path 160.

In this embodiment of this disclosure, when the path 161 is connected, and before the battery 110 supplies power to the system circuit 150 through the path 160, it needs to be ensured that an output current of the first voltage transformation circuit 131 cannot exceed an overcurrent threshold of the first voltage transformation circuit 131 when the battery 110 supplies power to the system circuit 150 through the path 160. When the first switch 120 is turned on, the first switch 120 is used as a switch, and an impedance of the first switch 120 is small or even ignored. Therefore, an output voltage V12 of the first switch 120 may be considered as the same as an output voltage V11 of the battery 110. Therefore, in the solution provided in this embodiment of this disclosure, before the battery 110 supplies power to the system circuit 150 through the path 160, the processing circuit 152 may output a signal to the first voltage transformation circuit 131 to control the output voltage V13 of the first switch module 130 to be not higher than the output voltage V11 of the battery 110 after the output voltage V131 of the first voltage transformation circuit 131 passes through the first switch module 130. This avoids a case in which the output voltage V13 of the first switch module 130 is higher than the output voltage V12 of the first switch 120 when the first switch 120 is turned on; because the first switch 120 is electrically connected to the first switch module 130 through a wire, and an impedance of the wire is small, when the output voltage V13 of the first switch module 130 is higher than the output voltage V12 of the first switch 120, an output current of the first switch module 130 is excessively large; further, the output current of the first voltage transformation circuit 131 is excessively large and exceeds the overcurrent threshold of the first voltage transformation circuit 131; and consequently the first voltage transformation circuit 131 enables overcurrent protection and cannot work normally.

In this embodiment of this disclosure, the control module 171 may further control a working status of the first switch 120. The processing circuit 152 may control the control module 171 through a signal circuit C5, so that the control module 171 may control the first switch 120 to be turned on. When the first switch 120 is turned on, the battery 110 may supply power to the system circuit 150 through the path 160.

In this embodiment of this disclosure, when the battery 110 supplies power to the system circuit 150 through the path 160, the processing circuit 152 may control, through the signal circuit C3, the first switch module 130 to be turned off. In response to that an input signal of a control end of the first switch module 130 is a turn-off signal, the first switch module 130 is turned off, the path 161 is disconnected, and the battery 110 stops supplying power to the system circuit 150 through the path 161. Before the battery 110 stops supplying power to the system circuit 150 through the path 161, the battery 110 has supplied power to the system circuit 150 through the path 160, so that the electronic device 100 is not powered off when the path 161 is disconnected.

In some embodiments, the battery 110 is electrically connected to the input end of the first voltage transformation circuit 131, and the first output end of the first voltage transformation circuit 131 may be electrically connected to some circuits of the system circuit 150. For a manner in which the first voltage transformation circuit 131 supplies power to the system circuit 150 directly through the first output end, refer to descriptions in the foregoing other embodiments. Details are not described herein again.

In some embodiments, when the battery 110 stops supplying power to the system circuit 150 through the path 161, the processing circuit 152 may alternatively control the first voltage transformation circuit 131 to stop working. In this case, the first output end of the first voltage transformation circuit 131 has no output, so that power consumption of the first voltage transformation circuit 131 can be reduced.

In this embodiment of this disclosure, when the battery 110 supplies power to the system circuit 150 through the path 160, the processing circuit 152 may control, through the signal circuit C4, the charging module 172 to work. In response to that the input signal of the control end of the charging module 172 is the working signal, the charging module 172 works, and the charging module 172 may provide a voltage V22 for the power management module 140. Then, the power management module 140 performs voltage conversion to supply power to the system circuit 150. For example, as shown in FIG. 2A, the external power supply 200 may supply power to the system circuit 150 through the path 163. The external power supply 200 may be electrically connected to the charging module 172, the charging module 172 may be electrically connected to the first switch 120, and the first switch 120 may be electrically connected to the battery 110. When the external power supply 200 may supply power to the system circuit 150 through the path 163, the charging module 172 may also provide the voltage V22 for the first switch 120, and the processing circuit 152 may control, through the signal circuit C1, the first switch 120 to be turned on. In response to that an input signal of a control end of the first switch 120 is a turn-on signal, the first switch 120 is turned on, and the first switch 120 may provide a voltage V23 for the battery 110. In this case, the battery 110 may stop supplying power to the system circuit 150 through the path 160. For example, as shown in FIG. 2B, the external power supply 200 may provide a charging current for the battery 110 through the path 164. Before the battery 110 stops supplying power to the system circuit 150 through the path 160, the battery 110 has supplied power to the system circuit 150 through the path 163, so that the electronic device 100 is not powered off when the path 160 is disconnected. It should be noted that, for a manner in which the external power supply 200 provides the charging current for the battery 110 through the path 164, refer to specific descriptions in the foregoing embodiments. Details are not described herein again.

In some embodiments, before the external power supply 200 separately supplies power to the system circuit 150 through the path 163 and charges the battery 110 through the path 164, the processing circuit 152 may control the output voltage V13 of the second end of the first switch module 130 to be not higher than the output voltage V22 of the charging module 172 after the output voltage V131 of the first voltage transformation circuit 131 passes through the first switch module 130. This avoids a case in which the first voltage transformation circuit 131 enables overcurrent protection and cannot work normally. For details, refer to the descriptions in the foregoing other embodiments. Details are not described herein again.

In some embodiments, the control module 171 may further control a working status of the charging module 172. The processing circuit 152 may output a signal to the control module 171 through the signal circuit C5. In response to the signal, the control module 171 may output a signal to the charging module 172 to control the charging module 172 to output a voltage and a current to the power management module 140, so that the external power supply 200 may supply power to the system circuit 150 through the path 163.

In some embodiments, when the external power supply 200 separately supplies power to the system circuit 150 through the path 163 and charges the battery 110 through the path 164, and a system load of the electronic device 100 is high, the processing circuit 152 detects that an output current of the battery 110 is greater than a first preset current threshold, the output voltage and the output current of the external power supply 200 may be all supplied to the system circuit 150, and the battery 110 may supply power to the system circuit 150 through the path 160. In other words, the system circuit 150 may obtain input currents through both the path 160 and the path 163, so that the electronic device 100 can support a higher system load.

Figure 3A:
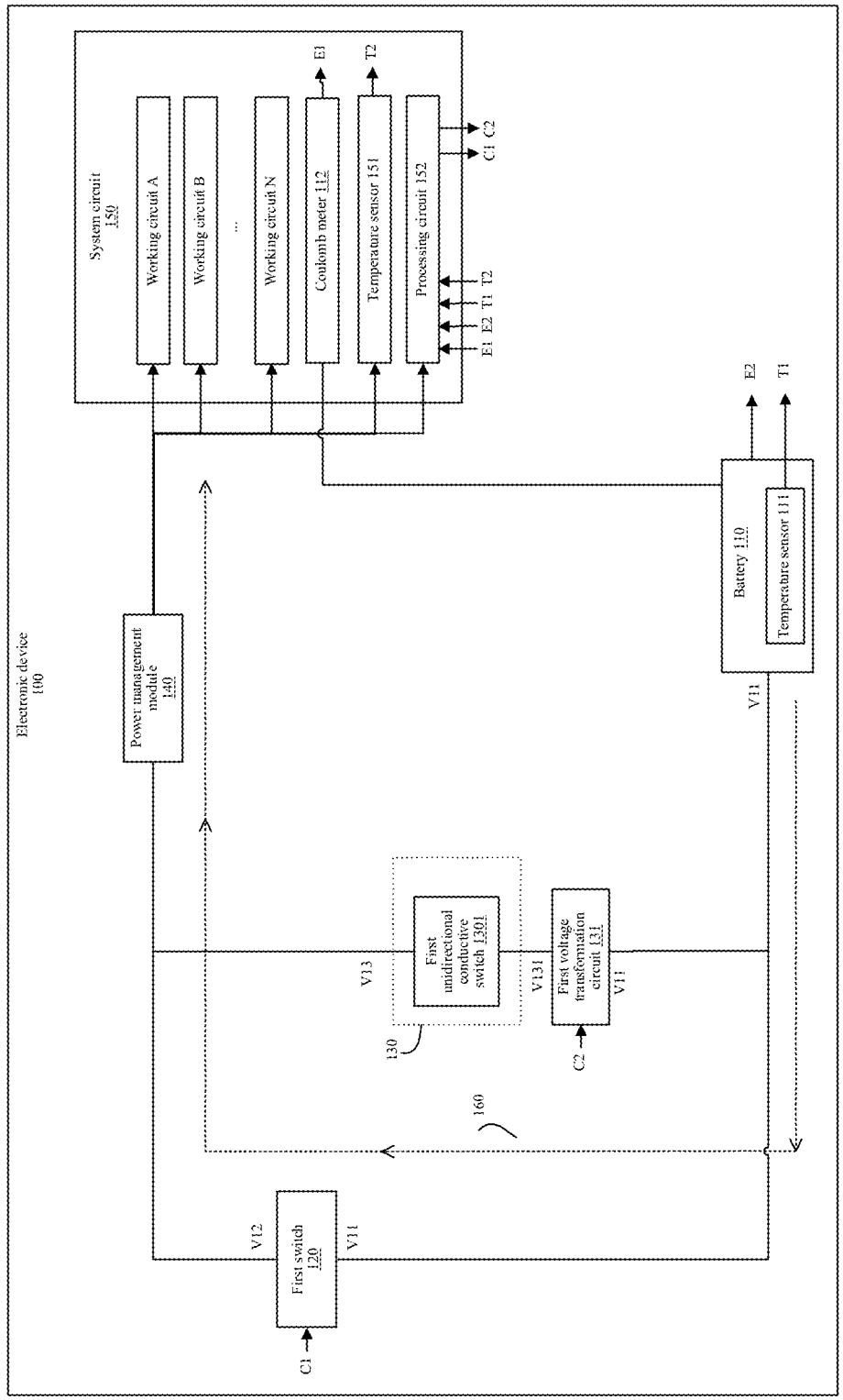
FIG. 3A and FIG. 3B are diagrams of structures of another group of electronic devices according to an embodiment of this disclosure.
Figure 3B:
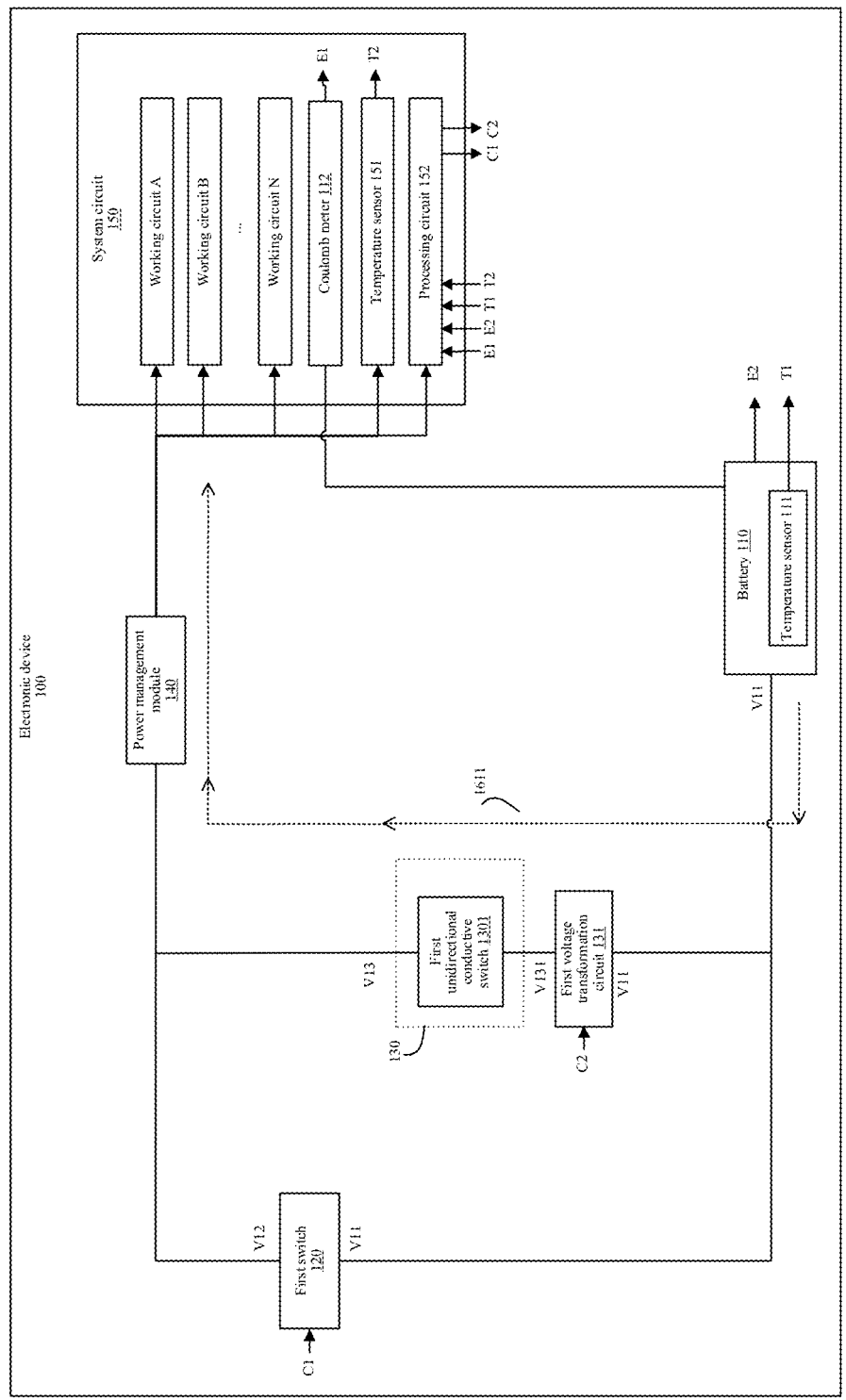

FIG. 3A and FIG. 3B each are a diagram of a structure of another electronic device according to an embodiment of this disclosure. FIG. 3A and FIG. 3B show an implementation of the first switch module 130 in FIG. 1A to FIG. 1C. Based on the electronic device 100 shown in FIG. 1A to FIG. 1C, the first switch module 130 may include a first unidirectional conductive switch 1301. A battery 110 may be electrically connected to an input end of the first voltage transformation circuit 131, a first output end of the first voltage transformation circuit 131 may be electrically connected to a first end of the first unidirectional conductive switch 1301, and a second end of the first unidirectional conductive switch 1301 may be electrically connected to an input end of the power management module 140.

As shown in FIG. 3A, the battery 110 may supply power to the system circuit 150 through a path 160. When the processing circuit 152 detects that the electronic device 100 meets a first condition, the processing circuit 152 may control the first voltage transformation circuit 131 to work. After performing voltage conversion on a voltage of the battery, the first voltage transformation circuit 131 may output a voltage V131 through the first output end. The first unidirectional conductive switch 1301 may have unidirectional conductivity, and a unidirectional conduction direction of the first unidirectional conductive switch 1301 is a direction from the first voltage transformation circuit 131 to the power management module 140. When the voltage V131 output by the first output end of the first voltage transformation circuit 131 is higher than a positive conduction voltage of the first unidirectional conductive switch 1301, the first unidirectional conductive switch 1301 is turned on, and the first output end of the first voltage transformation circuit 131 may provide an input voltage V13 for the power management module 140 through the first unidirectional conductive switch 1301. Then, the power management module 140 performs voltage conversion, to supply power to the system circuit 150. For example, as shown in FIG. 3B, the battery 110 may supply power to the system circuit 150 through a path 1611, where the path 1611 indicates a current flow direction from the battery 110 to the system circuit 150 through the first voltage transformation circuit 131, the first unidirectional conductive switch 1301, and the power management module 140. The battery 110 may be coupled to the system circuit 150 through the first voltage transformation circuit 131, the first unidirectional conductive switch 1301, and the power management module 140, to supply power to the electronic device 100. When the path 1611 is connected, the first unidirectional conductive switch 1301 may be used. This avoids a case in which an output current of the battery 110 is excessively large and exceeds an overcurrent threshold of the battery 110 when an output voltage V12 of the first switch 120 is higher than the output voltage V13 of the second end of the first unidirectional conductive switch 1301, avoids overcurrent protection of the battery 110, and further prevents the electronic device 100 from being powered off. It should be noted that, in this embodiment of this disclosure, for the first condition, the power management module 140, and the system circuit 150, refer to related descriptions in the foregoing other embodiments. Details are not described herein again.

In this embodiment of this disclosure, when the path 160 is in a connected state, and before the path 1611 is connected, the processing circuit 152 may control the output voltage V13 of the second end of the first unidirectional conductive switch 1301 to be lower than or equal to the voltage V12 output by the second end of the first switch 120 after the output voltage V131 of the first voltage transformation circuit 131 passes through the first unidirectional conductive switch 1301. This avoids a case in which when the path 1611 is connected, V13 is higher than V12, the output current of the first voltage transformation circuit 131 is excessively large; further, the first voltage transformation circuit 131 enables overcurrent protection; and consequently the electronic device 100 is powered off because the battery 110 is in a low-voltage state in this case. A voltage obtained after the output voltage V131 of the first voltage transformation circuit 131 passes through the first unidirectional conductive switch 1301 needs to be higher than a second preset voltage threshold, to ensure that after the first switch 120 is turned off, the output voltage V13 of the first unidirectional conductive switch 1301 can ensure normal working of the electronic device 100, and the electronic device 100 is not powered off because the first switch 120 is turned off.

When the path 160 and the path 1611 are turned on, the battery 110 supplies power to the system circuit 150 through the path 1611, the processing circuit 152 may control the first switch 120 to be turned off, and the battery 110 stops supplying power to the system circuit 150 through the path 160. Before the battery 110 stops supplying power to the system circuit 150 through the path 160, the battery 110 has supplied power to the system circuit 150 through the path 1611, so that the electronic device 100 is not powered off because the first switch 120 is turned off.

For example, in the foregoing embodiment, when the battery 110 supplies power to the system circuit 150 through the path 160, and the processing circuit 152 detects that the electronic device 100 meets the first condition, the first condition includes that a voltage of the battery 110 is not higher than a first preset voltage threshold. For example, the second preset voltage threshold is 3.4 V, and the first preset voltage threshold is 3.5 V. When the processing circuit detects that an output voltage of the battery 110 is 3.5 V, the processing circuit 152 first controls the first voltage transformation circuit 131 to work. Because a voltage drop of the first unidirectional conductive switch 1301 is 0.7 V, the processing circuit 152 controls the output voltage of the first voltage transformation circuit 131 to be 4.2 V. In this case, after the output voltage of the first voltage transformation circuit 131 passes through the first unidirectional conductive switch 1301, the output voltage of the first unidirectional conductive switch 1301 is 3.5 V, so that the battery 110 may supply power to the system circuit 150 through the path 1611. Then, the processing circuit 152 controls the first switch 120 to be turned off. Because the processing circuit 152 controls the output voltage of the first unidirectional conductive switch 1301 to be 3.5 V, the electronic device 100 can work normally.

As shown in FIG. 3B, when the battery 110 supplies power to the system circuit 150 through the path 1611, and the processing circuit 152 detects that the electronic device 100 meets a second condition, the processing circuit 152 may control, through a signal circuit C1, the first switch 120 to be turned on. In response to that an input signal of a control end of the first switch 120 is a turn-on signal, the first switch 120 is turned on. For example, as shown in FIG. 3A, the path 160 is connected. When the path 160 is connected, the first unidirectional conductive switch 1301 with unidirectional conductivity may be used. This avoids a case in which an output current of the battery 110 is excessively large and exceeds an overcurrent threshold of the battery 110 when an output voltage V12 of the first switch 120 is higher than the output voltage V13 of the second end of the first unidirectional conductive switch 1301, avoids overcurrent protection of the battery 110, and further prevents the electronic device from being powered off. It should be noted that, for the second condition, refer to specific descriptions in the foregoing embodiments. Details are not described herein again.

In this embodiment of this disclosure, when the path 1611 is connected, and before the battery 110 supplies power to the system circuit 150 through the path 160, the processing circuit 152 may control the output voltage V13 of the first unidirectional conductive switch 1301 to be lower than or equal to the output voltage V12 of the first switch 120 after the output voltage V131 of the first voltage transformation circuit 131 passes through the first unidirectional conductive switch 1301. This avoids a case in which when the first switch 120 is turned on, the output current of the first voltage transformation circuit 131 exceeds the overcurrent threshold of the first voltage transformation circuit 131, and consequently the first voltage transformation circuit 131 enables overcurrent protection and cannot work normally. For a manner of preventing the first voltage transformation circuit 131 from enabling overcurrent protection, refer to descriptions in the foregoing other embodiments. Details are not described herein again.

In this embodiment of this disclosure, when the path 160 is connected, the processing circuit 152 may control, through a signal circuit C2, the first voltage transformation circuit 131 to be disconnected. In response to that an input signal of a control end of the first voltage transformation circuit 131 is a disconnected signal, the first voltage transformation circuit 131 is disconnected, and the path 1611 is disconnected. Before the path 1611 is disconnected, the first switch 120 has been turned on, the path 160 is connected, and the battery 110 may supply power to the system circuit 150 through the path 160, so that the electronic device 100 is not powered off because the path 1611 is disconnected.

Figure 4A:
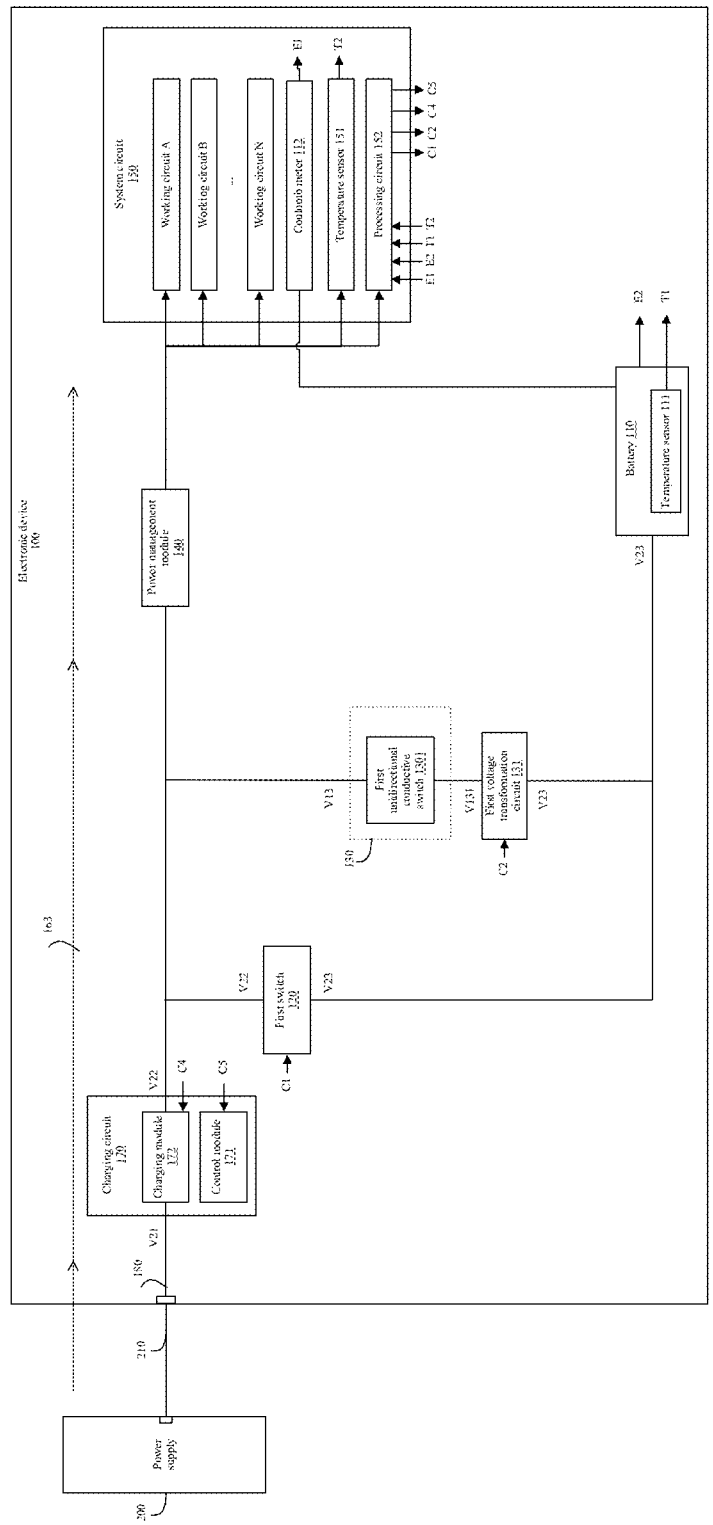
FIG. 4A to FIG. 4C are diagrams of structures of another group of electronic devices according to an embodiment of this disclosure.
Figure 4B:
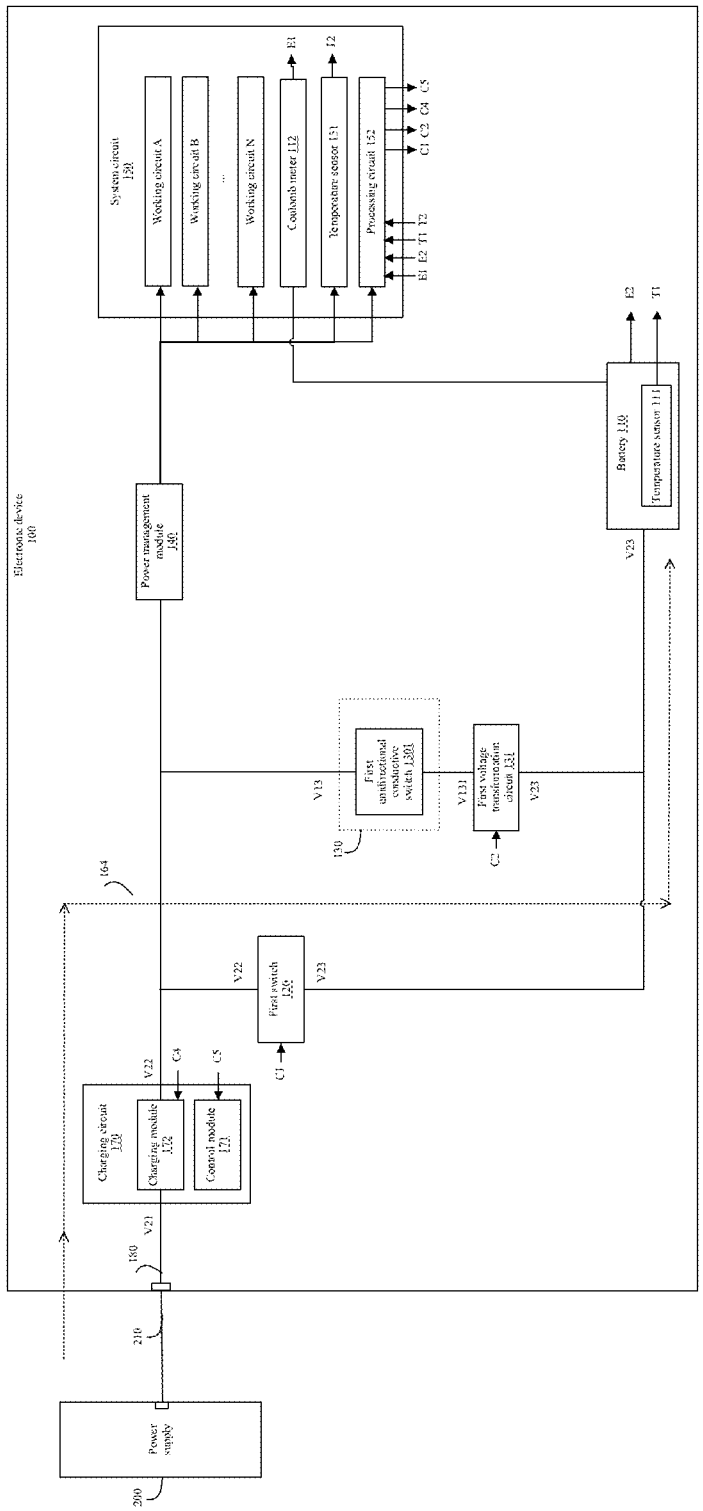
Figure 4C:
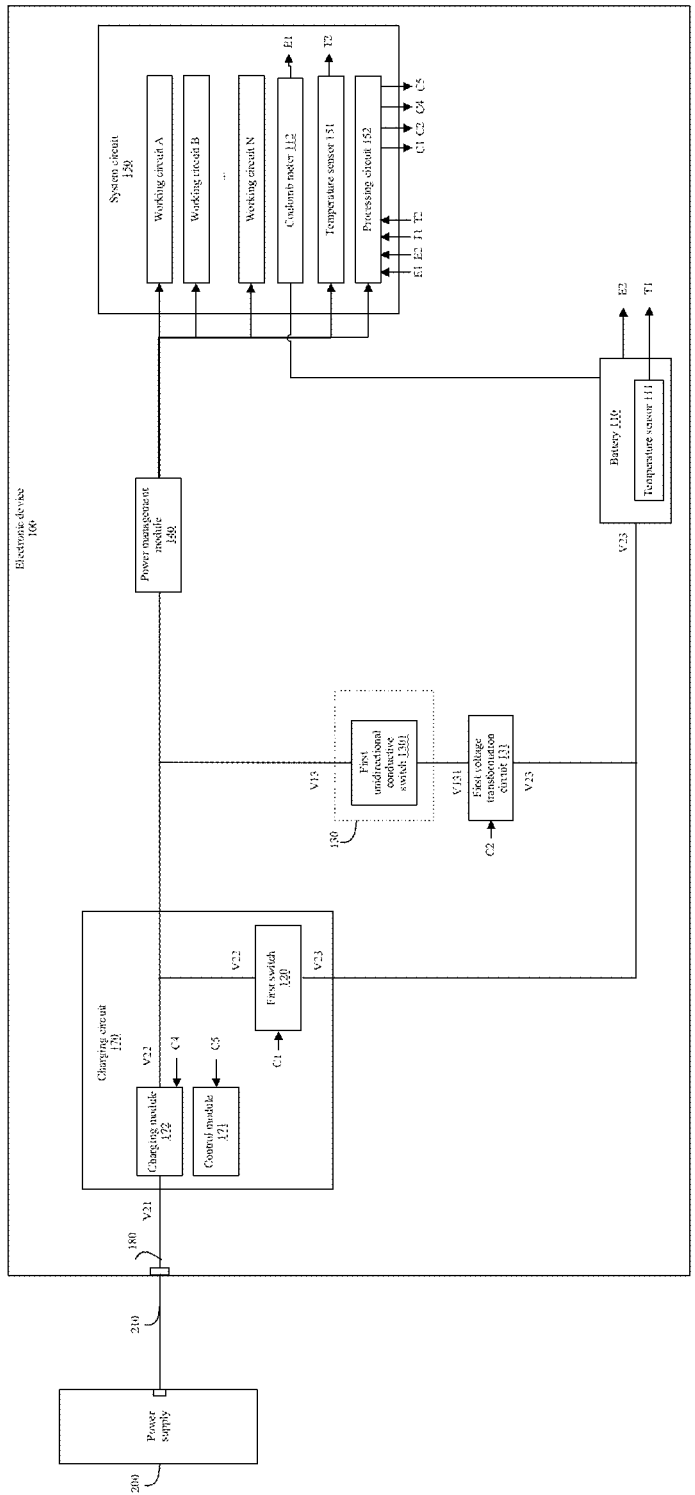

FIG. 4A to FIG. 4C each are a diagram of a structure of another electronic device according to an embodiment of this disclosure. As shown in FIG. 4A to FIG. 4C, based on the electronic device 100 shown in FIG. 3A and FIG. 3B, the electronic device 100 may further include a charging circuit 170 and an external power supply interface 180. The charging circuit 170 may include a control module 171 and a charging module 172. The electronic device 100 may further be connected to an external power supply 200, and the external power supply 200 may be electrically connected to the electronic device 100 through the external power supply interface 180. The external power supply 200 may be electrically connected to the charging module 172 through the external power supply interface 180, and the external power supply 200 may be coupled to the charging module 172 through one or more conducting wires 210 (for example, a cable) to supply power to the charging module 172. The processing circuit 152 may be electrically connected to the control module 171 and the charging module 172, and the processing circuit 152 may control working statuses of the charging module 172 and the control module 171.

In this embodiment of this disclosure, the charging circuit 170 may include an integrated charging chip.

In this embodiment of this disclosure, the external power supply 200 may be a charger, or the external power supply 200 may be a portable charging device.

In this embodiment of this disclosure, as shown in FIG. 4C, the first switch 120 may be alternatively disposed in the charging circuit 170, so that an area of a circuit board occupied by the first switch 120 can be reduced, and more electronic components can be placed on the circuit board.

As shown in FIG. 4A to FIG. 4C, when the electronic device 100 is connected to the external power supply 200, the external power supply 200 may be electrically connected to the charging module 172, and the external power supply 200 may provide a voltage V21 for the charging module 172. The charging module 172 may be electrically connected to an input end of the power management module 140, and an output end of the power management module 140 may be electrically connected to the system circuit 150.

In a possible embodiment, when the battery 110 supplies power to the system circuit 150 through a path 1611, and the processing circuit 152 detects that the external power supply 200 is connected, the processing circuit 152 may control, through a signal circuit C4, the charging module 172 to work. In response to that an input signal of a control end of the charging module 172 is a working signal, the charging module 172 works, and the charging module 172 may provide a voltage V22 for the power management module 140. Then, the power management module 140 performs voltage conversion to supply power to the system circuit 150. For example, as shown in FIG. 4A, the external power supply 200 may supply power to the system circuit 150 through a path 163.

In this embodiment of this disclosure, when the path 1611 is connected, and before the external power supply 200 supplies power to the system circuit 150 through the path 163, it needs to be ensured that an output current of the first voltage transformation circuit 131 cannot exceed an overcurrent threshold of the first voltage transformation circuit 131 when the external power supply 200 supplies power to the system circuit 150 through the path 163. In the solution provided in this embodiment of this disclosure, before the path 163 is connected, the processing circuit 152 may control, to be not higher than the output voltage V22 of the charging module 172, an output voltage V13 that is of the first unidirectional conductive switch 1301 and that is obtained after an output voltage V131 of the first voltage transformation circuit 131 passes through the first unidirectional conductive switch 1301. This avoids a case in which when the voltage V13 is higher than the voltage V22 after the external power supply 200 supplies power to the system circuit 150 through the path 163, because the first unidirectional conductive switch 1301 is electrically connected to the charging module 172 through a wire, and an impedance of the wire is small, an output current of the first unidirectional conductive switch 1301 is excessively large; further, the output current of the first voltage transformation circuit 131 is excessively large and exceeds the overcurrent threshold of the first voltage transformation circuit 131; and consequently the first voltage transformation circuit 131 enables overcurrent protection and cannot work normally.

In this embodiment of this disclosure, the external power supply 200 may be electrically connected to the charging module 172, the charging module 172 may be electrically connected to the first switch 120, and the first switch 120 may be electrically connected to the battery 110. When the external power supply 200 supplies power to the system circuit 150 through the path 163, the processing circuit 152 may control, through a signal circuit C1, the first switch 120 to be turned on. For example, as shown in FIG. 4B, the external power supply 200 may also provide a charging current for the battery 110 through a path 164. For a manner in which the external power supply 200 provides the charging current for the battery 110 through the path 164, refer to specific descriptions in the foregoing other embodiments. Details are not described herein again.

In some embodiments, the control module 171 may further control a working status of the first switch 120. The processing circuit 152 may control the control module 171 through a signal circuit C5, so that the control module 171 may control the first switch 120 to be turned on. When the first switch 120 is turned on, the external power supply 200 may also provide the charging current for the battery 110 through the path 164.

In some embodiments, when the external power supply 200 separately supplies power to the system circuit 150 through the path 163 and charges the battery 110 through the path 164, and a system load of the electronic device 100 is high, the processing circuit 152 detects that an output current of the battery 110 is greater than a first preset current threshold, an output voltage and an output current of the external power supply 200 may be all supplied to the system circuit 150, and the battery 110 may also supply power to the system circuit 150 through the path 160. In other words, the system circuit 150 may obtain input currents through both the path 160 and the path 163, so that the electronic device 100 can support a higher system load.

In this embodiment of this disclosure, when the path 163 is connected, the processing circuit 152 may control, through a signal circuit C2, the first voltage transformation circuit 131 to be disconnected, and then control the path 1611 to be disconnected. Before the path 1611 is disconnected, the external power supply 200 has supplied power to the system circuit 150 through the path 163, so that the electronic device 100 is not powered off when the path 1611 is disconnected.

In another possible embodiment, when the battery 110 supplies power to the system circuit 150 through the path 1611, and the processing circuit 152 detects that the external power supply 200 is connected, the processing circuit 152 may control, through the signal circuit C1, the first switch 120 to be turned on. In response to that an input signal of a control end of the first switch 120 is a turn-on signal, the first switch 120 is turned on. For example, as shown in FIG. 3A, the path 160 is connected, and the battery 110 may supply power to the system circuit 150 through the path 160.

In this embodiment of this disclosure, when the path 1611 is connected, because when the first switch 120 is turned on, the first switch 120 is used as a switch, and an impedance of the first switch 120 is small or even ignored, an output voltage of a second end of the first switch circuit 120 may be considered as the same as an output voltage V11 of the battery 110. Therefore, in the solution provided in this embodiment of this disclosure, before the battery 110 supplies power to the system circuit 150 through the path 160, the processing circuit 152 may output a signal to the first voltage transformation circuit 131 to control the output voltage V13 of a second end of the first unidirectional conductive switch to be not higher than the output voltage V11 of the battery 110 after the output voltage V131 of the first voltage transformation circuit 131 passes through the first unidirectional conductive switch 1301. This avoids a case in which when the first switch 120 is turned on, the voltage V13 is higher than the voltage V12, resulting in an excessively large output current of the first voltage transformation circuit 131; further, the output current of the first voltage transformation circuit 131 exceeds the overcurrent threshold of the first voltage transformation circuit 131; and consequently the first voltage transformation circuit 131 enables overcurrent protection and cannot work normally.

In this embodiment of this disclosure, the control module 171 may further control a working status of the first switch 120. The processing circuit 152 may control the control module 171 through the signal circuit C5, so that the control module 171 may control the first switch 120 to be turned on. When the first switch 120 is turned on, the battery 110 may supply power to the system circuit 150 through the path 160.

In this embodiment of this disclosure, when both the path 160 and the path 1611 are connected, for example, as shown in FIG. 4A, the external power supply 200 may supply power to the system circuit 150 through the path 163. The external power supply 200 may be electrically connected to the charging module 172, the charging module 172 may be electrically connected to the first switch 120, and the first switch 120 may be electrically connected to the battery 110. When the external power supply 200 may supply power to the system circuit 150 through the path 163, for example, as shown in FIG. 4B, the external power supply 200 may provide a charging current for the battery 110 through the path 164. In this case, the path 160 is disconnected. Before the battery 110 stops supplying power to the system circuit 150 through the path 160, the battery 110 has supplied power to the system circuit 150 through the path 163, so that the electronic device 100 is not powered off when the path 160 is disconnected. It should be noted that, for a manner in which the external power supply 200 separately supplies power to the system circuit 150 through the path 163 and provides the charging current for the battery 110 through the path 164, refer to specific descriptions in the foregoing embodiments. Details are not described herein again.

In some embodiments, before the external power supply 200 separately supplies power to the system circuit 150 through the path 163 and charges the battery 110 through the path 164, the processing circuit 152 may control the output voltage V13 of the second end of the first unidirectional conductive switch 1301 to be not higher than the output voltage V22 of the charging module 172 after the output voltage V131 of the first voltage transformation circuit 131 passes through the first unidirectional conductive switch 1301. This avoids a case in which the first voltage transformation circuit 131 enables overcurrent protection and cannot work normally. When both the path 163 and the path 164 are connected, the processing circuit 152 may further control, through the signal circuit C2, the first voltage transformation circuit 131 to be disconnected, and then control the path 1611 to be disconnected. Before the path 1611 is disconnected, the battery 110 has supplied power to the system circuit 150 through the path 163, so that the electronic device 100 is not powered off when the path 1611 is disconnected. For a specific manner of preventing the first voltage transformation circuit 131 from enabling overcurrent protection, refer to descriptions in the foregoing other embodiments. Details are not described herein again.

In some embodiments, when both the path 160 and the path 1611 are connected, and before the path 163 and the path 164 are connected, the processing circuit 152 may control, through the signal circuit C2, the first voltage transformation circuit 131 to be disconnected, and then control the path 1611 to be disconnected. Before the path 1611 is disconnected, the battery 110 has supplied power to the system circuit 150 through the path 160, so that the electronic device 100 is not powered off when the path 1611 is disconnected.

In some embodiments, the control module 171 may further control a working status of the charging module 172. The processing circuit 152 may output a signal to the control module 171 through the signal circuit C5. In response to the signal, the control module 171 may output a signal to the charging module 172 to control the charging module 172 to output a voltage and a current to the power management module 140, so that the external power supply 200 may supply power to the system circuit 150 through the path 163.

In some embodiments, when the external power supply 200 separately supplies power to the system circuit 150 through the path 163 and charges the battery 110 through the path 164, and a system load of the electronic device 100 is high, the processing circuit 152 detects that an output current of the battery 110 is greater than a first preset current threshold, the output voltage and the output current of the external power supply 200 may be all supplied to the system circuit 150, and the battery 110 may supply power to the system circuit 150 through the path 160. In other words, the system circuit 150 may obtain input currents through both the path 160 and the path 163, so that the electronic device 100 can support a higher system load.

Figure 5A:
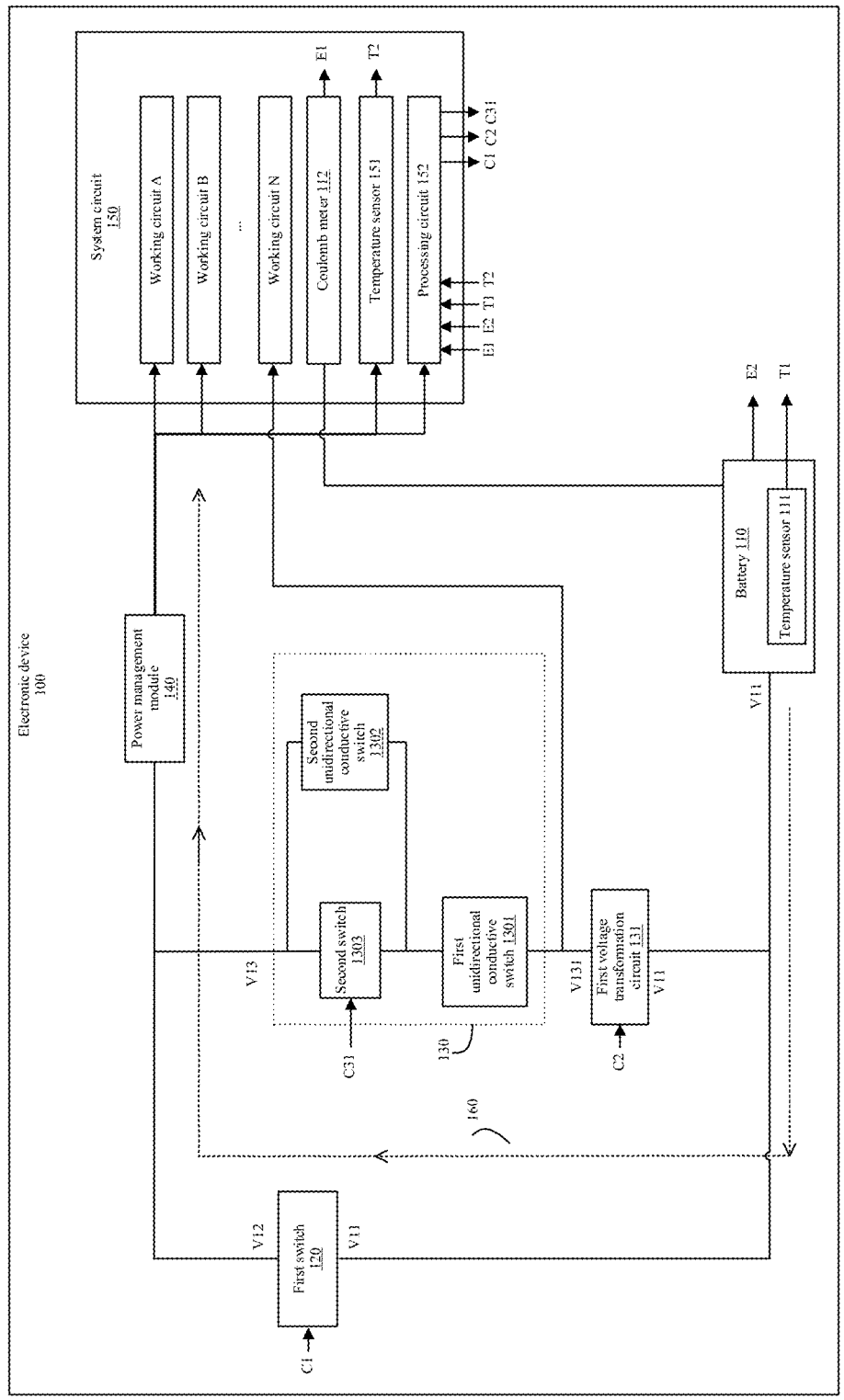
FIG. 5A to FIG. 5C are diagrams of structures of another group of electronic devices according to an embodiment of this disclosure.
Figure 5B:
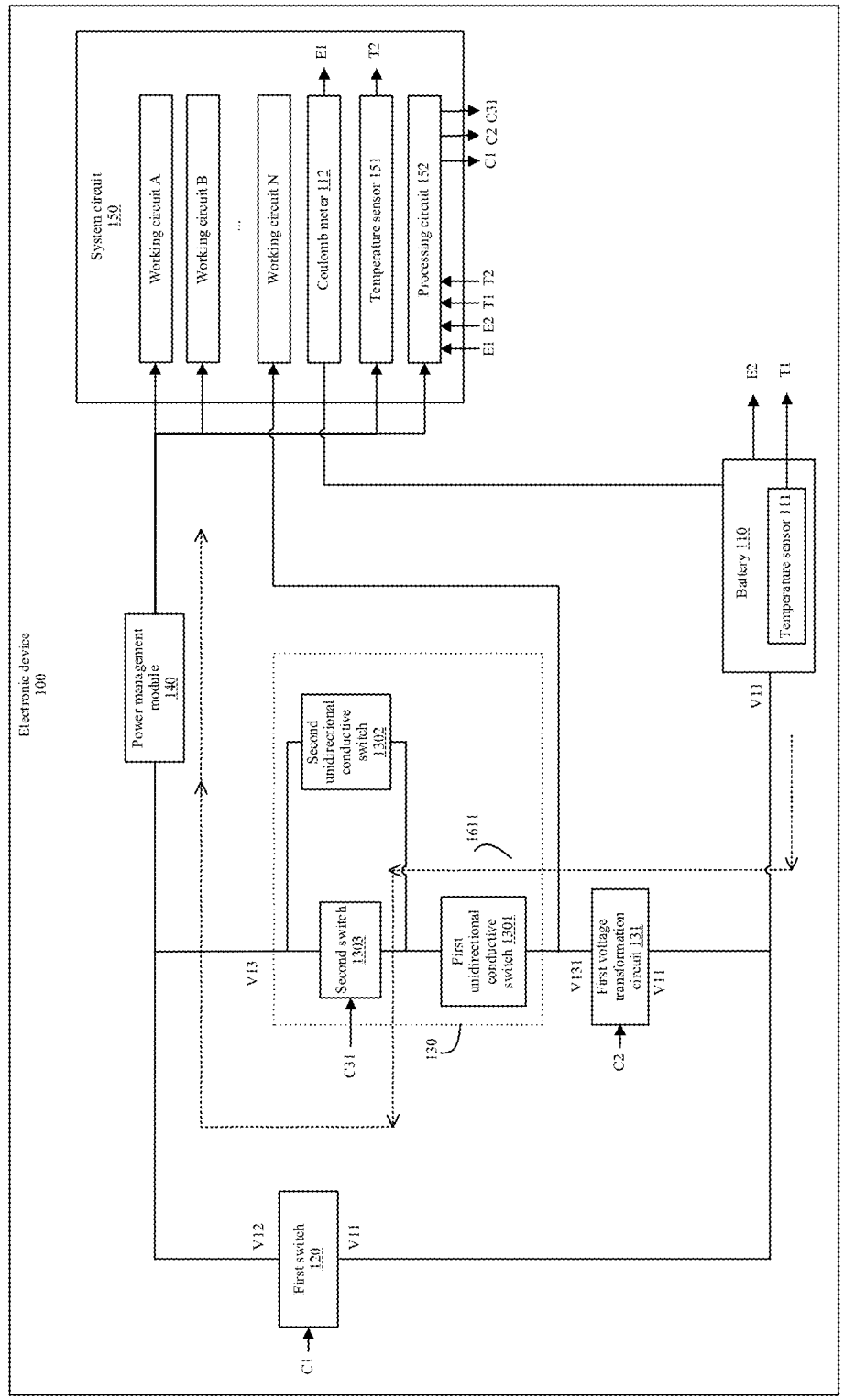
Figure 5C:
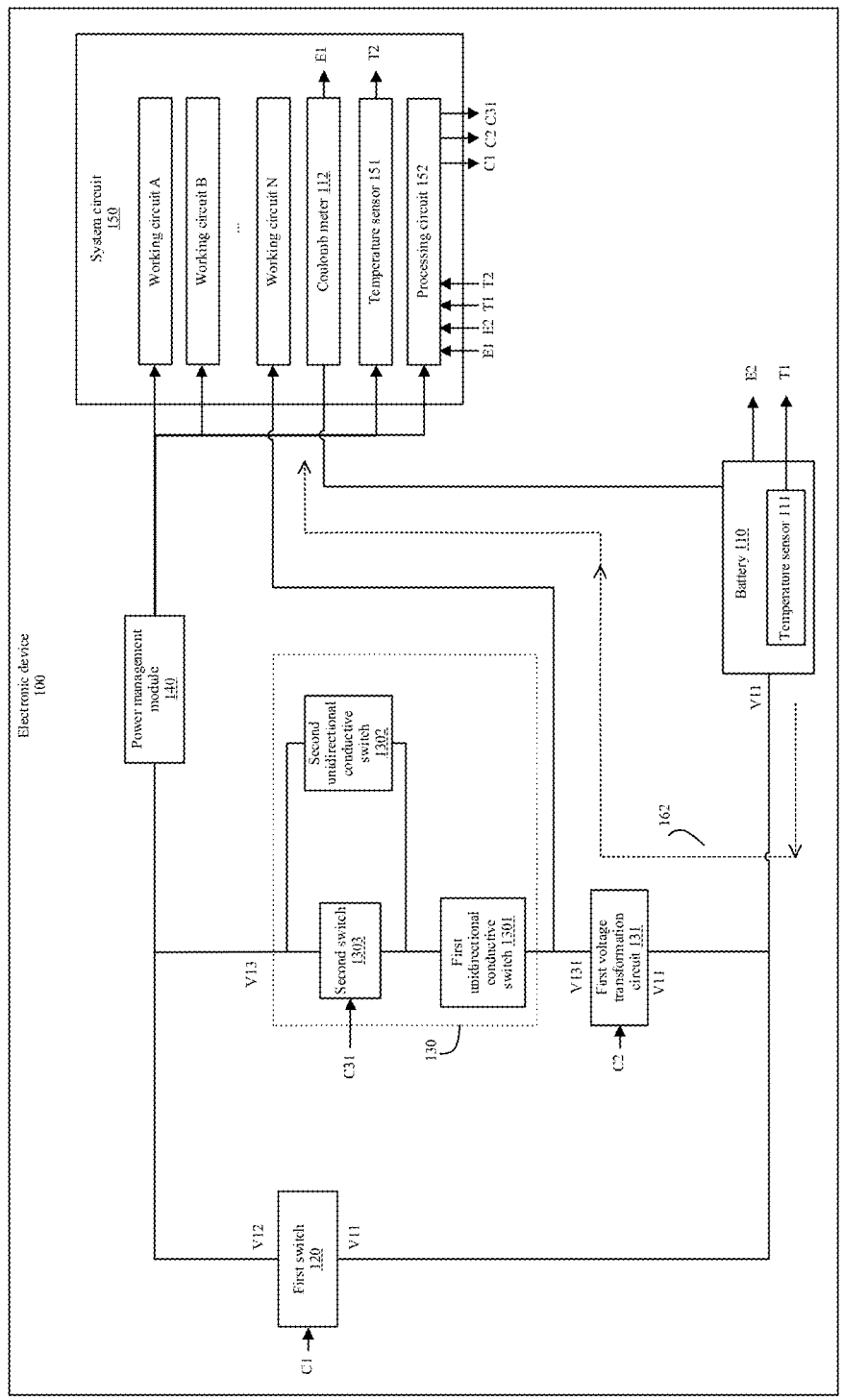

A first output end of the first voltage transformation circuit 131 may also be electrically connected to some working circuits of the system circuit 150 directly. After the output voltage V131 of the first output end of the first voltage transformation circuit 131 passes through the first unidirectional conductive switch 1301, the output voltage is higher than the output voltage V12 of the first switch 120, resulting in overcurrent protection of the first voltage transformation circuit 131. Therefore, in some embodiments, the electronic device 100 further includes a second switch 1303 and a second unidirectional conductive switch 1302. FIG. 5A to FIG. 5C each are a diagram of a structure of another electronic device according to an embodiment of this disclosure. FIG. 5A to FIG. 5C show another implementation of the first switch module 130 in FIG. 1A to FIG. 1C. Based on the electronic device 100 shown in FIG. 3A and FIG. 3B, the first switch module 130 may further include a second switch 1303 and a second unidirectional conductive switch 1302. The second switch 1303 is electrically connected in series to a path 1611, the second unidirectional conductive switch 1302 is electrically connected in parallel to the second switch 1303, a first end of the second switch 1303 is electrically connected to a first end of the second unidirectional conductive switch 1302, a second end of the second switch 1303 is electrically connected to a second end of the second unidirectional conductive switch 1302.

In this embodiment of this disclosure, the second unidirectional conductive switch 1302 may be a part of the second switch 1303, so that an area of a circuit board occupied by the second unidirectional conductive switch 1302 can be reduced, and more electronic components can be placed on the circuit board.

It should be noted that the processing circuit 152 may include one or more processing units, and the processing circuit 152 may control, through a signal circuit C31, the second switch 1303 to be turned on or turned off. In response to that an input signal of a control end of the second switch 1303 is a turn-off signal (for example, the turn-off signal received by the control end of the second switch 1303 may be a signal output by the processing circuit 152, or may be a signal generated based on a signal output by the processing circuit 152), the second switch 1303 is turned off, or in response to that an input signal of a control end of the second switch 1303 is a turn-on signal (for example, the turn-on signal received by the control end of the second switch 1303 may be a signal output by the processing circuit 152, or may be a signal generated based on a signal output by the processing circuit 152), the first switch 120 is turned on. For ease of description, that the processing circuit 152 may control, through the signal circuit C31, the second switch 1303 to be turned on or turned off, and in response to that the input signal of the control end of the second switch 1303 is the turn-on signal or the turn-off signal, the second switch 1303 is turned on or turned off is used as a uniform description in the following embodiments.

Based on the path 1611 shown in FIG. 3B, for example, as shown in FIG. 5B, the path 1611 further includes the second switch 1303, where the second switch 1303 is electrically connected in series to the path 1611. The path 1611 is configured to indicate a current flow direction from the battery 110 to the system circuit 150 through the first voltage transformation circuit 131, the first unidirectional conductive switch 1301, the second switch 1303, and the power management module 140.

A path 160 shown in FIG. 5A and the path 160 shown in FIG. 3A are a same path. As shown in FIG. 5A, when the path 160 is connected, and the processing circuit 152 detects that the electronic device 100 meets a first condition, the processing circuit 152 may control an output voltage V131 of the first voltage transformation circuit 131 to be higher than a forward turn-on voltage of the first unidirectional conductive switch 1301, and the first unidirectional conductive switch 1301 is turned on. The processing circuit 152 may control, through the signal circuit C31, the second switch 1303 to be turned on. In response to that the input signal of the control end of the second switch 1303 is the turn-on signal, the second switch 1303 is turned on, the path 1611 is connected, and a first output end of the first voltage transformation circuit 131 may provide an input voltage V13 for the power management module 140 through the first unidirectional conductive switch 1301 and the second switch 1303. Then, the power management module 140 performs voltage conversion to supply power to the system circuit 150. For example, as shown in FIG. 5B, the battery 110 may supply power to the system circuit 150 through the path 1611. When the path 1611 is connected, the first unidirectional conductive switch 1301 with unidirectional conductivity may be used. This avoids a case in which an output current of the battery 110 is excessively large and exceeds an overcurrent threshold of the battery 110 when an output voltage V12 of the first switch 120 is higher than the output voltage V13 obtained after the output voltage of the first output end of the first voltage transformation circuit 131 passes through the first unidirectional conductive switch 1301 and the second switch 1303, resulting in overcurrent protection of the battery 110. Further, the electronic device 100 is not powered off. It should be noted that, in this embodiment of this disclosure, for the first condition, the power management module 140, and the system circuit 150, refer to related descriptions in the foregoing other embodiments. Details are not described herein again.

In this embodiment of this disclosure, when the path 160 is in a connected state, and before the path 1611 is connected, the processing circuit 152 may control the output voltage V13 to be lower than or equal to the voltage V12 output by the second end of the first switch 120 after the output voltage V131 of the first voltage transformation circuit 131 passes through the first unidirectional conductive switch 1301 and the second switch 1303. This avoids a case in which when the path 1611 is connected, V13 is higher than V12, the output current of the first voltage transformation circuit 131 is excessively large; further, the first voltage transformation circuit 131 enables overcurrent protection; and consequently the electronic device 100 is powered off because the battery 110 is in a low-voltage state in this case.

When the path 160 and the path 1611 are turned on, the battery 110 supplies power to the system circuit 150 through the path 1611, the processing circuit 152 may control the first switch 120 to be turned off, and the battery 110 stops supplying power to the system circuit 150 through the path 160. Before the battery 110 stops supplying power to the system circuit 150 through the path 160, the battery 110 has supplied power to the system circuit 150 through the path 1611, so that the electronic device 100 is not powered off because the first switch 120 is turned off.

In this embodiment of this disclosure, an output voltage obtained after the output voltage V131 of the first voltage transformation circuit 131 passes through the first unidirectional conductive switch 1301 and the second switch 1303 needs to be higher than a second preset voltage threshold, to ensure that after the first switch 120 is turned off, the output voltage V13 can ensure normal working of the electronic device 100, and the electronic device 100 is not powered off because the first switch 120 is turned off.

As shown in FIG. 5A to FIG. 5C, the battery 110 is electrically connected to an input end of the first voltage transformation circuit 131, and the first output end of the first voltage transformation circuit 131 may be electrically connected to some circuits of the system circuit 150. The first output end of the first voltage transformation circuit 131 outputs the voltage V131, and the battery 110 may also supply power to some circuits of the system circuit 150 through the first output end of the first voltage transformation circuit 131. For example, as shown in FIG. 5C, the battery 110 may supply power to some circuits of the system circuit 150 through a path 162. The path 162 indicates a current flow direction from the battery 110 to the system circuit 150 through the first voltage transformation circuit 131. An output voltage and current of the battery 110 may be coupled to the system circuit 150 through the first voltage transformation circuit 131. Because the battery 110 directly supplies power to some circuits of the system circuit 150 through the first voltage transformation circuit 131, and the power management module 140 does not need to perform voltage conversion, a power loss caused by working of an electronic component in the power management module 140 when the power management module 140 performs voltage conversion is reduced, and utilization of power output by the battery 110 can be improved.

For example, in the foregoing embodiment, when the battery 110 supplies power to the system circuit 150 through the path 160, and the processing circuit 152 detects that the electronic device 100 meets the first condition, the first condition includes that a voltage of the battery 110 is not higher than a first preset voltage threshold. For example, the second preset voltage threshold is 3.4 V, and the first preset voltage threshold is 3.5 V. When the processing circuit detects that an output voltage of the battery 110 is 3.5 V, the processing circuit 152 first controls the first voltage transformation circuit 131 to work and the second switch 1303 to be turned on. Because a voltage drop of the first unidirectional conductive switch 1301 is 0.7 V, the processing circuit 152 controls the output voltage of the first voltage transformation circuit 131 to be 4.2 V. In this case, after the output voltage of the first voltage transformation circuit 131 passes through the first unidirectional conductive switch 1301 and the second switch 1303, the output voltage is 3.5 V, so that the battery 110 may supply power to the system circuit 150 through the path 1611. Then, the processing circuit 152 controls the first switch 120 to be turned off. Because the processing circuit 152 controls the output voltage to be 3.5 V after the output voltage of the first voltage transformation circuit 131 passes through the first unidirectional conductive switch 1301 and the second switch 1303, the electronic device 100 can work normally.

As shown in FIG. 5B, when the battery 110 supplies power to the system circuit 150 through the path 1611, and the processing circuit 152 detects that the electronic device 100 meets a second condition, the processing circuit 152 may control, through a signal circuit C1, the first switch 120 to be turned on. In response to that an input signal of a control end of the first switch 120 is a turn-on signal, the first switch 120 is turned on. For example, as shown in FIG. 5A, the path 160 is connected. When the path 160 is connected, the first unidirectional conductive switch 1301 with unidirectional conductivity may be used. This avoids a case in which an output current of the battery 110 is excessively large and exceeds an overcurrent threshold of the battery 110 when an output voltage V12 of the first switch 120 is higher than the output voltage V13 obtained after the output voltage of the first voltage transformation circuit 131 passes through the first unidirectional conductive switch 1301 and the second switch 1303, resulting in overcurrent protection of the battery 110. Further, the electronic device is not powered off. It should be noted that, for the second condition, refer to specific descriptions in the foregoing embodiments. Details are not described herein again.

In this embodiment of this disclosure, when the path 1611 is connected, and before the battery 110 supplies power to the system circuit 150 through the path 160, the processing circuit 152 may control, to be lower than or equal to the output voltage V12 of the first switch 120, the output voltage V13 obtained after the output voltage V131 of the first voltage transformation circuit 131 passes through the first unidirectional conductive switch 1301 and the second switch 1303. This avoids a case in which when the first switch 120 is turned on, the output current of the first voltage transformation circuit 131 exceeds the overcurrent threshold of the first voltage transformation circuit 131, and consequently the first voltage transformation circuit 131 enables overcurrent protection and cannot work normally.

In this embodiment of this disclosure, the battery 110 is electrically connected to the input end of the first voltage transformation circuit 131, and the first output end of the first voltage transformation circuit 131 may be electrically connected to some circuits of the system circuit 150. When the second switch 1303 is turned off, the path 1611 is disconnected, and the first voltage transformation circuit 131 may supply power to the system circuit 150 through the first output end. For example, as shown in FIG. 5C, the battery 110 may further supply power to the system circuit 150 through the path 162.

In some embodiments, because the second unidirectional conductive switch 1302 may have unidirectional conductivity, a unidirectional conduction direction of the second unidirectional conductive switch 1302 is a direction from the first switch 120 to the first voltage transformation circuit 131. When the output voltage V12 of the first switch 120 is higher than a forward conduction voltage of the second unidirectional conductive switch 1302, the second unidirectional conductive switch 1302 is turned on. When the first switch 120 is turned on, the second switch 1303 is turned off, and the first voltage transformation circuit 131 outputs a voltage through the first output end, and when the output voltage V131 of the first voltage transformation circuit 131 is higher than the forward conduction voltage of the first unidirectional conductive switch 1301, the first unidirectional conductive switch 1301 is turned on. Because the second unidirectional conductive switch 1302 has unidirectional conductivity, the second unidirectional conductive switch 1302 is not turned on. This can avoid a case in which when an output voltage obtained after the output voltage V131 of the first voltage transformation circuit 131 passes through the first unidirectional conductive switch 1301 is higher than the output voltage V12 of the first switch 120, if the second unidirectional conductive switch 1302 is turned on, when the output voltage V13 obtained after the output voltage V131 of the first voltage transformation circuit 131 passes through the first unidirectional conductive switch 1301 and the second unidirectional conductive switch 1302 is higher than the output voltage V12 of the first switch 120, because the voltage V13 is electrically connected to the voltage V12 through a wire, an output current of a second end of the first unidirectional conductive switch 1301 is excessively large; further, the output current of the first voltage transformation circuit 131 is excessively large, and consequently the first voltage transformation circuit 131 enables overcurrent protection and cannot work normally. After the output voltage V11 of the battery 110 passes through the first switch 120, the output voltage V12 is higher than the forward conduction voltage of the second unidirectional conductive switch 1302, and the second unidirectional conductive switch 1302 is turned on. Because the first unidirectional conductive switch 1301 has unidirectional conductivity, the first unidirectional conductive switch 1301 is not turned on. This can avoid a case in which when an output voltage obtained after the first switch 120 passes through the second unidirectional conductive switch 1302 is higher than the output voltage V131 of the first voltage transformation circuit 131, if the first unidirectional conductive switch 1301 is turned on, when an output voltage obtained after the output voltage of the first switch 120 passes through the first unidirectional conductive switch 1301 and the second unidirectional conductive switch 1302 is higher than the output voltage V131 of the first voltage transformation circuit 131, because the first voltage transformation circuit 131 is electrically connected to the first unidirectional conductive switch 1301 or the second unidirectional conductive switch 1302 through a wire, an output current from the second unidirectional conductive switch 1302 to the first voltage transformation circuit 131 is excessively large; further, an output current of the battery 110 is excessively large, and consequently the battery 110 enables overcurrent protection. Further, the electronic device 100 is not powered off.

In some embodiments, when the battery 110 stops supplying power to the system circuit 150 through the path 1611, the processing circuit 152 may alternatively control the first voltage transformation circuit 131 to stop working. In this case, the first output end of the first voltage transformation circuit 131 has no output, so that power consumption of the first voltage transformation circuit 131 can be reduced.

In this embodiment of this disclosure, when the path 160 is connected, the processing circuit 152 may control, through the signal circuit C31, the second switch 1303 to be turned off. In response to that the input signal of the control end of the second switch 1303 is the turn-off signal, the second switch 1303 is turned off, and the path 1611 is disconnected. Before the path 1611 is disconnected, the first switch 120 is turned on, and the path 160 is connected. Therefore, the battery 110 may supply power to the system circuit 150 through the path 160, so that the electronic device 100 is not powered off because the path 1611 is disconnected.

Figure 6A:
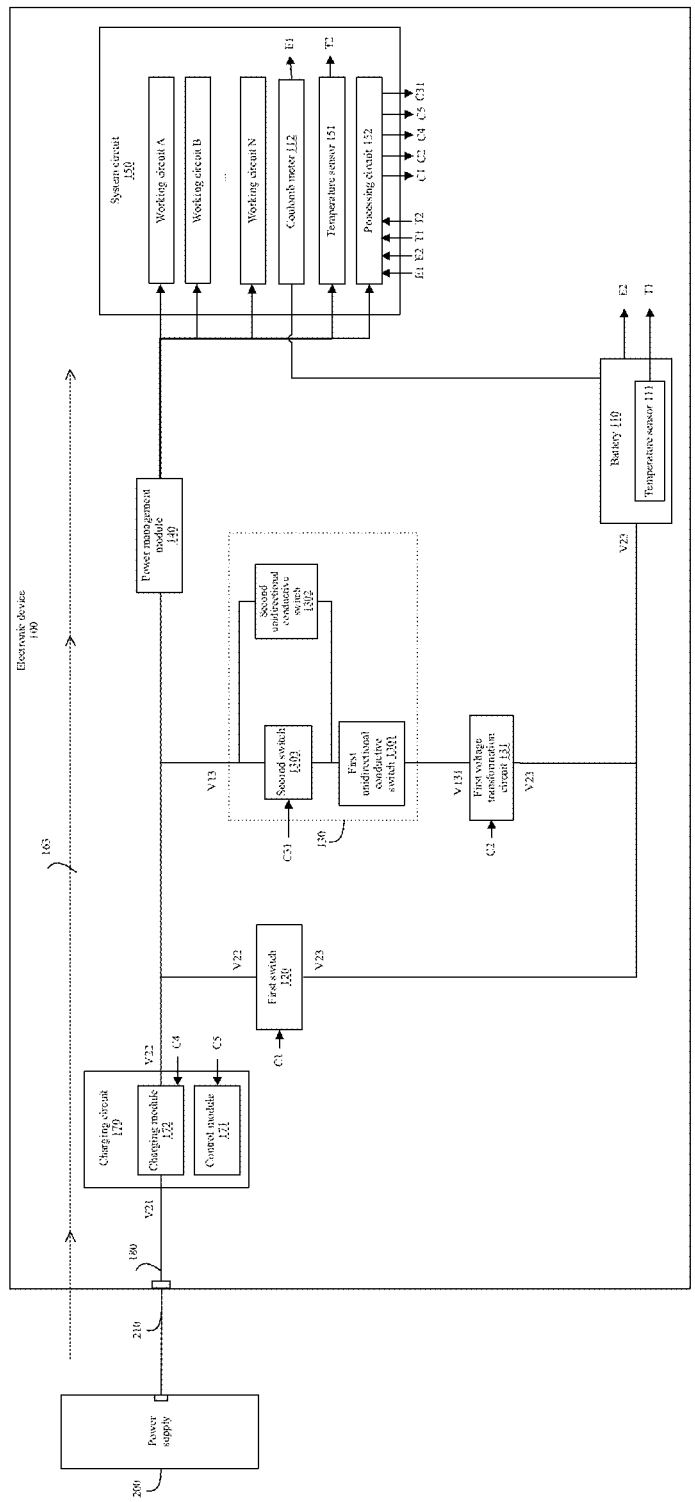
FIG. 6A to FIG. 6C are diagrams of structures of another group of electronic devices according to an embodiment of this disclosure.
Figure 6B:
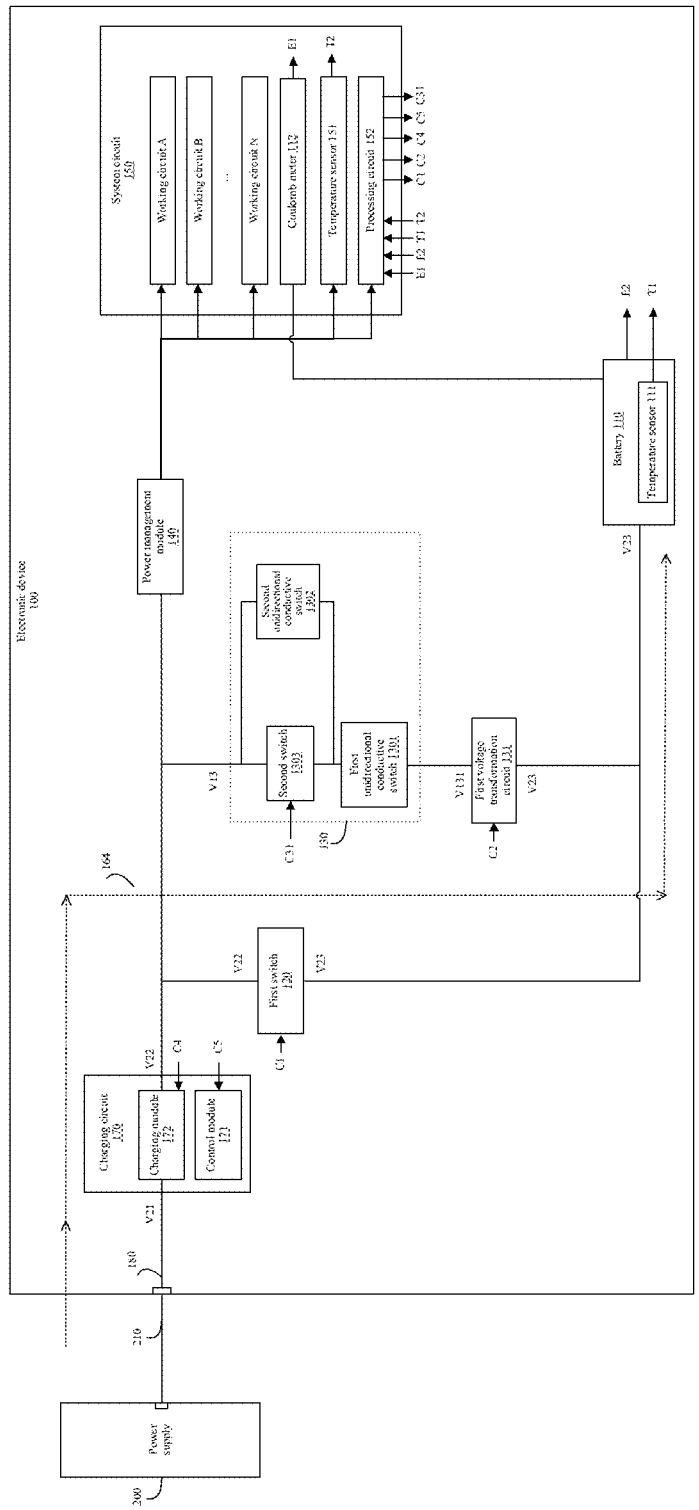
Figure 6C:
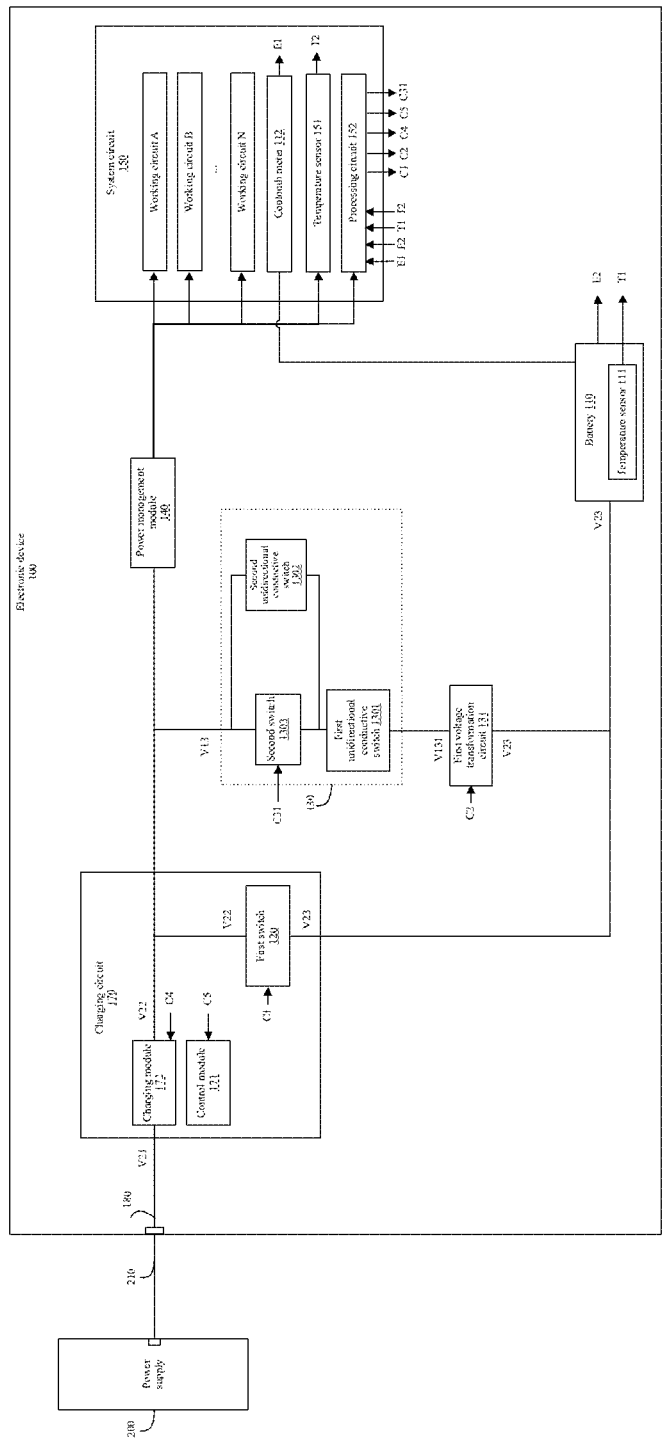

FIG. 6A to FIG. 6C each are a diagram of a structure of another electronic device according to an embodiment of this disclosure. As shown in FIG. 6A to FIG. 6C, based on the electronic device 100 shown in FIG. 5A to FIG. 5C, the electronic device 100 may further include a charging circuit 170 and an external power supply interface 180. The charging circuit 170 may include a control module 171 and a charging module 172. The electronic device 100 may further be connected to an external power supply 200, and the external power supply 200 may be electrically connected to the electronic device 100 through the external power supply interface 180. The processing circuit 152 may be electrically connected to the control module 171 and the charging module 172, and the processing circuit 152 may control working statuses of the charging module 172 and the control module 171. It should be noted that, for the charging circuit 170 and the external power supply 200, refer to related descriptions in the foregoing other embodiments. Details are not described herein again.

In this embodiment of this disclosure, as shown in FIG. 6C, the first switch 120 may be alternatively disposed in the charging circuit 170, so that an area of a circuit board occupied by the first switch 120 can be reduced, and more electronic components can be placed on the circuit board.

As shown in FIG. 6A to FIG. 6C, when the electronic device 100 is connected to the external power supply 200, the external power supply 200 may be electrically connected to the charging module 172, and the external power supply 200 may provide a voltage V21 for the charging module 172. The charging module 172 may be electrically connected to an input end of the power management module 140, and an output end of the power management module 140 may be electrically connected to the system circuit 150.

In a possible embodiment, when the battery 110 supplies power to the system circuit 150 through a path 1611, and the processing circuit 152 detects that the external power supply 200 is connected, the processing circuit 152 may control, through a signal circuit C4, the charging module 172 to work, and the charging module 172 may provide a voltage V22 for the power management module 140. Then, the power management module 140 performs voltage conversion to supply power to the system circuit 150. For example, as shown in FIG. 6A, the external power supply 200 may supply power to the system circuit 150 through a path 163.

In this embodiment of this disclosure, when the path 1611 is connected, and before the external power supply 200 supplies power to the system circuit 150 through the path 163, it needs to be ensured that an output current of the first voltage transformation circuit 131 cannot exceed an overcurrent threshold of the first voltage transformation circuit 131 when the external power supply 200 supplies power to the system circuit 150 through the path 163. In the solution provided in this embodiment of this disclosure, before the path 163 is connected, the processing circuit 152 may control, to be not higher than the output voltage V22 of the charging module 172, an output voltage V13 obtained after an output voltage V131 of the first voltage transformation circuit 131 passes through the first unidirectional conductive switch 1301 and the second switch 1303. This avoids a case in which when the voltage V13 is higher than the voltage V22 after the external power supply 200 supplies power to the system circuit 150 through the path 163, because the voltage V13 is electrically connected to the voltage V22 through a wire, and an impedance of the wire is small, an output current of the first unidirectional conductive switch 1301 is excessively large; further, the output current of the first voltage transformation circuit 131 is excessively large and exceeds the overcurrent threshold of the first voltage transformation circuit 131; and consequently the first voltage transformation circuit 131 enables overcurrent protection and cannot work normally.

In this embodiment of this disclosure, the external power supply 200 may be electrically connected to the charging module 172, the charging module 172 may be electrically connected to the first switch 120, and the first switch 120 may be electrically connected to the battery 110. When the external power supply 200 supplies power to the system circuit 150 through the path 163, for example, as shown in FIG. 6B, the external power supply 200 may also provide a charging current for the battery 110 through a path 164. For a manner in which the external power supply 200 provides the charging current for the battery 110 through the path 164, refer to specific descriptions in the foregoing other embodiments. Details are not described herein again.

In some embodiments, the control module 171 may further control a working status of the first switch 120. For details, refer to the descriptions in the foregoing other embodiments. Details are not described herein again.

In some embodiments, when the external power supply 200 separately supplies power to the system circuit 150 through the path 163 and charges the battery 110 through the path 164, and a system load of the electronic device 100 is high, the system circuit 150 may obtain input currents through both the path 160 and the path 163, so that the electronic device 100 can support a higher system load. For details, refer to the descriptions in the foregoing other embodiments. Details are not described herein again.

In this embodiment of this disclosure, when the path 163 is connected, the processing circuit 152 may control, through a signal circuit C31, the second switch 1303 to be turned off, and then control the path 1611 to be disconnected. Before the path 1611 is disconnected, the external power supply 200 has supplied power to the system circuit 150 through the path 163, so that the electronic device 100 is not powered off when the path 1611 is disconnected.

In some embodiments, when the second switch 1303 is turned off, the path 1611 is disconnected, and the first voltage transformation circuit 131 may further supply power to the system circuit 150 through a first output end. For example, as shown in FIG. 5C, the battery 110 may further supply power to the system circuit 150 through the path 162. For details, refer to the descriptions in the foregoing other embodiments. Details are not described herein again.

In some embodiments, because the first unidirectional conductive switch 1301 and the second unidirectional conductive switch 1302 have unidirectional conductivity, to avoid a case in which the first voltage transformation circuit 131 enables overcurrent protection and cannot work normally; and avoid a case in which the battery 110 enables overcurrent protection, so that the electronic device 100 is not powered off. For details, refer to the descriptions in the foregoing other embodiments. Details are not described herein again.

In some embodiments, when the battery 110 stops supplying power to the system circuit 150 through the path 1611, the processing circuit 152 may alternatively control the first voltage transformation circuit 131 to stop working. In this case, the first output end of the first voltage transformation circuit 131 has no output, so that power consumption of the first voltage transformation circuit 131 can be reduced.

In another possible embodiment, when the battery 110 supplies power to the system circuit 150 through the path 1611, and the processing circuit 152 detects that the external power supply 200 is connected, the processing circuit 152 may control, through a signal circuit C1, the first switch 120 to be turned on. For example, as shown in FIG. 5A, the path 160 is connected.

In this embodiment of this disclosure, when the path 1611 is connected, because when the first switch 120 is turned on, the first switch 120 is used as a switch, and an impedance of the first switch 120 is small or even ignored, an output voltage of a second end of the first switch circuit 120 may be considered as the same as an output voltage V11 of the battery 110. Therefore, in the solution provided in this embodiment of this disclosure, before the battery 110 supplies power to the system circuit 150 through the path 160, the processing circuit 152 may output a signal to the first voltage transformation circuit 131 to control, to be not higher than the output voltage V11 of the battery 110, the output voltage V13 obtained after the output voltage V131 of the first voltage transformation circuit 131 passes through the first unidirectional conductive switch 1301 and the second switch 1303. This avoids a case in which when the first switch 120 is turned on, the voltage V13 is higher than the voltage V12, resulting in an excessively large output current of the first voltage transformation circuit 131; further, the output current of the first voltage transformation circuit 131 exceeds the overcurrent threshold of the first voltage transformation circuit 131; and consequently the first voltage transformation circuit 131 enables overcurrent protection and cannot work normally.

In this embodiment of this disclosure, the control module 171 may further control a working status of the first switch 120. For details, refer to the descriptions in the foregoing other embodiments. Details are not described herein again.

In this embodiment of this disclosure, when both the path 1611 and the path 160 are connected, for example, as shown in FIG. 6A and FIG. 6B, the external power supply 200 may separately supply power to the system circuit 150 through the path 163 and charge the battery 110 through the path 164. In this case, the path 160 is disconnected. For details, refer to specific descriptions in the foregoing embodiments. Details are not described herein again.

In some embodiments, before the external power supply 200 separately supplies power to the system circuit 150 through the path 163 and charges the battery 110 through the path 164, the processing circuit 152 may control, to be not higher than the output voltage V22 of the charging module 172, the output voltage V13 obtained after the output voltage V131 of the first voltage transformation circuit 131 passes through the first unidirectional conductive switch 1301 and the second switch 1303. This avoids a case in which the first voltage transformation circuit 131 enables overcurrent protection and cannot work normally. When both the path 163 and the path 164 are connected, the processing circuit 152 may further control, through the signal circuit C31, the second switch 1303 to be turned off, and then control the path 1611 to be disconnected. Before the path 1611 is disconnected, the battery 110 has supplied power to the system circuit 150 through the path 163, so that the electronic device 100 is not powered off when the path 1611 is disconnected. For details, refer to the descriptions in the foregoing other embodiments. Details are not described herein again.

In some embodiments, the control module 171 may further control a working status of the charging module 172. For details, refer to the descriptions in the foregoing other embodiments. Details are not described herein again.

In some embodiments, when the external power supply 200 separately supplies power to the system circuit 150 through the path 163 and charges the battery 110 through the path 164, and a system load of the electronic device 100 is high, the system circuit 150 may obtain input currents through both the path 160 and the path 163, so that the electronic device 100 can support a higher system load. For details, refer to the descriptions in the foregoing other embodiments. Details are not described herein again.

In this embodiment of this disclosure, when both the path 160 and the path 1611 are connected, the processing circuit 152 may control, through the signal circuit C31, the second switch 1303 to be turned off, and then control the path 1611 to be disconnected. When the path 1611 is disconnected, the processing circuit 152 controls the path 163 and the path 164 to be connected. Before the path 1611 is disconnected, the battery 110 has supplied power to the system circuit 150 through the path 160, so that the electronic device 100 is not powered off when the path 1611 is disconnected.

In some embodiments, when the second switch 1303 is turned off, the path 1611 is disconnected, and the first voltage transformation circuit 131 may supply power to the system circuit 150 through the first output end. For example, as shown in FIG. 5C, the battery 110 may further supply power to the system circuit 150 through the path 162. Because the first unidirectional conductive switch 1301 and the second unidirectional conductive switch 1302 have unidirectional conductivity, to avoid a case in which the first voltage transformation circuit 131 enables overcurrent protection and cannot work normally; and avoid a case in which the battery 110 enables overcurrent protection, so that the electronic device 100 is not powered off. For details, refer to the descriptions in the foregoing other embodiments. Details are not described herein again.

In some embodiments, when the battery 110 stops supplying power to the system circuit 150 through the path 1611, the processing circuit 152 may alternatively control the first voltage transformation circuit 131 to stop working. In this case, the first output end of the first voltage transformation circuit 131 has no output, so that power consumption of the first voltage transformation circuit 131 can be reduced.

Figure 7A:
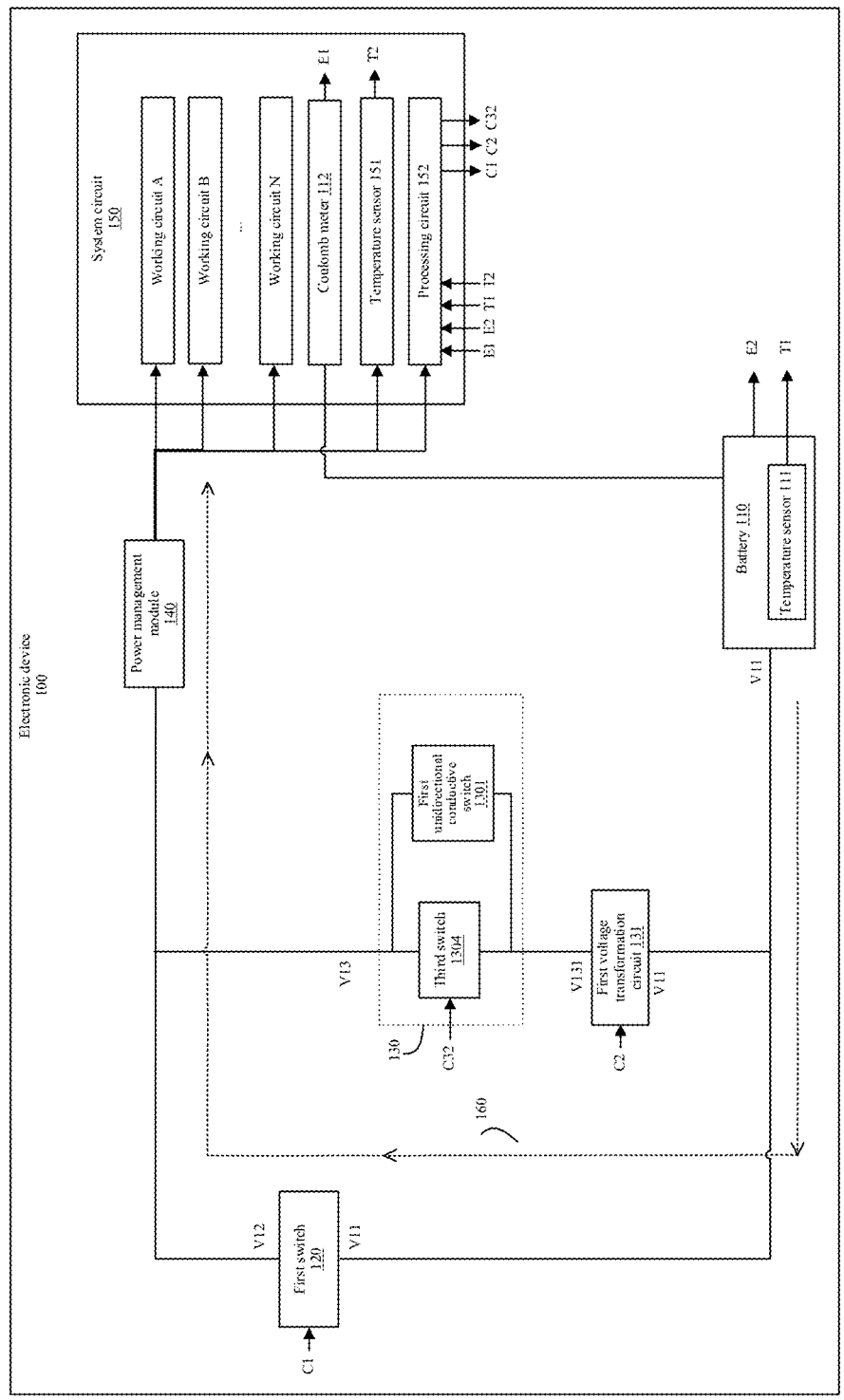
FIG. 7A to FIG. 7C are diagrams of structures of another group of electronic devices according to an embodiment of this disclosure.
Figure 7B:
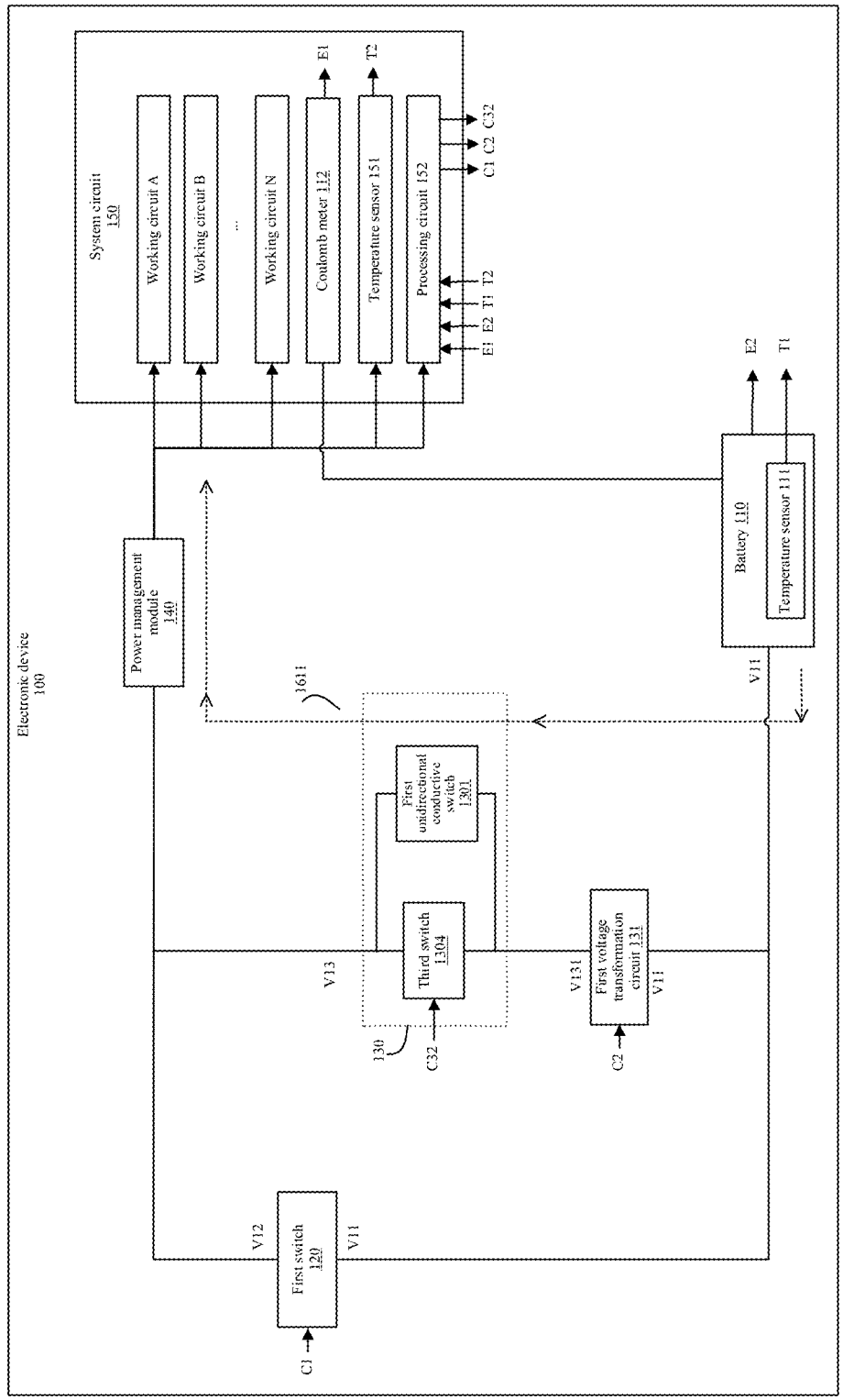
Figure 7C:
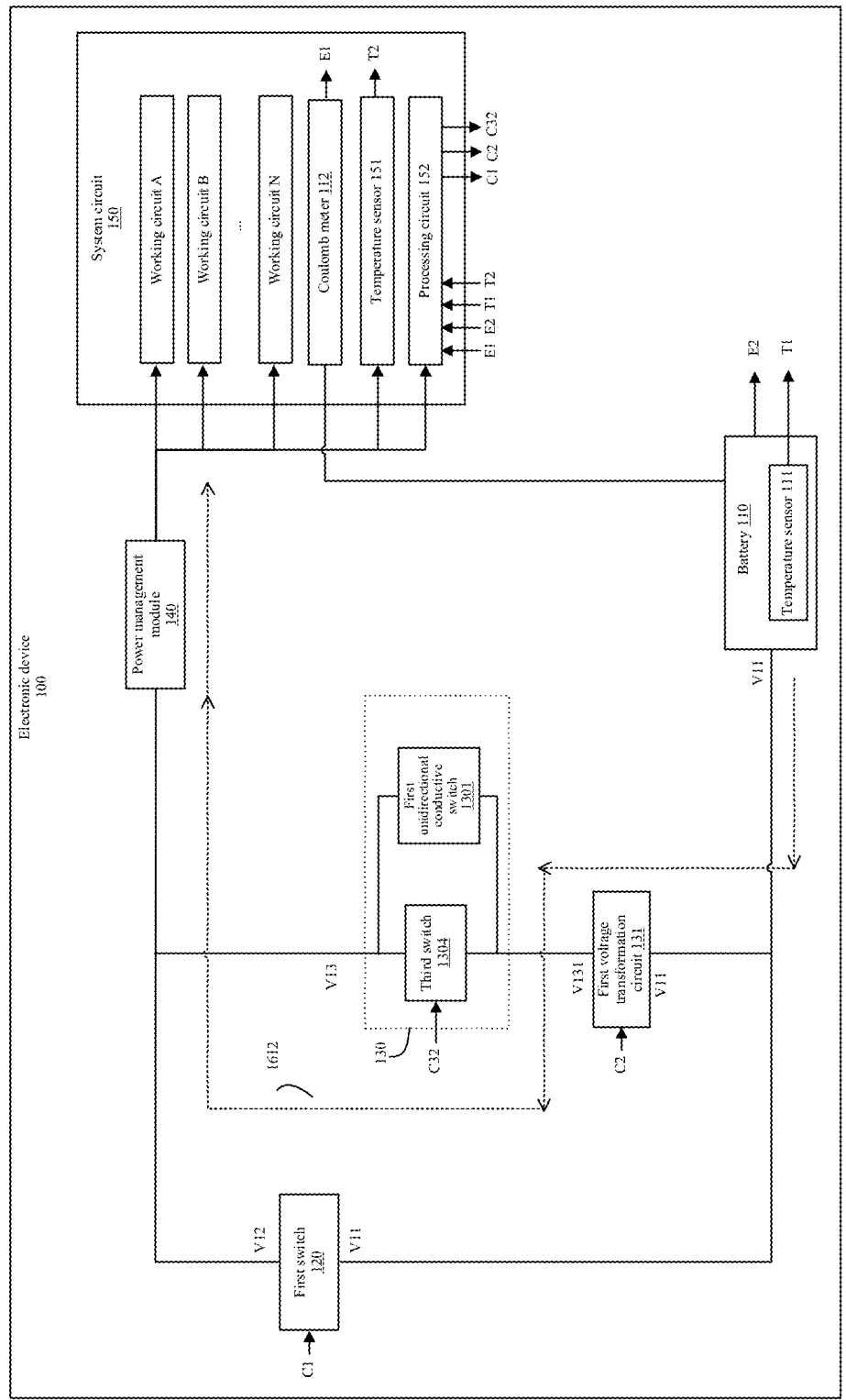

Because the first unidirectional conductive switch 1301 with unidirectional conductivity has a conduction voltage drop and high power consumption, when power is supplied to the system circuit 150 through the path 1611, power consumption of the path 1611 is high due to existence of the first unidirectional conductive switch 1301. Therefore, in some embodiments, the electronic device includes a third switch 1304. The third switch 1304 is connected in parallel to the first unidirectional conductive switch 1301, and the third switch 1304 has a small conduction impedance and low power consumption. FIG. 7A to FIG. 7C each are a diagram of a structure of another electronic device according to an embodiment of this disclosure. FIG. 7A to FIG. 7C show another implementation of the first switch module 130 in FIG. 1A to FIG. 1C. Based on the electronic device 100 shown in FIG. 3A to FIG. 3B, the first switch module 130 may further include a third switch 1304. A first output end of the first voltage transformation circuit 131 is electrically connected to a first end of the third switch 1304, a second end of the third switch 1304 is electrically connected to an input end of the power management module 140, and the third switch 1304 is electrically connected in parallel to the first unidirectional conductive switch 1301.

In this embodiment of this disclosure, the first unidirectional conductive switch 1301 may be a part of the third switch 1304, so that an area of a circuit board occupied by the first unidirectional conductive switch 1301 can be reduced, and more electronic components can be placed on the circuit board.

It should be noted that the processing circuit 152 may include one or more processing units, and the processing circuit 152 may control, through a signal circuit C32, the third switch 1304 to be turned on or turned off. In response to that an input signal of a control end of the third switch 1304 is a turn-off signal (for example, the turn-off signal received by the control end of the third switch 1304 may be a signal output by the processing circuit 152, or may be a signal generated based on a signal output by the processing circuit 152), the third switch 1304 is turned off; or in response to that an input signal of a control end of the third switch 1304 is a turn-on signal (for example, the turn-on signal received by the control end of the third switch 1304 may be a signal output by the processing circuit 152, or may be a signal generated based on a signal output by the processing circuit 152), the first switch 120 is turned on. For ease of description, that the processing circuit 152 may control, through the signal circuit C32, the third switch 1304 to be turned on or turned off, and in response to that the input signal of the control end of the third switch 1304 is the turn-on signal or the turn-off signal, the third switch 1304 is turned on or turned off is used as a uniform description in the following embodiments.

In a possible embodiment, as shown in FIG. 7A, when a path 160 is connected, and the processing circuit 152 detects that the electronic device 100 meets a first condition, the processing circuit 152 may control an output voltage V131 of the first voltage transformation circuit 131 to be higher than a forward conduction voltage of the first unidirectional conductive switch 1301, and then the first unidirectional conductive switch 1301 is turned on. For example, as shown in FIG. 7B, a path 1611 is connected. When the path 1611 is connected, the first unidirectional conductive switch 1301 with unidirectional conductivity may be used, so that the electronic device 100 is not powered off. For details, refer to the descriptions in the foregoing other embodiments. Details are not described herein again.

In this embodiment of this disclosure, when the path 160 is in a connected state, and before the path 1611 is connected, it needs to be avoided that when the path 1611 is connected, the first voltage transformation circuit 131 enables overcurrent protection, and the electronic device 100 is powered off because the battery 110 is in a low-voltage state in this case. For details, refer to the descriptions in the foregoing other embodiments. Details are not described herein again.

When both the path 160 and the path 1611 are connected, the processing circuit 152 may control, through a signal circuit C1, the first switch 120 to be turned off, and the battery 110 stops supplying power to the system circuit 150 through the path 160. Before the battery 110 stops supplying power to the system circuit 150 through the path 160, the battery 110 has supplied power to the system circuit 150 through the path 1611, so that the electronic device 100 is not powered off because the first switch 120 is turned off.

In this embodiment of this disclosure, when the battery 110 supplies power to the system circuit 150 through the path 1611, a voltage V13 is the voltage V131 minus a voltage drop of the first unidirectional conductive switch 1301. When the battery 110 supplies power to the system circuit 150 through a path 1612, a voltage V13 is the voltage V131 minus a voltage drop of the third switch 1304. Because the voltage drop of the first unidirectional conductive switch 1301 is higher than the voltage drop of the third switch 1304, when the output voltage V131 of the first output end of the first voltage transformation circuit 131 remains unchanged, the voltage V13 corresponding to a case in which the battery 110 supplies power to the system circuit 150 through the path 1612 is higher than the voltage V13 corresponding to a case in which the battery supplies power to the system circuit 150 through the path 1611. When the battery 110 supplies power to the system circuit 150 through the path 1612, a higher voltage V13 indicates a higher output voltage V131 of the first voltage transformation circuit 131. Because an input voltage of the first voltage transformation circuit 131 is an output voltage V11 of the battery 110, a higher output voltage V131 of the first voltage transformation circuit 131 indicates a larger voltage difference between an input voltage and an output voltage of the first voltage transformation circuit 131, and lower efficiency of the first voltage transformation circuit 131. Therefore, when the battery 110 supplies power to the system circuit 150 through the path 1612, to reduce power consumption of the electronic device 100 and prolong standby time of the electronic device 100, efficiency of the first voltage transformation circuit 131 needs to be improved as much as possible, that is, the output voltage V131 of the first voltage transformation circuit 131 needs to be reduced as much as possible. The processing circuit 152 may control the first voltage transformation circuit 131 to reduce an output voltage, to reduce the voltage difference between an output voltage and an input voltage of the first voltage transformation circuit 131 as much as possible. The output voltage V13 of the third switch 1304 needs to be higher than a second preset voltage threshold, to ensure that after the path 1612 is connected, the output voltage V13 can ensure normal working of the electronic device 100, and the electronic device 100 is not powered off because the path 1611 is disconnected.

In some embodiments, the processing circuit 152 may control the output voltage V131 of the first voltage transformation circuit 131 by using a pulse width modulation (Pulse width modulation, PWM) signal. For example, the processing circuit 152 changes working time of the first voltage transformation circuit 131 by adjusting a duty cycle of the PWM signal, and then adjusts a magnitude of the output voltage of the first voltage transformation circuit 131.

In this embodiment of this disclosure, when the path 160 is disconnected, the processing circuit 152 may control, through the signal circuit C32, the third switch 1304 to be turned on. In response to that the input signal of the control end of the third switch 1304 is the turn-on signal, the third switch 1304 is turned on, and the third switch 1304 may provide the voltage V13 for the power management module 140 through the second end. For example, as shown in FIG. 7C, the path 1612 is connected, where the path 1612 indicates a current flow direction from the battery 110 to the system circuit 150 through the first voltage transformation circuit 131, the third switch 1304, and the power management module 140, and the battery 110 may supply power to the system circuit 150 through the path 1612. Because the first unidirectional conductive switch 1301 is bypassed when the third switch 1304 is turned on, power consumption of the electronic device 100 can be reduced, and standby time of the electronic device 100 can be prolonged.

For example, in the foregoing embodiment, when the battery 110 supplies power to the system circuit 150 through the path 160, and the processing circuit 152 detects that the electronic device 100 meets the first condition, the first condition includes that a voltage of the battery 110 is not higher than a first preset voltage threshold. For example, the second preset voltage threshold is 3.4 V, and the first preset voltage threshold is 3.5 V. When the processing circuit detects that an output voltage of the battery 110 is 3.5 V, the processing circuit 152 first controls the first voltage transformation circuit 131 to work. Because a voltage drop of the first unidirectional conductive switch 1301 is 0.7 V, the processing circuit 152 controls the output voltage of the first voltage transformation circuit 131 to be 4.2 V. In this case, after the output voltage of the first voltage transformation circuit 131 passes through the first unidirectional conductive switch 1301, an output voltage of the first unidirectional conductive switch 1301 is 3.5 V, so that the battery 110 may supply power to the system circuit 150 through the path 1611. Then, the processing circuit 152 controls the first switch 120 to be turned off. When the first switch 120 is turned off, the processing circuit 152 controls the third switch 1304 to be turned on, and then controls the output voltage of the first voltage transformation circuit 131 to be 3.5 V. In this case, an output voltage of the third switch 1304 is 3.5 V, so that the electronic device 100 can work normally.

In another possible embodiment, as shown in FIG. 7A, when the path 160 is connected, and the processing circuit 152 detects that the electronic device 100 meets the first condition, the processing circuit 152 may control, through the signal circuit C32, the third switch 1304 to be turned on, so that the path 1612 is connected.

In this embodiment of this disclosure, when the path 160 is in a connected state, and before the path 1612 is connected, the processing circuit 152 may control the output voltage V13 of the second end of the third switch 1304 to be equal to a voltage V12 output by the second end of the first switch 120 after the output voltage V131 of the first voltage transformation circuit 131 passes through the third switch 1304. This avoids a case in which when the voltage V13 is higher than V12, because the third switch 1304 is electrically connected to the first switch 120 through a wire, an output current of the first voltage transformation circuit 131 is greater than an overcurrent threshold of the first voltage transformation circuit 131; further, the first voltage transformation circuit 131 enables overcurrent protection; and consequently the electronic device 100 is powered off because the battery 110 is in a low-voltage state in this case. This also avoids a case in which when the voltage V12 is higher than V13, because the third switch 1304 is electrically connected to the first switch 120 through a wire, an output current of the battery 110 is greater than an overcurrent threshold of the battery 110, the battery 110 enables overcurrent protection, and the electronic device 100 is powered off.

In this embodiment of this disclosure, when the path 1612 is connected, the processing circuit 152 may control the first switch 120 to be turned off, and the battery 110 stops supplying power to the system circuit 150 through the path 160. Before the battery 110 stops supplying power to the system circuit 150 through the path 160, the battery 110 has supplied power to the system circuit 150 through the path 1612, so that the electronic device 100 is not powered off because the first switch 120 is turned off. The output voltage V13 of the third switch 1304 needs to be higher than the second preset voltage threshold, to ensure that after the path 1612 is connected, the output voltage V13 can ensure normal working of the electronic device 100, and the electronic device 100 is not powered off because the path 160 is disconnected.

For example, in the foregoing embodiment, when the battery 110 supplies power to the system circuit 150 through the path 160, and the processing circuit 152 detects that the electronic device 100 meets the first condition, the first condition includes that a voltage of the battery 110 is not higher than the first preset voltage threshold. For example, the second preset voltage threshold is 3.4 V, and the first preset voltage threshold is 3.5 V. When the processing circuit detects that an output voltage of the battery 110 is 3.5 V, the processing circuit 152 first controls the first voltage transformation circuit 131 to work, the third switch 1304 is turned on, and the processing circuit 152 controls the output voltage of the first voltage transformation circuit 131 to be 3.5 V. In this case, after the output voltage of the first voltage transformation circuit 131 passes through the third switch 1304, the output voltage of the third switch 1304 is 3.5 V, so that the battery 110 may supply power to the system circuit 150 through the path 1612, and then the electronic device 100 can work normally. Then, the processing circuit 152 controls the first switch 120 to be turned off.

As shown in FIG. 7C, when the battery 110 supplies power to the system circuit 150 through the path 1612, and the processing circuit 152 detects that the electronic device 100 meets a second condition, the processing circuit 152 may control, through the signal circuit C32, the third switch 1304 to be turned off. In response to that the input signal of the control end of the third switch 1304 is the turn-off signal, the third switch 1304 is turned off, the path 1612 is disconnected, and the path 1611 is connected. When the path 1611 is connected, the processing circuit 152 may control the path 160 to be connected, and may further control the path 1611 to be disconnected after the path 160 is connected. For details, refer to the embodiment related to FIG. 3A and FIG. 3B. Details are not described herein again.

Figure 8A:
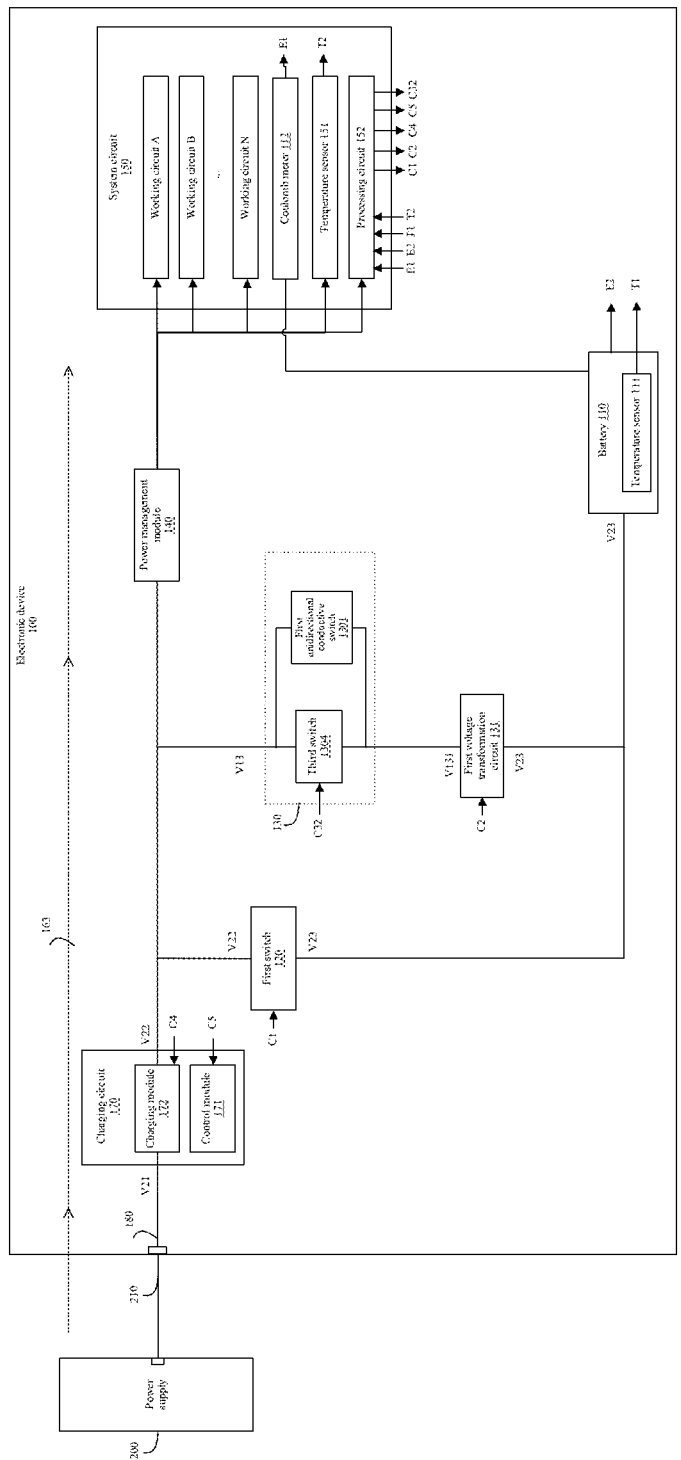
FIG. 8A to FIG. 8C are diagrams of structures of another group of electronic devices according to an embodiment of this disclosure.
Figure 8B:
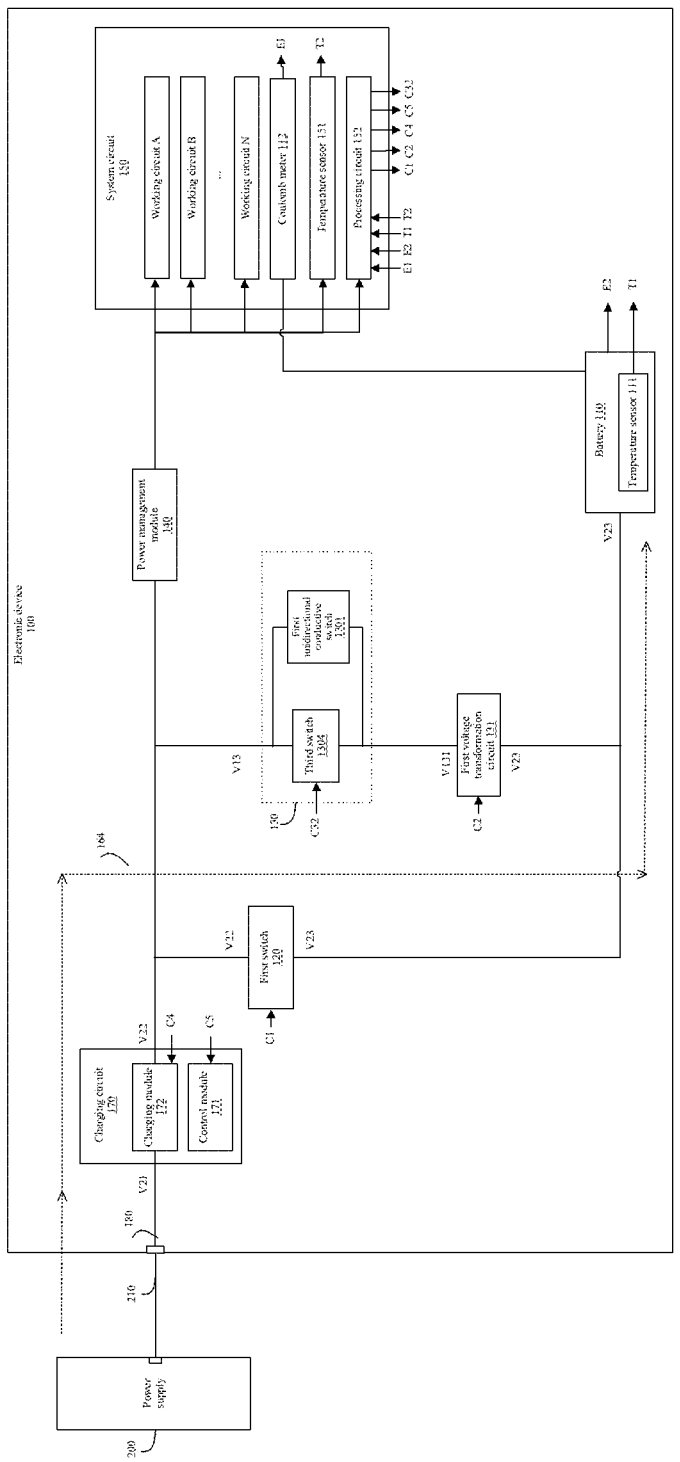
Figure 8C:
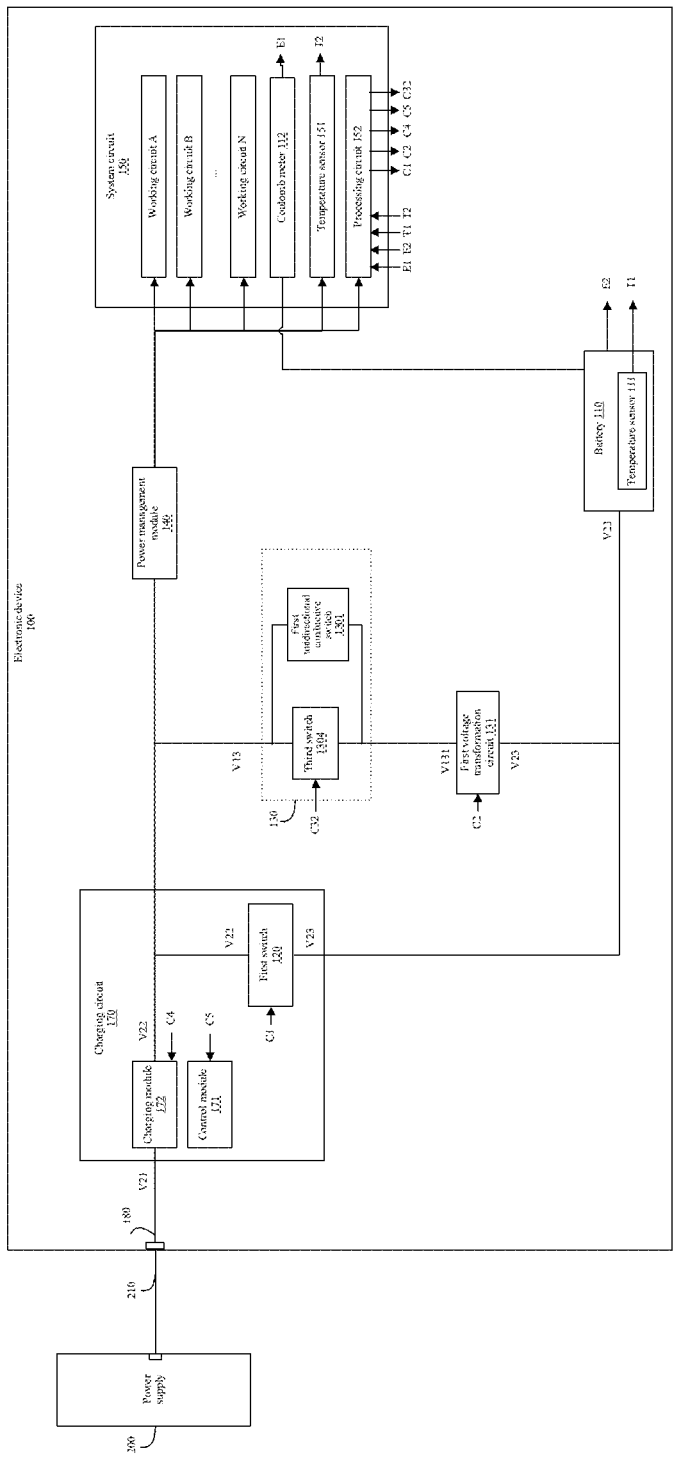

FIG. 8A to FIG. 8C each are a diagram of a structure of another electronic device according to an embodiment of this disclosure. As shown in FIG. 8A to FIG. 8C, based on the electronic device 100 shown in FIG. 7A to FIG. 7C, the electronic device 100 may further include a charging circuit 170 and an external power supply interface 180. The charging circuit 170 may include a control module 171 and a charging module 172. The electronic device 100 may further be connected to an external power supply 200, and the external power supply 200 may be electrically connected to the electronic device 100 through the external power supply interface 180. The processing circuit 152 may be electrically connected to the control module 171 and the charging module 172, and the processing circuit 152 may control working statuses of the charging module 172 and the control module 171. It should be noted that, for the charging circuit 170 and the external power supply 200, refer to related descriptions in the foregoing other embodiments. Details are not described herein again.

In this embodiment of this disclosure, as shown in FIG. 8C, the first switch 120 may be alternatively disposed in the charging circuit 170, so that an area of a circuit board occupied by the first switch 120 can be reduced, and more electronic components can be placed on the circuit board.

As shown in FIG. 8A to FIG. 8C, when the electronic device 100 is connected to the external power supply 200, the external power supply 200 may be electrically connected to the charging module 172, and the external power supply 200 may provide a voltage V21 for the charging module 172. The charging module 172 may be electrically connected to an input end of the power management module 140, and an output end of the power management module 140 may be electrically connected to the system circuit 150.

As shown in FIG. 8A to FIG. 8C, based on the electronic device 100 shown in FIG. 4A to FIG. 4C, the first switch module 130 may further include a third switch 1304. A first output end of the first voltage transformation circuit 131 is electrically connected to a first end of the third switch 1304, a second end of the third switch 1304 is electrically connected to an input end of the power management module 140, and the third switch 1304 is electrically connected in parallel to the first unidirectional conductive switch 1301. When the battery 110 supplies power to the system circuit 150 through a path 1612, and the processing circuit 152 detects that the external power supply 200 is connected, the processing circuit 152 may control, through a signal circuit C32, the third switch 1304 to be turned off. In response to that an input signal of a control end of the third switch 1304 is a turn-off signal, the third switch 1304 is turned off, and the path 1612 is disconnected. When the path 1612 is disconnected, for example, as shown in FIG. 7B, the path 1611 is connected. When the path 1611 is connected, for example, as shown in FIG. 8A, the processing circuit 152 may control a path 163 to be connected, and may further control the path 1611 to be disconnected after the path 163 is connected. For example, as shown in FIG. 8B, the processing circuit 152 may further control a path 164 to be connected. Alternatively, when the path 1611 is connected, the processing circuit 152 may control a path 160 to be connected; and may further control the path 1611 to be disconnected after the path 160 is connected, and then control the path 163 and the path 164 to be connected, so that the path 160 is disconnected. Alternatively, when the path 1611 is connected, the processing circuit 152 may control the path 160 to be connected, and then control the path 163 and the path 164 to be connected, so that the path 160 is disconnected; and may further control the path 1611 to be disconnected after the path 160 is disconnected. For details, refer to the embodiment related to FIG. 4A to FIG. 4C. Details are not described herein again.

Figure 9A:
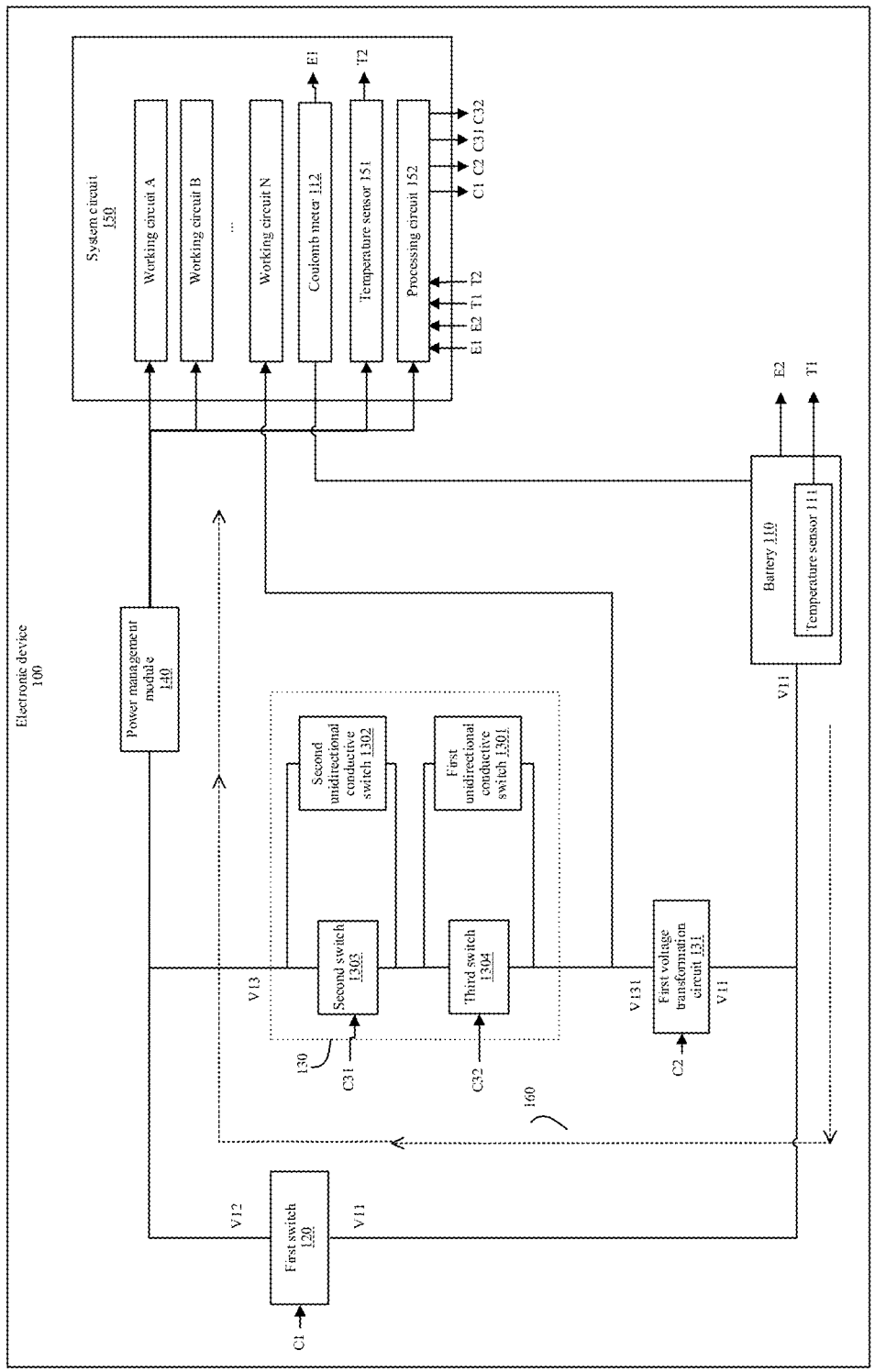
FIG. 9A to FIG. 9D are diagrams of structures of another group of electronic devices according to an embodiment of this disclosure.
Figure 9B:
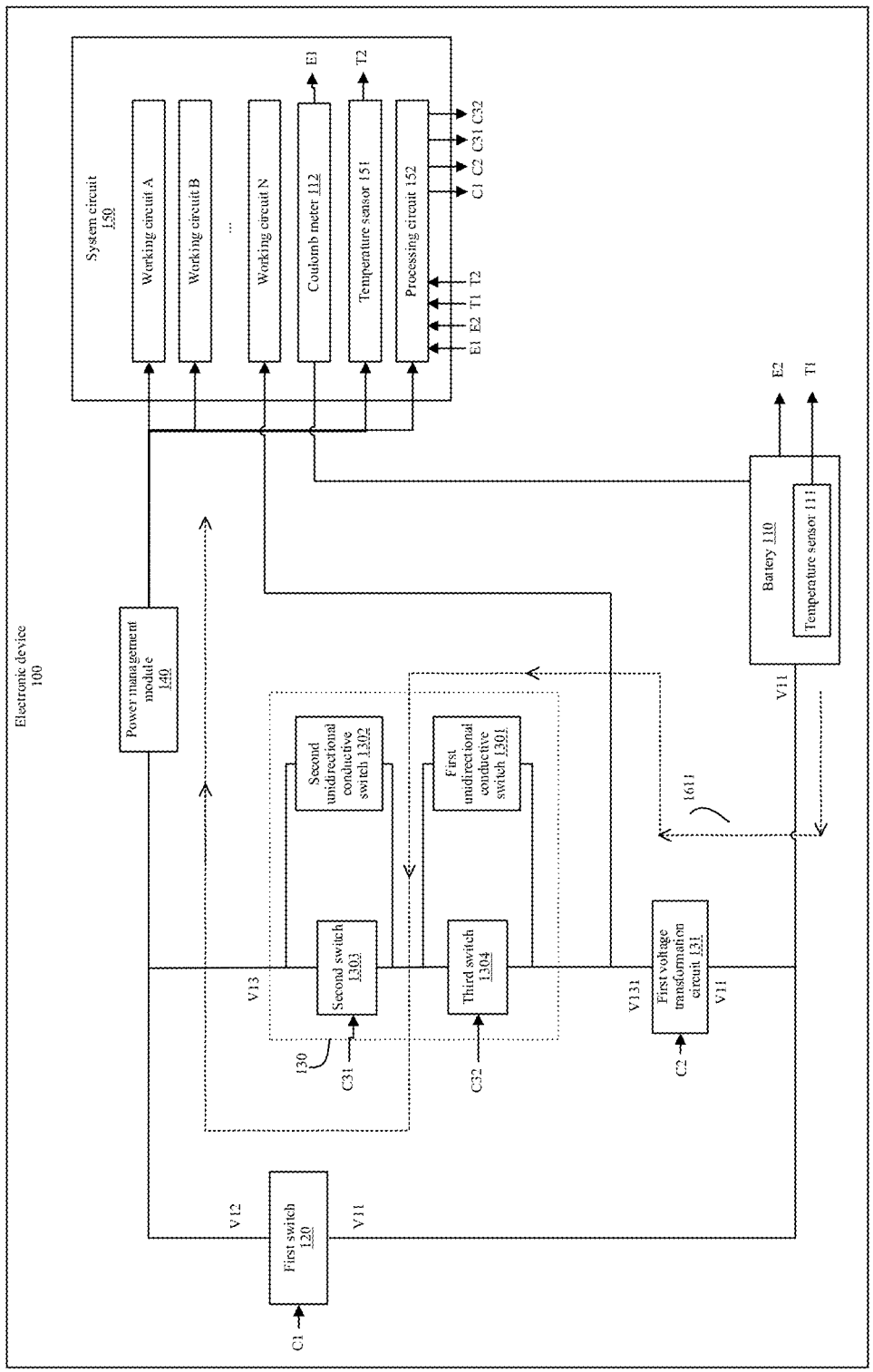
Figure 9C:
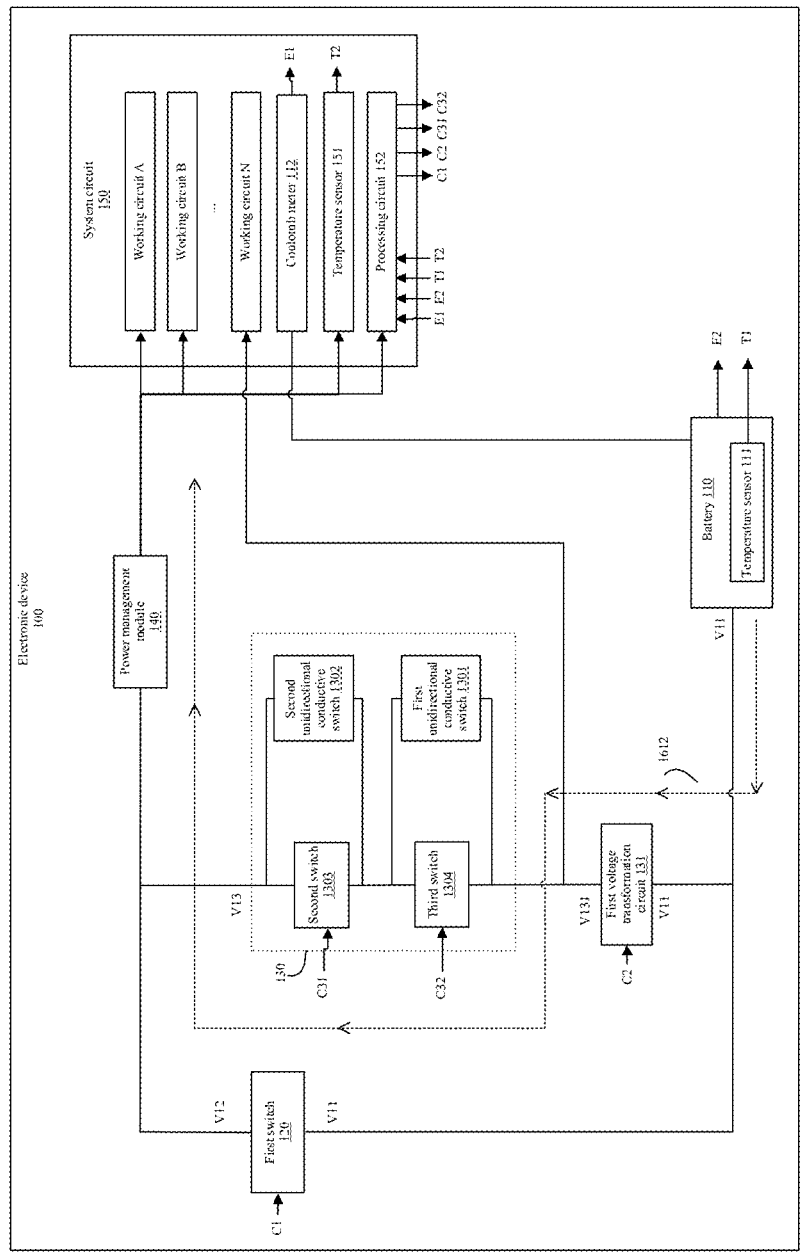

FIG. 9A to FIG. 9D each are a diagram of a structure of another electronic device according to an embodiment of this disclosure. FIG. 9A to FIG. 9C show another implementation of the first switch module 130 in FIG. 1A to FIG. 1C. Based on the electronic device 100 shown in FIG. 5A to FIG. 5C, the electronic device 100 further includes a third switch 1304. The first unidirectional conductive switch 1301 is electrically connected in parallel to the third switch 1304, a first end of the third switch 1304 is electrically connected to a first end of the first unidirectional conductive switch 1301, and a second end of the third switch 1304 is electrically connected to a second end of the first unidirectional conductive switch 1301.

In this embodiment of this disclosure, the first unidirectional conductive switch 1301 may be a part of the third switch 1304, so that an area of a circuit board occupied by the first unidirectional conductive switch 1301 can be reduced, and more electronic components can be placed on the circuit board.

In a possible embodiment, as shown in FIG. 9A, when a path 160 is connected, and the processing circuit 152 detects that the electronic device 100 meets a first condition, the processing circuit 152 may control an output voltage V131 of the first voltage transformation circuit 131 to be higher than a forward conduction voltage of the first unidirectional conductive switch 1301, and then the first unidirectional conductive switch 1301 is turned on; and the processing circuit 152 may control, through a signal circuit C31, the second switch 1303 to be turned on. For example, as shown in FIG. 9B, a path 1611 is connected. When the path 1611 is connected, the first unidirectional conductive switch 1301 with unidirectional conductivity may be used, so that the electronic device 100 is not powered off. For details, refer to the descriptions in the foregoing other embodiments. Details are not described herein again.

In this embodiment of this disclosure, when the path 160 is in a connected state, and before the path 1611 is connected, the processing circuit 152 may control the output voltage V13 to be lower than or equal to the voltage V12 output by the second end of the first switch 120 after the output voltage V131 of the first voltage transformation circuit 131 passes through the first unidirectional conductive switch 1301 and the second switch 1303. It needs to be avoided that the first voltage transformation circuit 131 enables overcurrent protection when the path 1611 is connected, and consequently the electronic device 100 is powered off because the battery 110 is in a low-voltage state in this case. For details, refer to the descriptions in the foregoing other embodiments. Details are not described herein again.

When both the path 160 and the path 1611 are connected, the processing circuit 152 may control, through a signal circuit C1, the first switch 120 to be turned off, so that the path 160 is disconnected. Before the battery 110 stops supplying power to the system circuit 150 through the path 160, the battery 110 has supplied power to the system circuit 150 through the path 1611, so that the electronic device 100 is not powered off because the first switch 120 is turned off.

In this embodiment of this disclosure, when the path 160 is disconnected, the processing circuit 152 may control, through a signal circuit C32, the third switch 1304 to be turned on. For example, as shown in FIG. 9C, a path 1612 is connected, where the path 1612 indicates a current flow direction from the battery 110 to the system circuit 150 through the first voltage transformation circuit 131, the third switch 1304, the second switch 1303, and the power management module 140. The battery 110 may supply power to the system circuit 150 through the path 1612. Because the first unidirectional conductive switch 1301 is bypassed when the third switch 1304 is turned on, power consumption of the electronic device 100 can be reduced, and standby time of the electronic device 100 can be prolonged.

In this embodiment of this disclosure, when the battery 110 supplies power to the system circuit 150 through the path 1612, to reduce power consumption of the electronic device 100 and prolong standby time of the electronic device 100, efficiency of the first voltage transformation circuit 131 needs to be improved as much as possible, that is, the output voltage V131 of the first voltage transformation circuit 131 needs to be reduced as much as possible, and a voltage difference between an output voltage and an input voltage of the first voltage transformation circuit 131 needs to be reduced as much as possible. After the output voltage V131 of a first end of the first voltage transformation circuit 131 passes through the third switch 1304 and the second switch 1303, the output voltage V13 needs to be higher than a second preset voltage threshold, to ensure that after the path 1612 is connected, the output voltage V13 can ensure normal working of the electronic device 100, and the electronic device 100 is not powered off because the path 1611 is disconnected. For details, refer to the descriptions in the foregoing other embodiments. Details are not described herein again.

For example, in the foregoing embodiment, when the battery 110 supplies power to the system circuit 150 through the path 160, and the processing circuit 152 detects that the electronic device 100 meets the first condition, the first condition includes that a voltage of the battery 110 is not higher than a first preset voltage threshold. For example, the second preset voltage threshold is 3.4 V, and the first preset voltage threshold is 3.5 V. When the processing circuit detects that an output voltage of the battery 110 is 3.5 V, the processing circuit 152 first controls the first voltage transformation circuit 131 to work and the second switch 1303 to be turned on. Because a voltage drop of the first unidirectional conductive switch 1301 is 0.7 V, the processing circuit 152 controls the output voltage of the first voltage transformation circuit 131 to be 4.2 V. In this case, after the output voltage of the first voltage transformation circuit 131 passes through the first unidirectional conductive switch 1301 and the second switch 1303, an output voltage is 3.5 V, so that the battery 110 may supply power to the system circuit 150 through the path 1611. Then, the processing circuit 152 controls the first switch 120 to be turned off. When the first switch 120 is turned off, the processing circuit 152 controls the third switch 1304 to be turned on, and then controls the output voltage of the first voltage transformation circuit 131 to be 3.5 V. In this case, after the output voltage of the first voltage transformation circuit 131 passes through the third switch 1304 and the second switch 1303, the output voltage is 3.5 V, so that the electronic device 100 can work normally.

In another possible embodiment, as shown in FIG. 9A, when the path 160 is connected, and the processing circuit 152 detects that the electronic device 100 meets the first condition, the processing circuit 152 may separately control, through the signal circuit C31 and the signal circuit C32, the second switch 1303 and the third switch 1304 to be turned on, so that the path 1612 is connected.

In this embodiment of this disclosure, when the path 160 is in a connected state, and before the path 1612 is connected, the processing circuit 152 may control, to be equal to the voltage V12 output by the second end of the first switch 120, the output voltage V13 obtained after the output voltage V131 of the first voltage transformation circuit 131 passes through the third switch 1304 and the second switch 1303. This avoids a case in which when the voltage V13 is higher than V12, the first voltage transformation circuit 131 enables overcurrent protection, and consequently the electronic device 100 is powered off because the battery 110 is in a low-voltage state in this case. This also avoids a case in which when the voltage V12 is higher than V13, the electronic device 100 is powered off because the battery 110 enables overcurrent protection. For details, refer to the descriptions in the foregoing other embodiments. Details are not described herein again.

In this embodiment of this disclosure, when the path 1612 is connected, the processing circuit 152 may control the first switch 120 to be turned off, and the battery 110 stops supplying power to the system circuit 150 through the path 160. Before the battery 110 stops supplying power to the system circuit 150 through the path 160, the battery 110 has supplied power to the system circuit 150 through the path 1612, so that the electronic device 100 is not powered off because the first switch 120 is turned off.

In some embodiments, after the output voltage V131 of the first voltage transformation circuit 131 passes through the third switch 1304 and the second switch 1303, the output voltage V13 needs to be higher than the second preset voltage threshold, to ensure that after the path 1612 is connected, the output voltage V13 can ensure normal working of the electronic device 100, and the electronic device 100 is not powered off because the path 160 is disconnected.

Figure 9D:
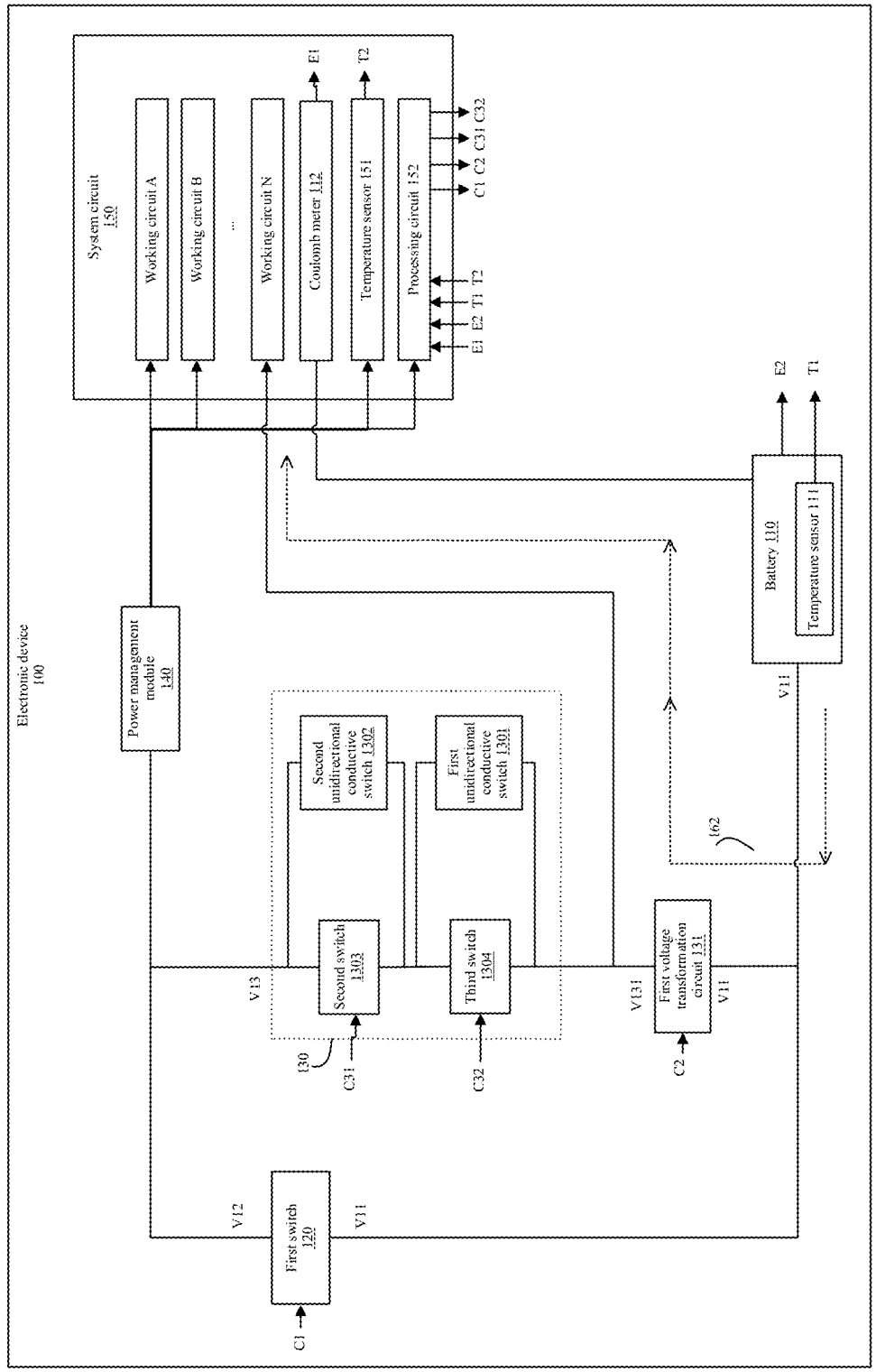

As shown in FIG. 9A to FIG. 9D, the battery 110 is electrically connected to an input end of the first voltage transformation circuit 131, and a first output end of the first voltage transformation circuit 131 may be electrically connected to some circuits of the system circuit 150. For example, as shown in FIG. 9D, the battery 110 may supply power to some circuits of the system circuit 150 through a path 162. For details, refer to the descriptions in the foregoing other embodiments. Details are not described herein again.

For example, in the foregoing embodiment, when the battery 110 supplies power to the system circuit 150 through the path 160, and the processing circuit 152 detects that the electronic device 100 meets the first condition, the first condition includes that a voltage of the battery 110 is not higher than the first preset voltage threshold. For example, the second preset voltage threshold is 3.4 V, and the first preset voltage threshold is 3.5 V. When the processing circuit detects that an output voltage of the battery 110 is 3.5 V, the processing circuit 152 first controls the first voltage transformation circuit 131 to work and the third switch 1304 and the second switch 1303 to be turned on, and the processing circuit 152 controls the output voltage of the first voltage transformation circuit 131 to be 3.5 V. In this case, after the output voltage of the first voltage transformation circuit 131 passes through the third switch 1304 and the second switch 1303, an output voltage is 3.5 V, so that the battery 110 may supply power to the system circuit 150 through the path 1612, and then the electronic device 100 can work normally. Then, the processing circuit 152 controls the first switch 120 to be turned off.

As shown in FIG. 9C, when the battery 110 supplies power to the system circuit 150 through the path 1612, and the processing circuit 152 detects that the electronic device 100 meets a second condition, the processing circuit 152 may control, through the signal circuit C32, the third switch 1304 to be turned off, so that the path 1612 is disconnected, and the path 1611 is connected. When the path 1611 is connected, the processing circuit 152 may control the path 160 to be connected, and may further control the path 1611 to be disconnected after the path 160 is connected. For details, refer to the embodiment related to FIG. 5A to FIG. 5C. Details are not described herein again.

Figure 10A:
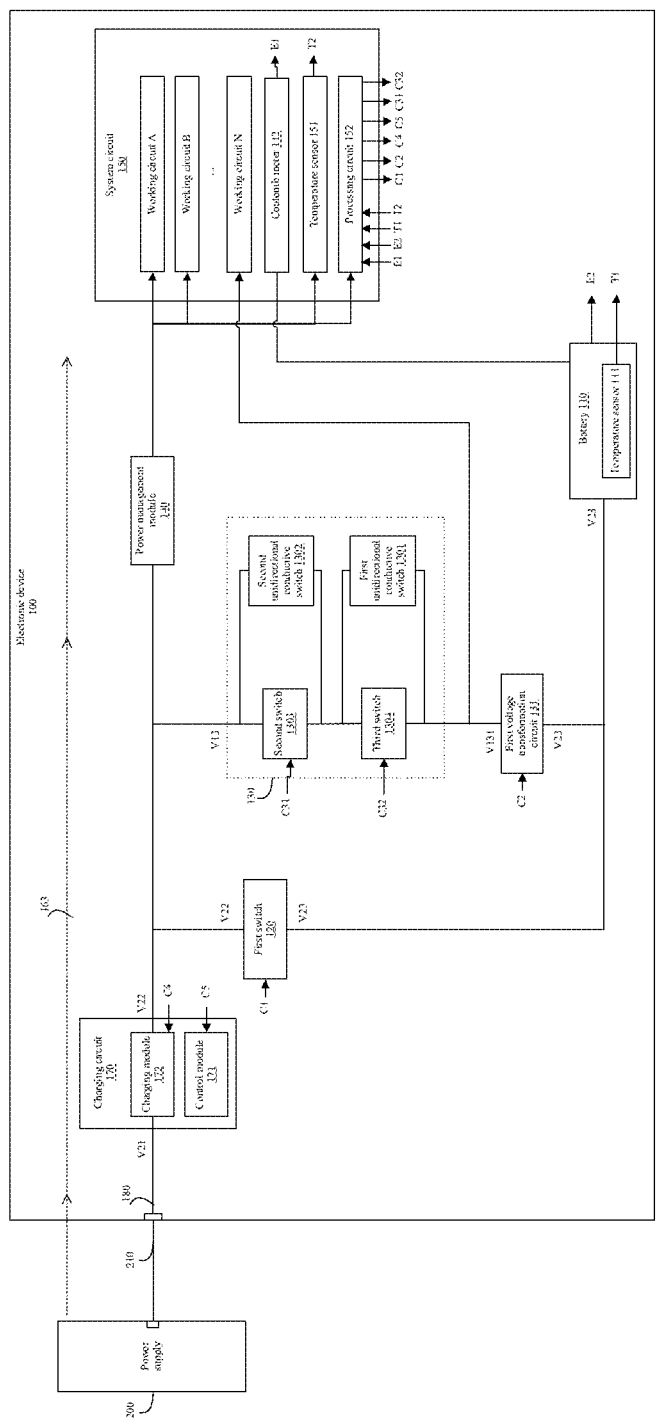
FIG. 10A to FIG. 10C are diagrams of structures of another group of electronic devices according to an embodiment of this disclosure.
Figure 10B:
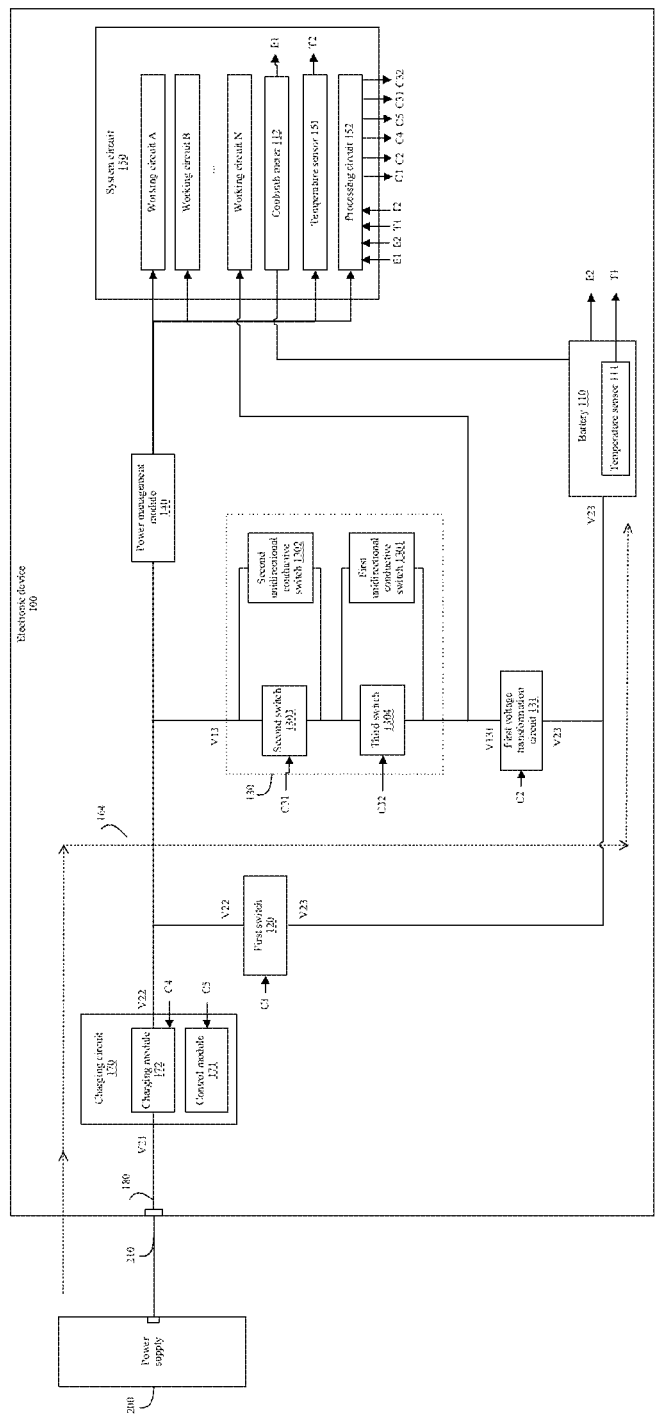
Figure 10C:
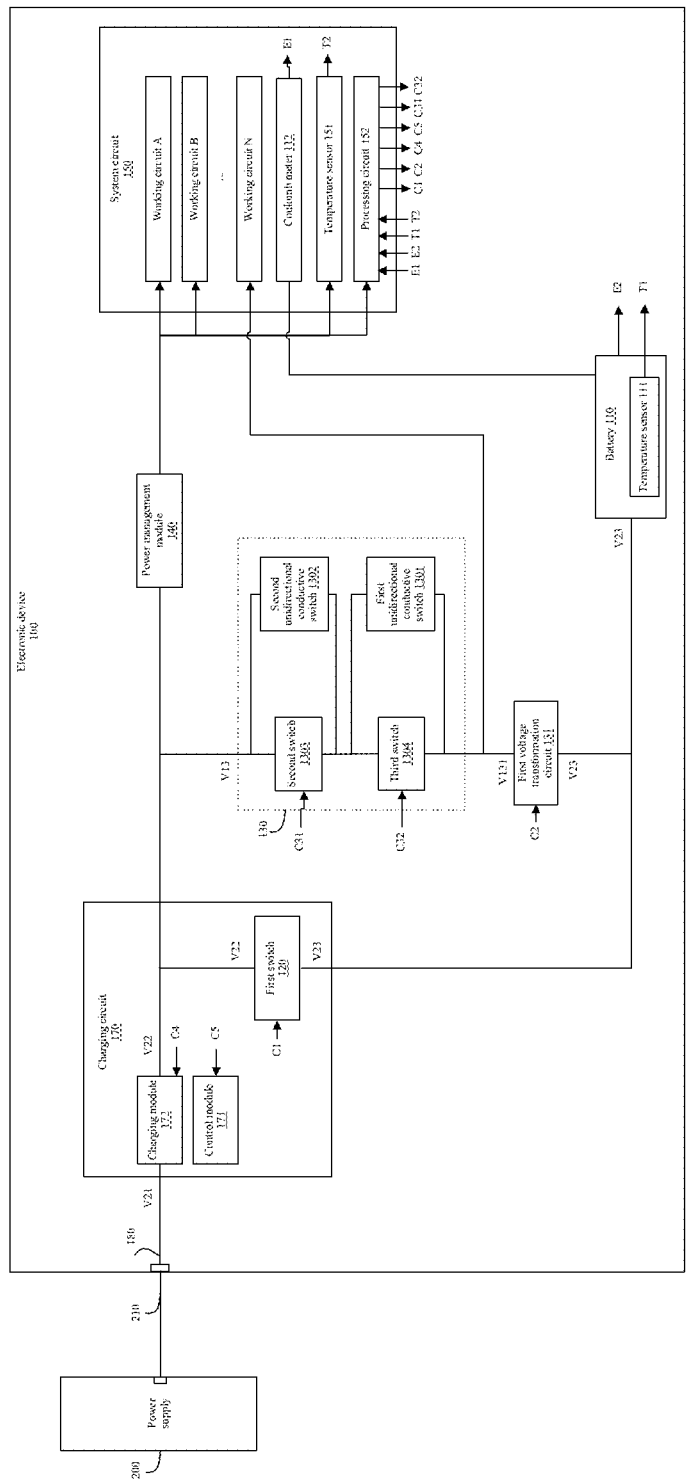

FIG. 10A to FIG. 10C each are a diagram of a structure of another electronic device according to an embodiment of this disclosure. As shown in FIG. 10A to FIG. 10C, based on the electronic device 100 shown in FIG. 9A to FIG. 9C, the electronic device 100 may further include a charging circuit 170 and an external power supply interface 180. The charging circuit 170 may include a control module 171 and a charging module 172. The electronic device 100 may further be connected to an external power supply 200, and the external power supply 200 may be electrically connected to the electronic device 100 through the external power supply interface 180. The processing circuit 152 may be electrically connected to the control module 171 and the charging module 172, and the processing circuit 152 may control working statuses of the charging module 172 and the control module 171. It should be noted that, for the charging circuit 170 and the external power supply 200, refer to related descriptions in the foregoing other embodiments. Details are not described herein again.

In this embodiment of this disclosure, as shown in FIG. 10C, the first switch 120 may be alternatively disposed in the charging circuit 170, so that an area of a circuit board occupied by the first switch 120 can be reduced, and more electronic components can be placed on the circuit board.

As shown in FIG. 10A to FIG. 10C, when the electronic device 100 is connected to the external power supply 200, the external power supply 200 may be electrically connected to the charging module 172, and the external power supply 200 may provide a voltage V21 for the charging module 172. The charging module 172 may be electrically connected to an input end of the power management module 140, and an output end of the power management module 140 may be electrically connected to the system circuit 150. Based on the electronic device 100 in FIG. 6A to FIG. 6C, the first switch module 130 may further include a third switch 1304. The first unidirectional conductive switch 1301 is electrically connected in parallel to the third switch 1304, a first end of the third switch 1304 is electrically connected to a first end of the first unidirectional conductive switch 1301, and a second end of the third switch 1304 is electrically connected to a second end of the first unidirectional conductive switch 1301. When the battery 110 supplies power to the system circuit 150 through a path 1612, and the processing circuit 152 detects that the external power supply 200 is connected, the processing circuit 152 may control, through a signal circuit C32, the third switch 1304 to be turned off. In response to that an input signal of a control end of the third switch 1304 is a turn-off signal, the third switch 1304 is turned off, the path 1612 is disconnected, and a path 1611 is connected. When the path 1611 is connected, for example, as shown in FIG. 10A, the processing circuit 152 may control a path 163 to be connected, and may further control the path 1611 to be disconnected after the path 163 is connected. For example, as shown in FIG. 10B, the processing circuit 152 may alternatively control a path 164 to be connected. When the path 1611 is connected, the processing circuit 152 may alternatively control the path 160 to be connected; and may further control the path 1611 to be disconnected after the path 160 is connected, and then control the path 163 and the path 164 to be connected, so that the path 160 is disconnected. For details, refer to the embodiment related to FIG. 6A to FIG. 6C. Details are not described herein again.

In some embodiments, the first switch 120, the second switch 1303, the third switch 1304, the first unidirectional conductive switch 1301, and the second unidirectional conductive switch 1302 in the foregoing embodiments may be a switch Q1, a switch Q2, a switch Q3, a diode D1, and a diode D2 respectively. Any one or more of the switch Q1, the switch Q2, or the switch Q3 may be a MOS transistor (for example, a PMOS transistor or an NMOS transistor) or may be a triode. An anode of the diode D1 is the first end of the first unidirectional conductive switch 1301, and a cathode of the diode D1 is the second end of the first unidirectional conductive switch 1301. An anode of the diode D2 is a second end of the second unidirectional conductive switch 1302, and a cathode of the diode D2 is a first end of the second unidirectional conductive switch 1302.

In this embodiment of this disclosure, the first unidirectional conductive switch 1301 may be a part of the third switch 1304, in other words, the diode D1 may be a parasitic diode of the switch Q3; or the diode D1 may be a diode connected in parallel to the switch Q3. The second unidirectional conductive switch 1302 may be a part of the second switch 1303, in other words, the diode D2 may be a parasitic diode of the switch Q2; or the diode D2 may be a diode connected in parallel to the switch Q2.

For example, the following describes in detail the power supply circuit provided in embodiments of this disclosure by using an example in which the first unidirectional conductive switch 1301 and the second unidirectional conductive switch 1302 are the diode D1 and the diode D2 respectively, and the switch Q1, the switch Q2, and the switch Q3 are PMOS transistors. The PMOS transistor has an s electrode, a g electrode, and a d electrode, and Vgs is a voltage between the g electrode and the s electrode. When Vgs is lower than a first voltage threshold (for example, −0.4 V), the PMOS transistor is conducted. An s electrode, a g electrode, and a d electrode of the switch Q1 are a second end, a control end, and a first end of the first switch 120 respectively; an s electrode, a g electrode, and a d electrode of the switch Q2 are a first end, a control end, and a second end of the second switch 1303 respectively; and an s electrode, a g electrode, and a d electrode of the switch Q3 are a second end, a control end, and a first end of the third switch 1304 respectively.

It should be noted that the processing circuit 152 may include one or more processing units, and the processing circuit 152 may control, through a signal circuit C1, the switch Q1 to be turned on or turned off. In response to that an input signal of a control end of the switch Q1 is an open circuit (for example, the open circuit received by the control end of the switch Q1 may be a signal output by the processing circuit 152, or may be a signal generated based on a signal output by the processing circuit 152), the g electrode may be pulled up to the s electrode by using a pull-up resistor, Vgs is not lower than the first voltage threshold, and the switch Q1 is turned off. Alternatively, in response to that an input signal of a control end of the switch Q1 is at a low level (for example, the low level received by the control end of the switch Q1 may be a signal output by the processing circuit 152, or may be a signal generated based on a signal output by the processing circuit 152), Vgs is lower than the first voltage threshold, and the switch Q1 is turned on. For ease of description, that the processing circuit 152 may control, through the signal circuit C1, the switch Q1 to be turned on or turned off, and in response to that the input signal of the control end of the switch Q1 is at the low level or the open circuit, the switch Q1 is turned on or turned off is used as a uniform description in the following embodiments. The processing circuit 152 may control, through a signal circuit C31, the switch Q2 to be turned on or turned off. In response to that an input signal of a control end of the switch Q2 is an open circuit (for example, the open circuit received by the control end of the switch Q2 may be a signal output by the processing circuit 152, or may be a signal generated based on a signal output by the processing circuit 152), the g electrode may be pulled up to the s electrode by using a pull-up resistor, Vgs is not lower than the first voltage threshold, and the switch Q2 is turned off. Alternatively, in response to that an input signal of a control end of the switch Q2 is at a low level (for example, the low level received by the control end of the switch Q2 may be a signal output by the processing circuit 152, or may be a signal generated based on a signal output by the processing circuit 152), Vgs is lower than the first voltage threshold, and the switch Q2 is turned on. For ease of description, that the processing circuit 152 may control, through the signal circuit C31, the switch Q2 to be turned on or turned off, and in response to that the input signal of the control end of the switch Q2 is at the low level or the open circuit, the switch Q2 is turned on or turned off is used as a uniform description in the following embodiments. The processing circuit 152 may control, through a signal circuit C32, the switch Q3 to be turned on or turned off. In response to that an input signal of a control end of the switch Q3 is an open circuit (for example, the open circuit received by the control end of the switch Q3 may be a signal output by the processing circuit 152, or may be a signal generated based on a signal output by the processing circuit 152), the g electrode may be pulled up to the s electrode by using a pull-up resistor, Vgs is not lower than the first voltage threshold, and the switch Q3 is turned off. Alternatively, in response to that an input signal of a control end of the switch Q3 is at a low level (for example, the low level received by the control end of the switch Q3 may be a signal output by the processing circuit 152, or may be a signal generated based on a signal output by the processing circuit 152), Vgs is lower than the first voltage threshold, and the switch Q3 is turned on. For ease of description, that the processing circuit 152 may control, through the signal circuit C32, the switch Q3 to be turned on or turned off, and in response to that the input signal of the control end of the switch Q3 is at the low level or the open circuit, the switch Q3 is turned on or turned off is used as a uniform description in the following embodiments.

Figure 11A:
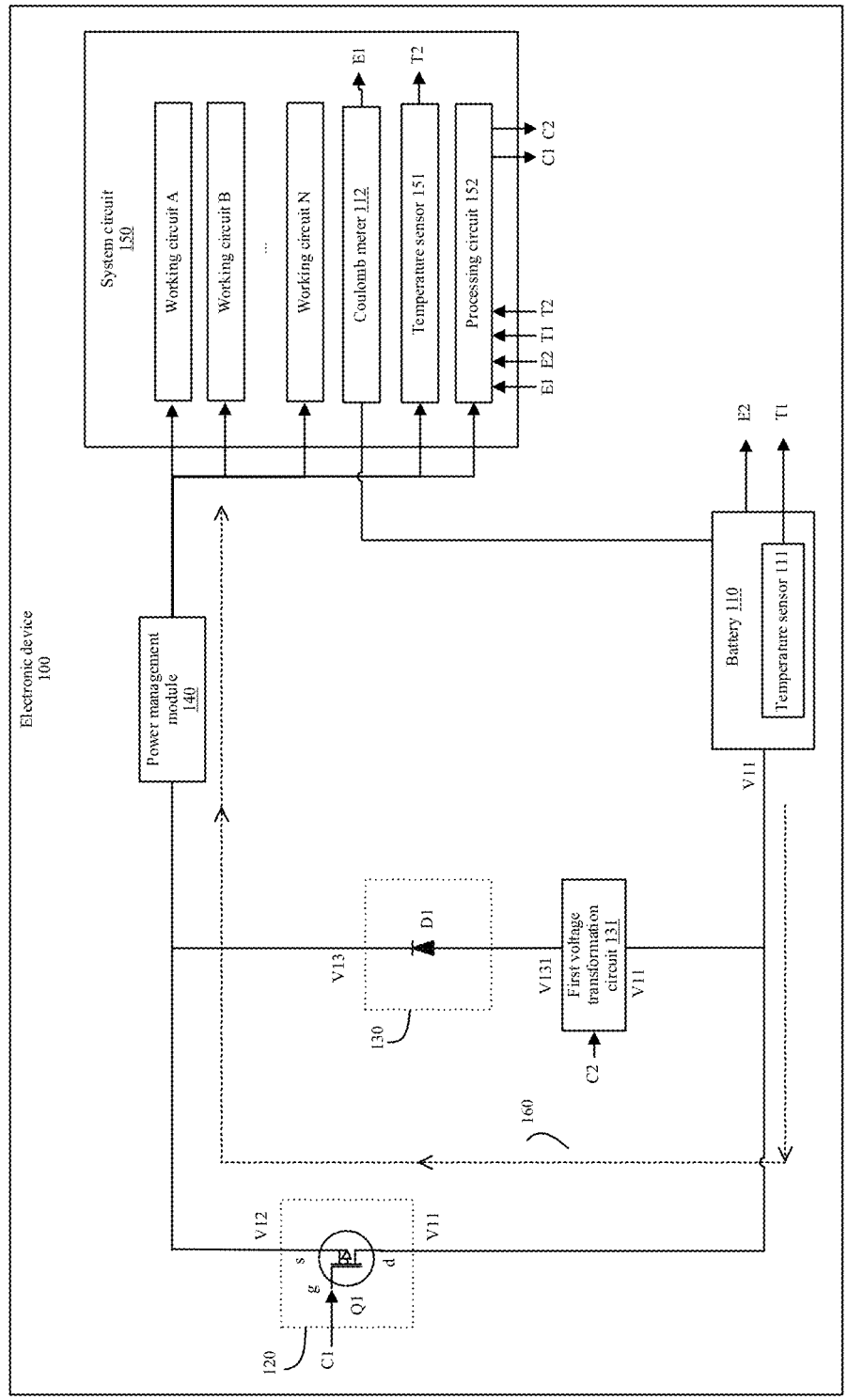
FIG. 11A and FIG. 11B are diagrams of structures of another group of electronic devices according to an embodiment of this disclosure.
Figure 11B:
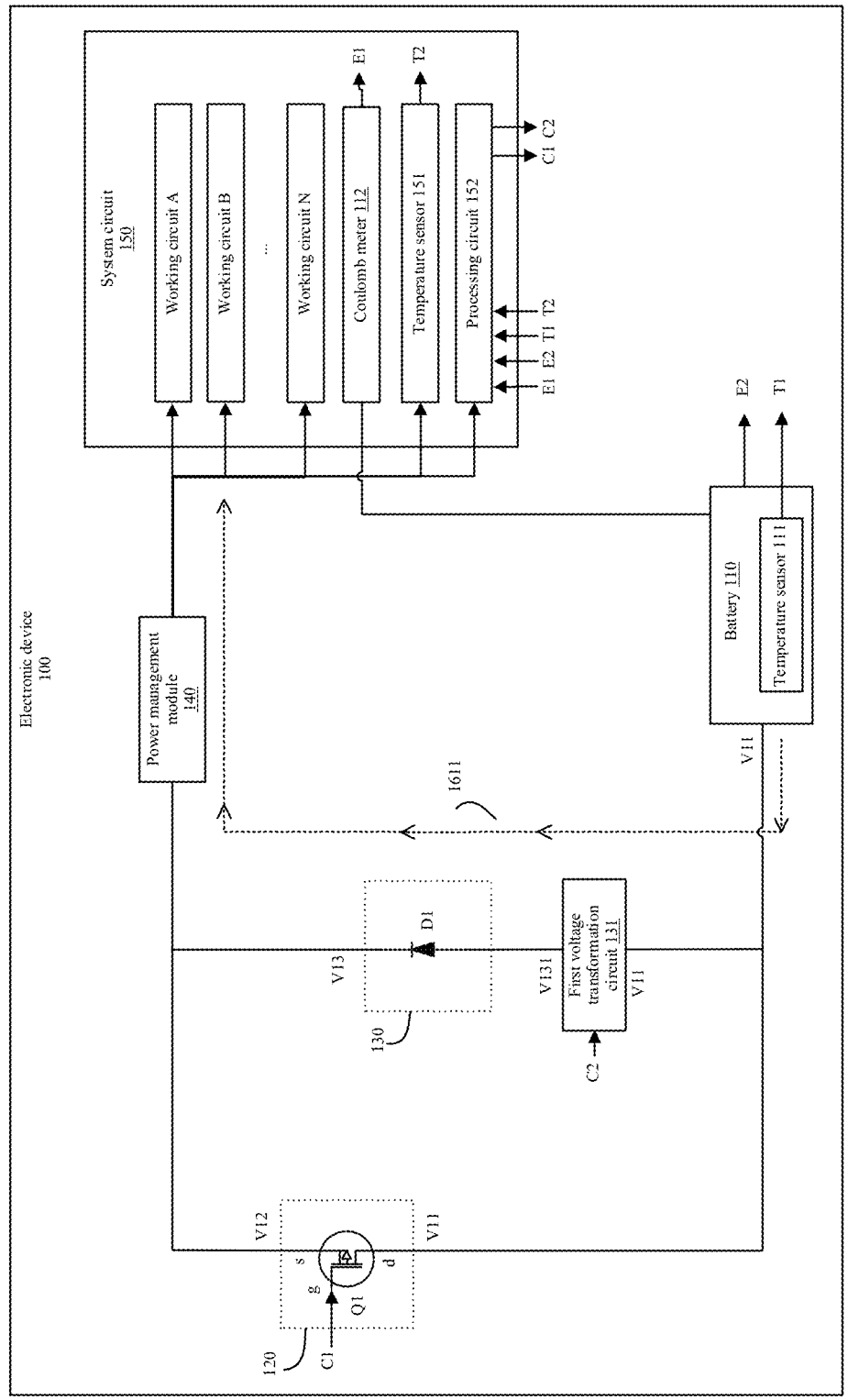

FIG. 11A and FIG. 11B show an implementation of the first switch 120 and the first unidirectional conductive switch 1301 in FIG. 3A and FIG. 3B. The first switch 120 may include the switch Q1, and the first unidirectional conductive switch 1301 may include the diode D1.

As shown in FIG. 11A and FIG. 11B, the battery 110 may be electrically connected to the d electrode of the switch Q1, and an s electrode of the switch Q1 may be electrically connected to an input end of the power management module 140; and the anode of the diode D1 may be electrically connected to a first output end of the first voltage transformation circuit 131, and the cathode of the diode D1 may be electrically connected to the input end of the power management module 140. For example, as shown in FIG. 11A, a path 160 indicates a current flow direction from the battery 110 to the system circuit 150 through the switch Q1 and the power management module 140. The processing circuit 152 may control, through the signal circuit C1, the switch Q1 to be turned on. In response to that the input signal of the control end of the switch Q1 is at the low level, the switch Q1 is turned on, and the path 160 is connected. Alternatively, the processing circuit 152 may control, through the signal circuit C1, the switch Q1 to be turned off. In response to that the input signal of the control end of the switch Q1 is the open circuit, the switch Q1 is turned off, and the path 160 is disconnected. As shown in FIG. 11B, a path 1611 indicates a current flow direction from the battery 110 to the system circuit 150 through the first voltage transformation circuit 131, the diode D1, and the power management module 140. The processing circuit 152 may control the first voltage transformation circuit 131 to work. The first voltage transformation circuit 131 may output a voltage V131 through the first output end, and when the output voltage V131 of the first output end of the first voltage transformation circuit 131 is higher than a positive conduction voltage of the diode D1, the diode D1 is conducted, and the path 1611 is connected. Alternatively, the processing circuit 152 may control the first voltage transformation circuit 131 to be disconnected, so that the path 1611 is disconnected.

As shown in FIG. 11A, when the path 160 is connected, and the processing circuit 152 detects that the electronic device 100 meets a first condition, the processing circuit 152 may control the path 1611 to be connected, and may further control the path 160 to be disconnected after the path 1611 is connected. For details, refer to the embodiment related to FIG. 3A and FIG. 3B. Details are not described herein again.

As shown in FIG. 11B, when the path 1611 is connected, and the processing circuit 152 detects that the electronic device 100 meets a second condition, the processing circuit 152 may control the path 160 to be connected, and may further control the path 1611 to be disconnected after the path 160 is connected. For details, refer to the embodiment related to FIG. 3A and FIG. 3B. Details are not described herein again.

Figure 12A:
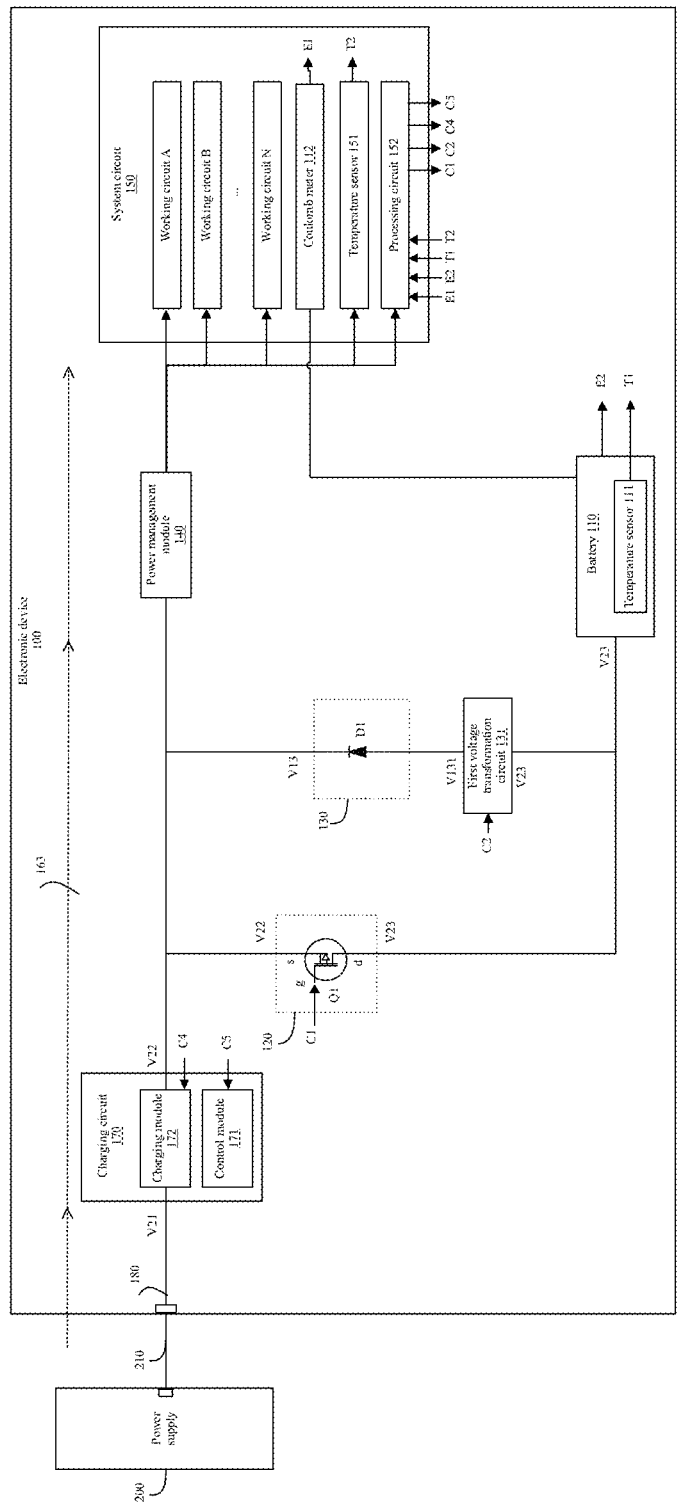
FIG. 12A to FIG. 12C are diagrams of structures of another group of electronic devices according to an embodiment of this disclosure.
Figure 12B:
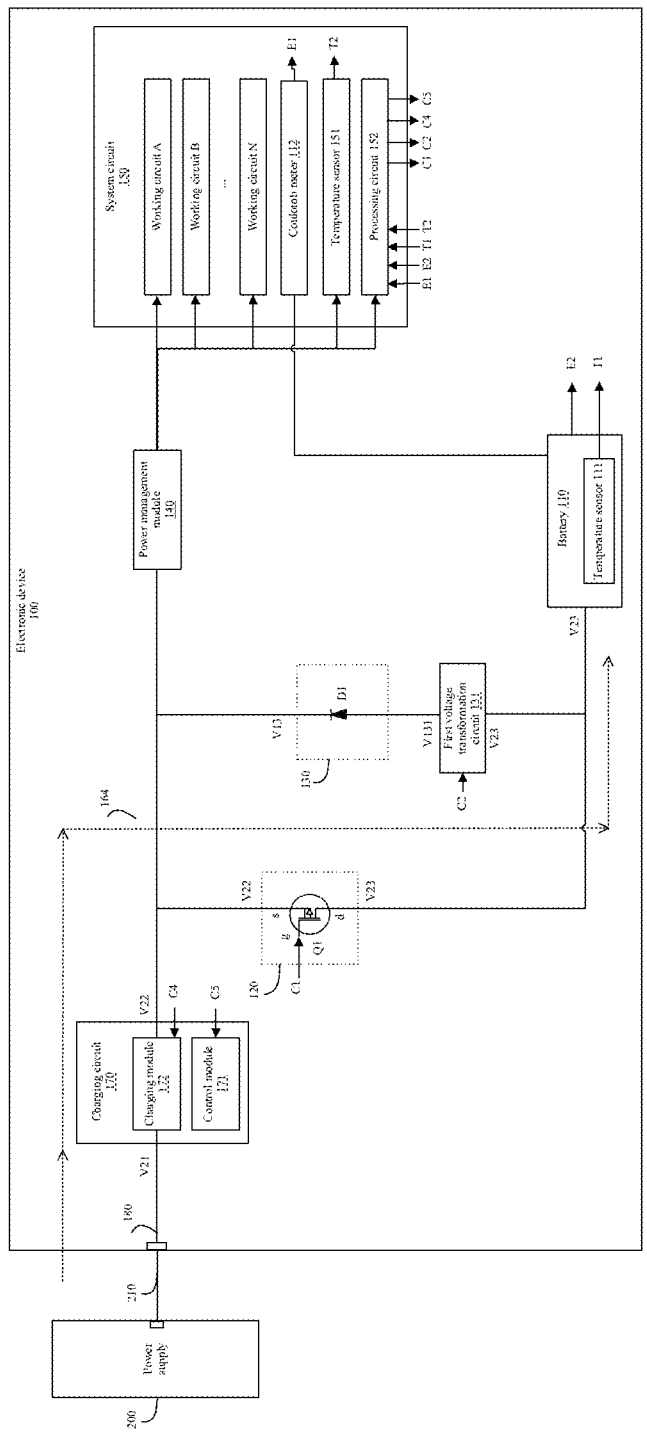
Figure 12C:
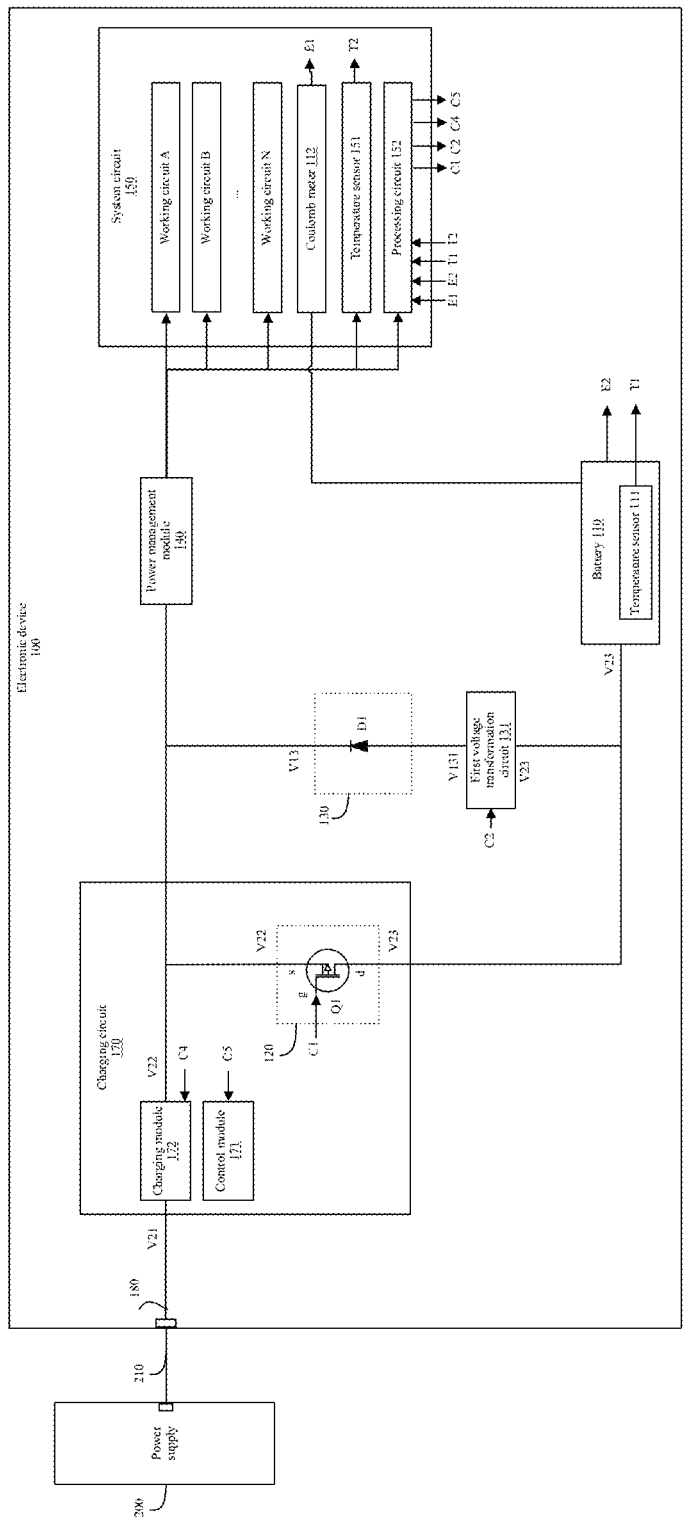

FIG. 12A to FIG. 12C each are a diagram of a structure of another electronic device according to an embodiment of this disclosure. As shown in FIG. 12A to FIG. 12C, based on the electronic device 100 shown in FIG. 11A and FIG. 11B, the electronic device 100 may further include a charging circuit 170 and an external power supply interface 180, and an external power supply 200 may be electrically connected to the electronic device 100 through the external power supply interface 180. It should be noted that, for the charging circuit 170, the external power supply interface 180, and the external power supply 200, refer to related descriptions in the foregoing other embodiments. Details are not described herein again.

FIG. 12A to FIG. 12C show an implementation of the first switch 120 and the first unidirectional conductive switch 1301 in FIG. 4A to FIG. 4C. The first switch 120 may include the switch Q1, the first unidirectional conductive switch 1301 may include the diode D1, the battery 110 may be electrically connected to the d electrode of the switch Q1, and the s electrode of the switch Q1 may be electrically connected to the charging module 172. For example, as shown in FIG. 12B, a path 164 indicates a current flow direction from the external power supply 200 to the battery 110 through the charging module 172 and the switch Q1. The processing circuit 152 may control, through the signal circuit C1, the switch Q1 to be turned on. In response to that the input signal of the control end of the switch Q1 is the low level, the switch Q1 is turned on, and the path 164 is connected. Alternatively, the processing circuit 152 may control, through the signal circuit C1, the switch Q1 to be turned off. In response to that the input signal of the control end of the switch Q1 is the open circuit, the switch Q1 is turned off, and the path 164 is disconnected.

As shown in FIG. 11B, when the path 1611 is connected, and the processing circuit 152 detects that the external power supply 200 is connected, the processing circuit 152 may control the path 163 to be connected; may further control the path 1611 to be disconnected after the path 163 is connected; and may further control the path 164 to be connected. Alternatively, when the path 1611 is connected, the processing circuit 152 may control the path 160 to be connected; and may further control the path 1611 to be disconnected after the path 160 is connected, and then control the path 163 and the path 164 to be connected, so that the path 160 is disconnected. Alternatively, when the path 1611 is connected, the processing circuit 152 may control the path 160 to be connected, and then control the path 163 and the path 164 to be connected, so that the path 160 is disconnected; and may further control the path 1611 to be disconnected after the path 160 is disconnected. For details, refer to the embodiment related to FIG. 4A to FIG. 4C. Details are not described herein again.

Figure 13A:
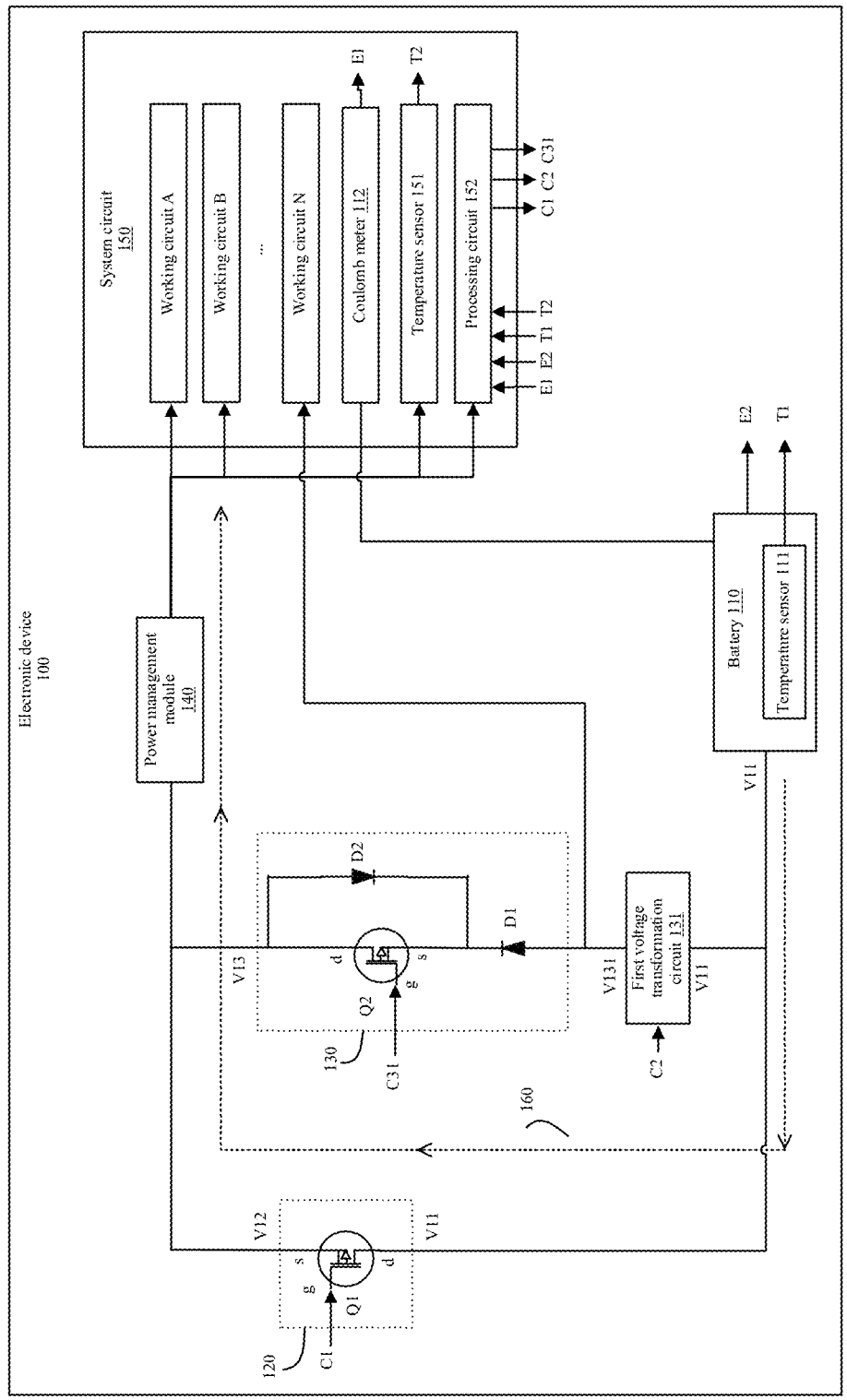
FIG. 13A to FIG. 13C are diagrams of structures of another group of electronic devices according to an embodiment of this disclosure.
Figure 13B:
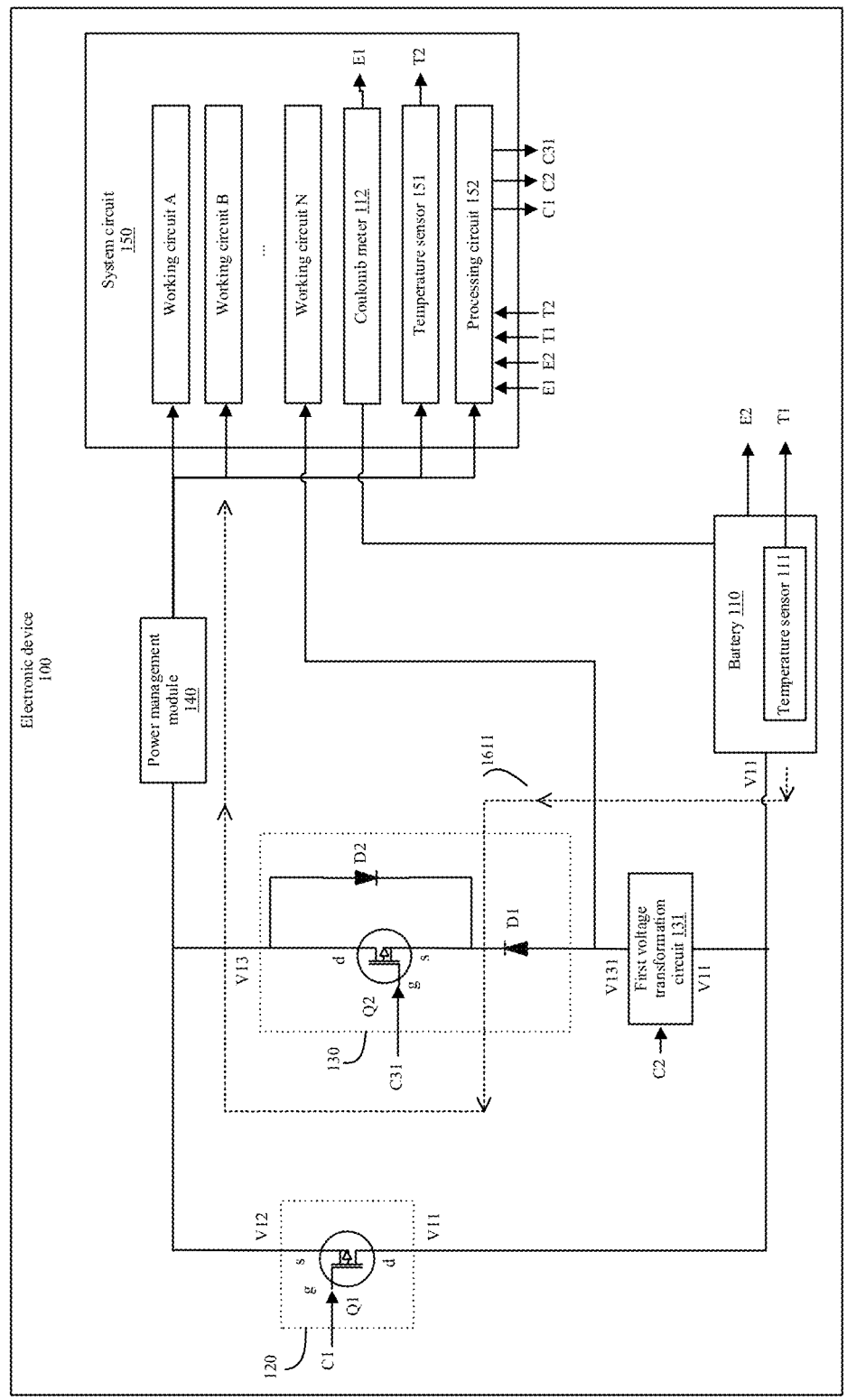
Figure 13C:
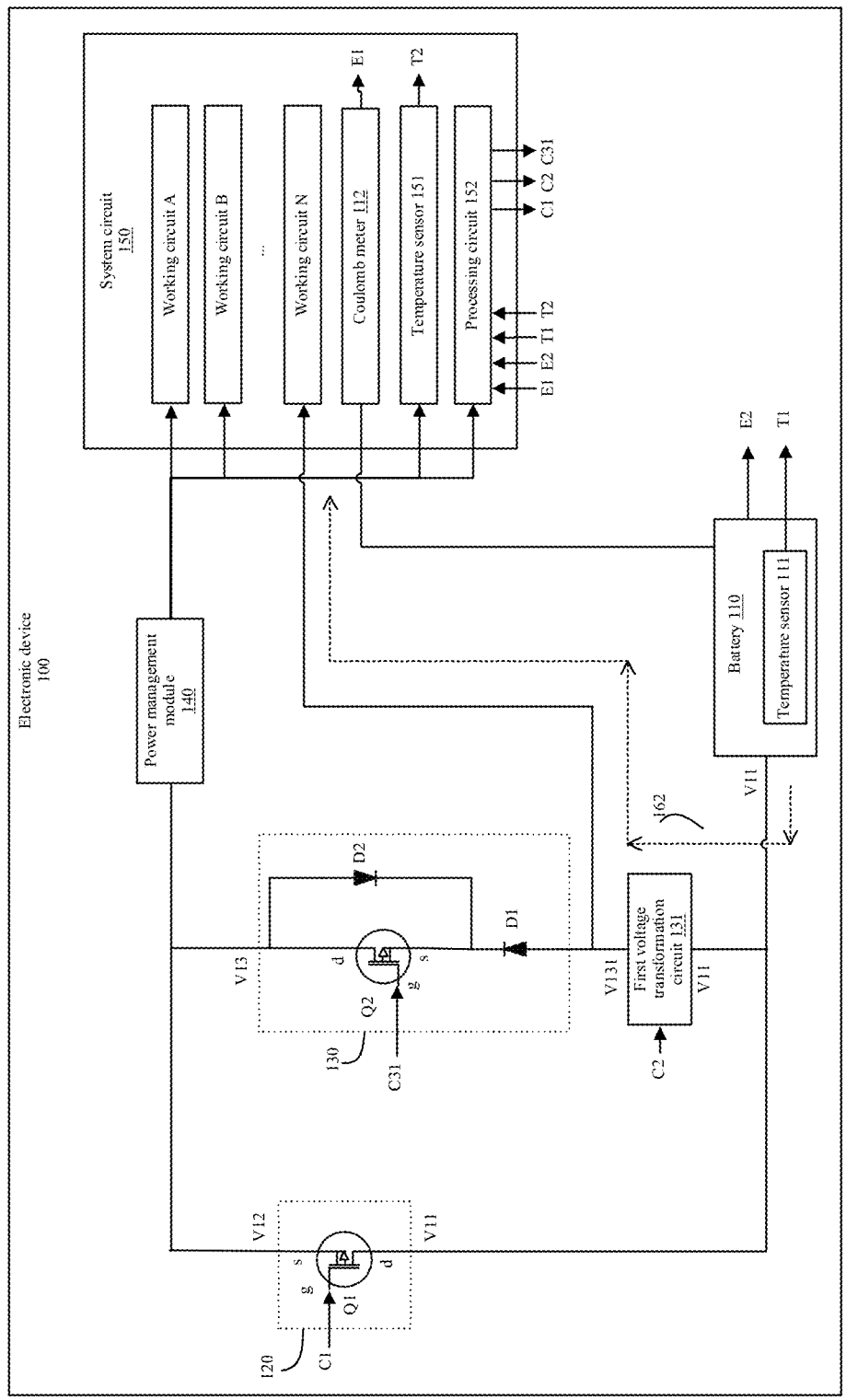

FIG. 13A to FIG. 13C show an implementation of the first switch 120, the first unidirectional conductive switch 1301, the second switch 1303, and the second unidirectional conductive switch 1302 in FIG. 5A to FIG. 5C. The first switch 120 may include the switch Q1, the first unidirectional conductive switch 1301 may include the diode D1, the second switch 1303 may include the switch Q2, and the second unidirectional conductive switch 1302 may include the diode D2.

In this embodiment of this disclosure, the diode D2 may be a part of the switch Q2, so that an area of a circuit board occupied by the diode D2 can be reduced, and more electronic components can be placed on the circuit board.

As shown in FIG. 13A, a path 160 indicates a current flow direction from the battery 110 to the system circuit 150 through the switch Q1 and the power management module 140. The processing circuit 152 may control, through a signal circuit C1, the switch Q1 to be turned on. In response to that an input signal of a control end of the switch Q1 is at a low level, the switch Q1 is turned on, and the path 160 is connected. Alternatively, the processing circuit 152 may control, through a signal circuit C1, the switch Q1 to be turned off. In response to that an input signal of a control end of the switch Q1 is an open circuit, the switch Q1 is turned off, and the path 160 is disconnected. As shown in FIG. 13B, the diode D1 and the switch Q2 are electrically connected in series to a path 1611, where the path 1611 indicates a current flow direction from the battery 110 to the system circuit 150 through the first voltage transformation circuit 131, the diode D1, the switch Q2, and the power management module 140. The processing circuit 152 may control the first voltage transformation circuit 131 to work, and the first voltage transformation circuit 131 may output a voltage V131 through a first output end. When the output voltage V131 of the first output end of the first voltage transformation circuit 131 is higher than a forward conduction voltage of the diode D1, the diode D1 is conducted. Alternatively, the processing circuit 152 may control, through a signal circuit C31, the switch Q2 to be turned on, and in response to that an input signal of a control end of the switch Q2 is at a low level, the switch Q2 is turned on. When the diode D1 is conducted and the switch Q2 is turned on, the path 1611 is connected. Alternatively, the processing circuit 152 may control, through a signal circuit C31, the switch Q2 to be turned off, and in response to an input signal of a control end of the switch Q2 is an open circuit, the switch Q2 is turned off, and the path 1611 is disconnected.

As shown in FIG. 13A, when the path 160 is connected, and the processing circuit 152 detects that the electronic device 100 meets a first condition, the processing circuit 152 may control the path 1611 to be connected, and may further control the path 160 to be disconnected after the path 1611 is connected. For details, refer to the embodiment related to FIG. 5A to FIG. 5C. Details are not described herein again.

As shown in FIG. 13B, when the path 1611 is connected, and the processing circuit 152 detects that the electronic device 100 meets a second condition, the processing circuit 152 may control the path 160 to be connected, and may further control the path 1611 to be disconnected after the path 160 is connected. For details, refer to the embodiment related to FIG. 5A to FIG. 5C. Details are not described herein again.

As shown in FIG. 13C, the battery 110 may further supply power to some working circuits of the system circuit 150 through a path 162. For details, refer to the embodiment related to FIG. 5A to FIG. 5C. Details are not described herein again.

Figure 14A:
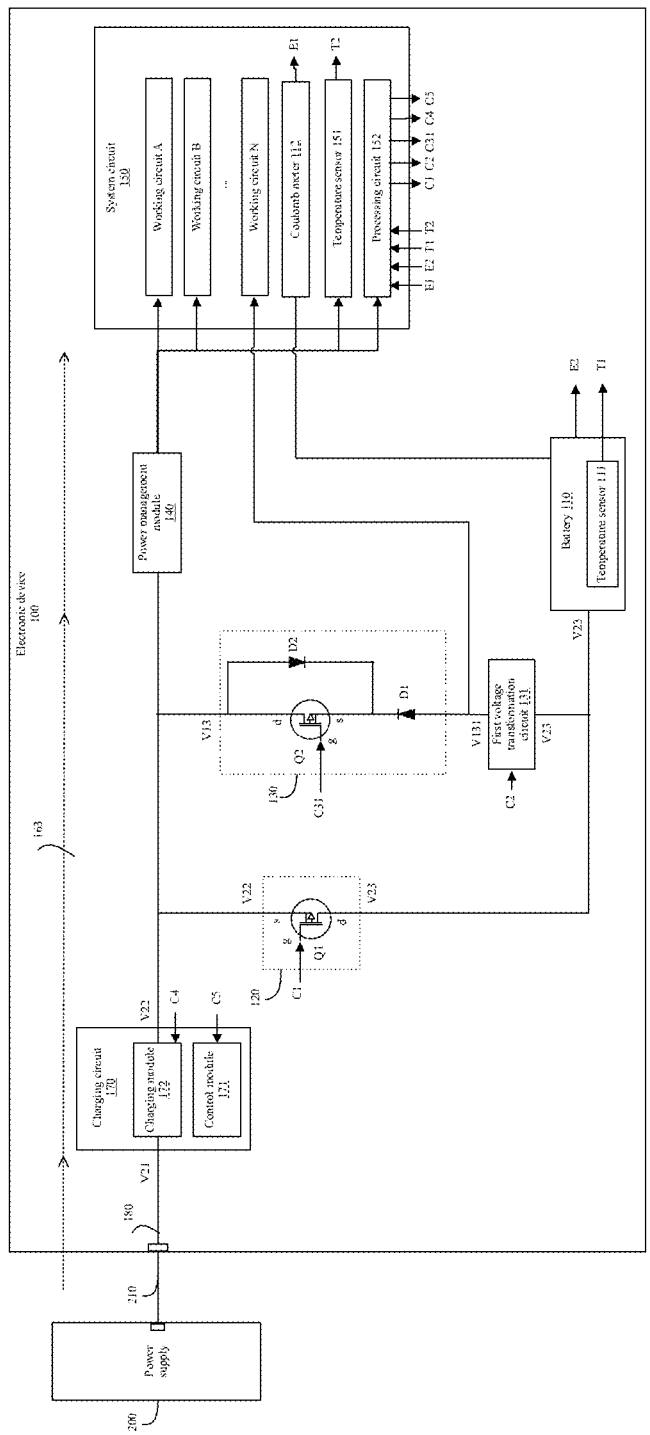
FIG. 14A to FIG. 14C are diagrams of structures of another group of electronic devices according to an embodiment of this disclosure.
Figure 14B:
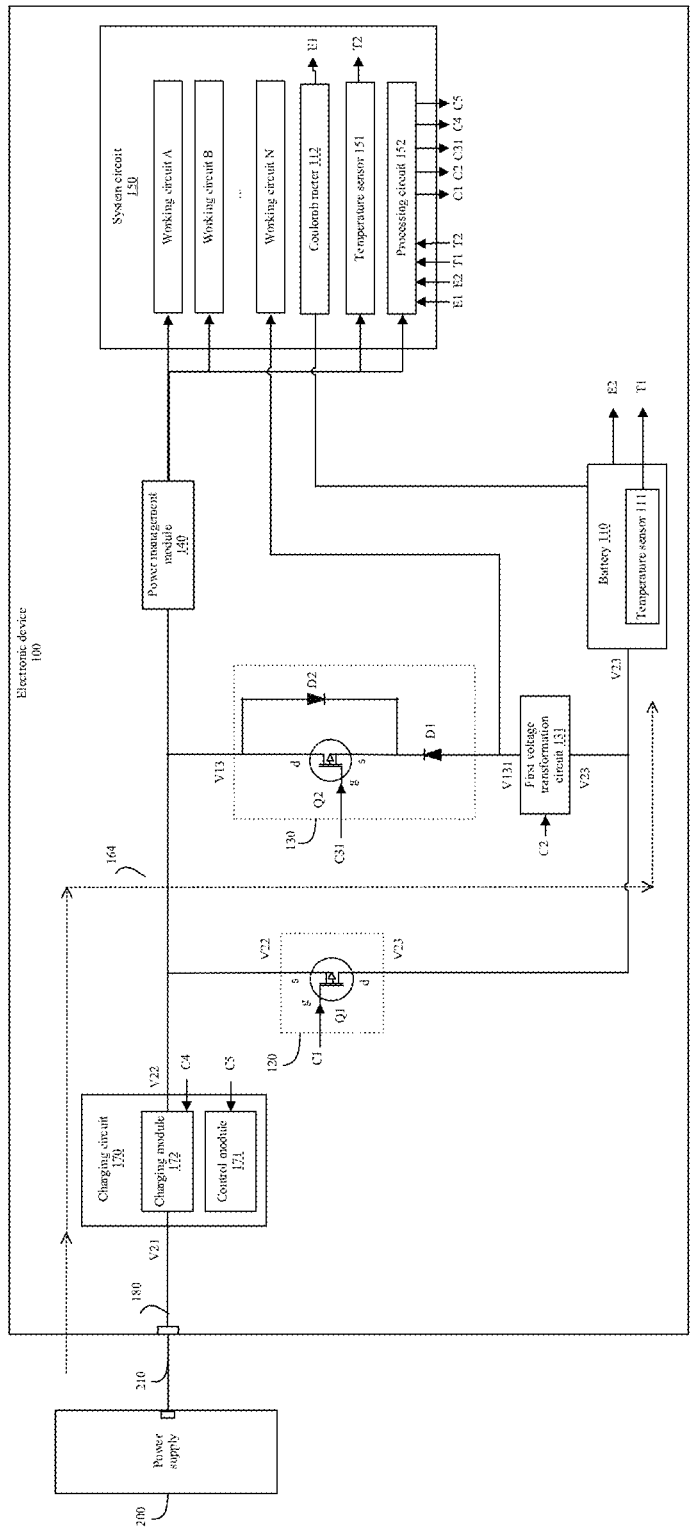
Figure 14C:
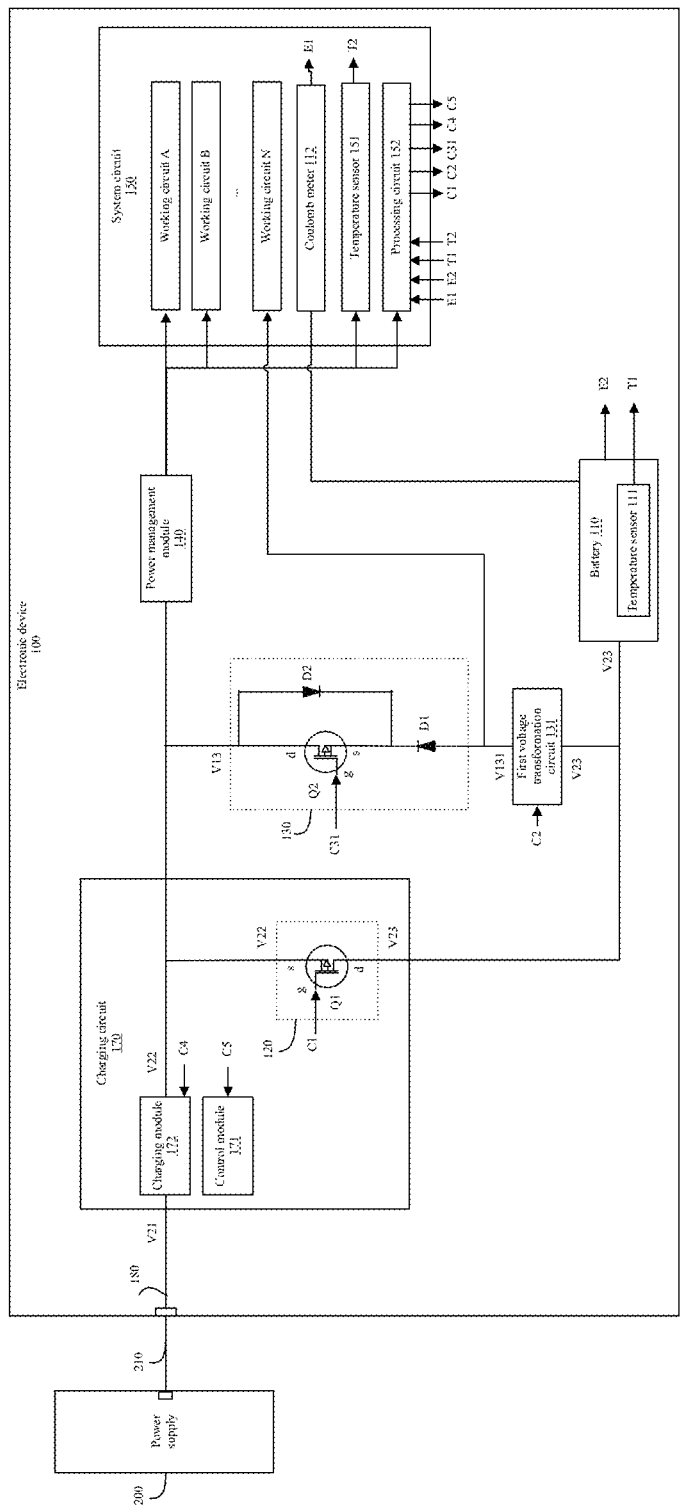

FIG. 14A to FIG. 14C each are a diagram of a structure of another electronic device according to an embodiment of this disclosure. As shown in FIG. 14A to FIG. 14C, based on the electronic device 100 shown in FIG. 13A and FIG. 13C, the electronic device 100 may further include a charging circuit 170 and an external power supply interface 180, and an external power supply 200 may be electrically connected to the electronic device 100 through the external power supply interface 180. It should be noted that, for the charging circuit 170, the external power supply interface 180, and the external power supply 200, refer to related descriptions in the foregoing other embodiments. Details are not described herein again.

FIG. 14A to FIG. 14C show an implementation of the first switch 120, the first unidirectional conductive switch 1301, the second switch 1303, and the second unidirectional conductive switch 1302 in FIG. 6A to FIG. 6C. The first switch 120 may include the switch Q1, the first unidirectional conductive switch 1301 may include the diode D1, the second switch 1303 may include the switch Q2, and the second unidirectional conductive switch 1302 may include the diode D2. For example, as shown in FIG. 14B, a path 164 indicates a current flow direction from the external power supply 200 to the battery 110 through the charging module 172 and the switch Q1. For a manner in which the processing circuit 152 controls the path 164 to be connected or disconnected, refer to specific descriptions in a related embodiment in FIG. 12A to FIG. 12C. Details are not described herein again.

As shown in FIG. 13B, when the path 1611 is connected, and the processing circuit 152 detects that the external power supply 200 is connected, the processing circuit 152 may control the path 163 to be connected; may further control the path 1611 to be disconnected after the path 163 is connected; and may further control the path 164 to be connected. Alternatively, when the path 1611 is connected, the processing circuit 152 may control the path 160 to be connected; and may further control the path 1611 to be disconnected after the path 160 is connected, and then control the path 163 and the path 164 to be connected, so that the path 160 is disconnected. Alternatively, when the path 1611 is connected, the processing circuit 152 may control the path 160 to be connected, and then control the path 163 and the path 164 to be connected, so that the path 160 is disconnected; and may further control the path 1611 to be disconnected after the path 160 is disconnected. For details, refer to the embodiment related to FIG. 6A to FIG. 6C. Details are not described herein again.

Figure 15A:
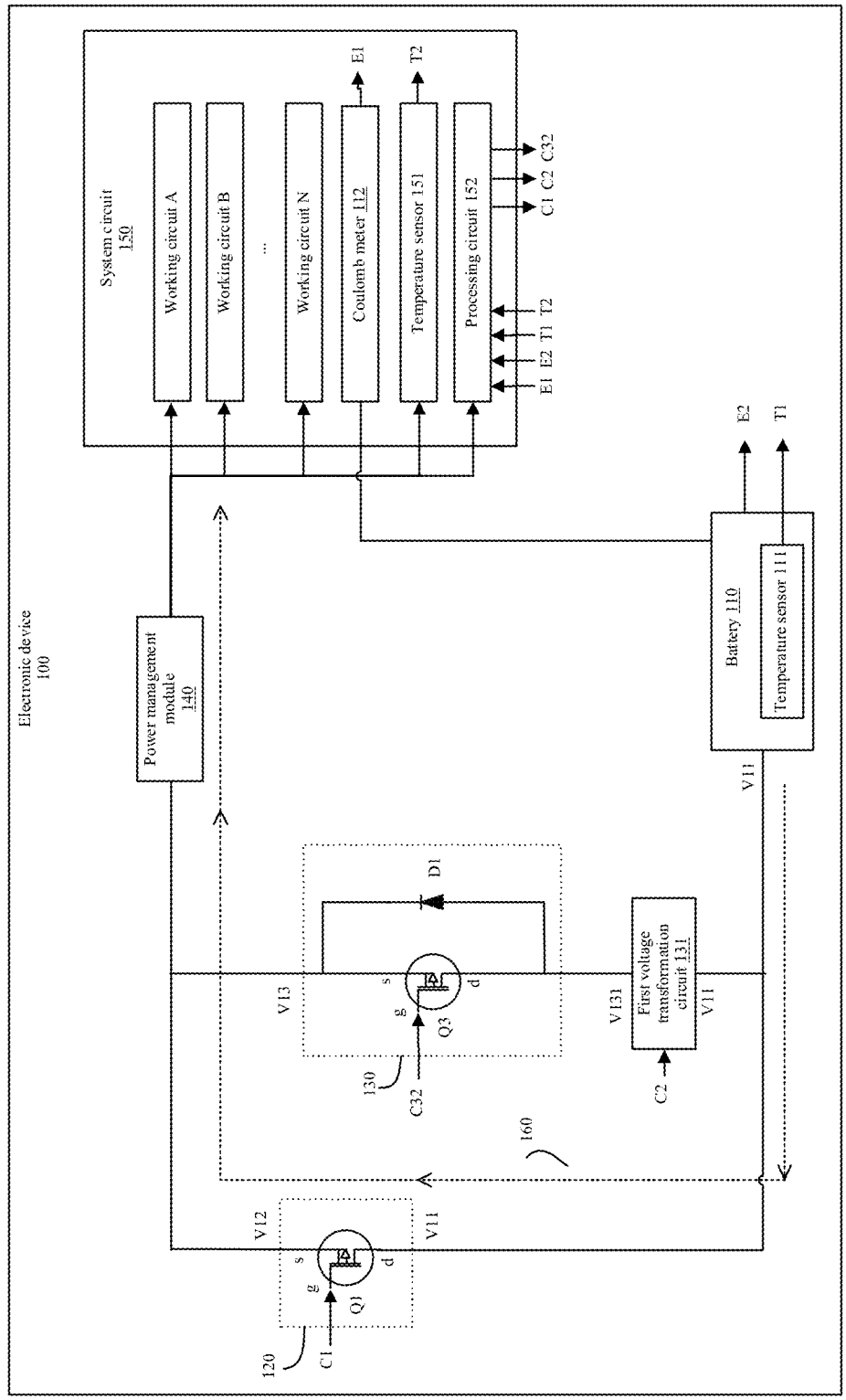
FIG. 15A to FIG. 15C are diagrams of structures of another group of electronic devices according to an embodiment of this disclosure.
Figure 15B:
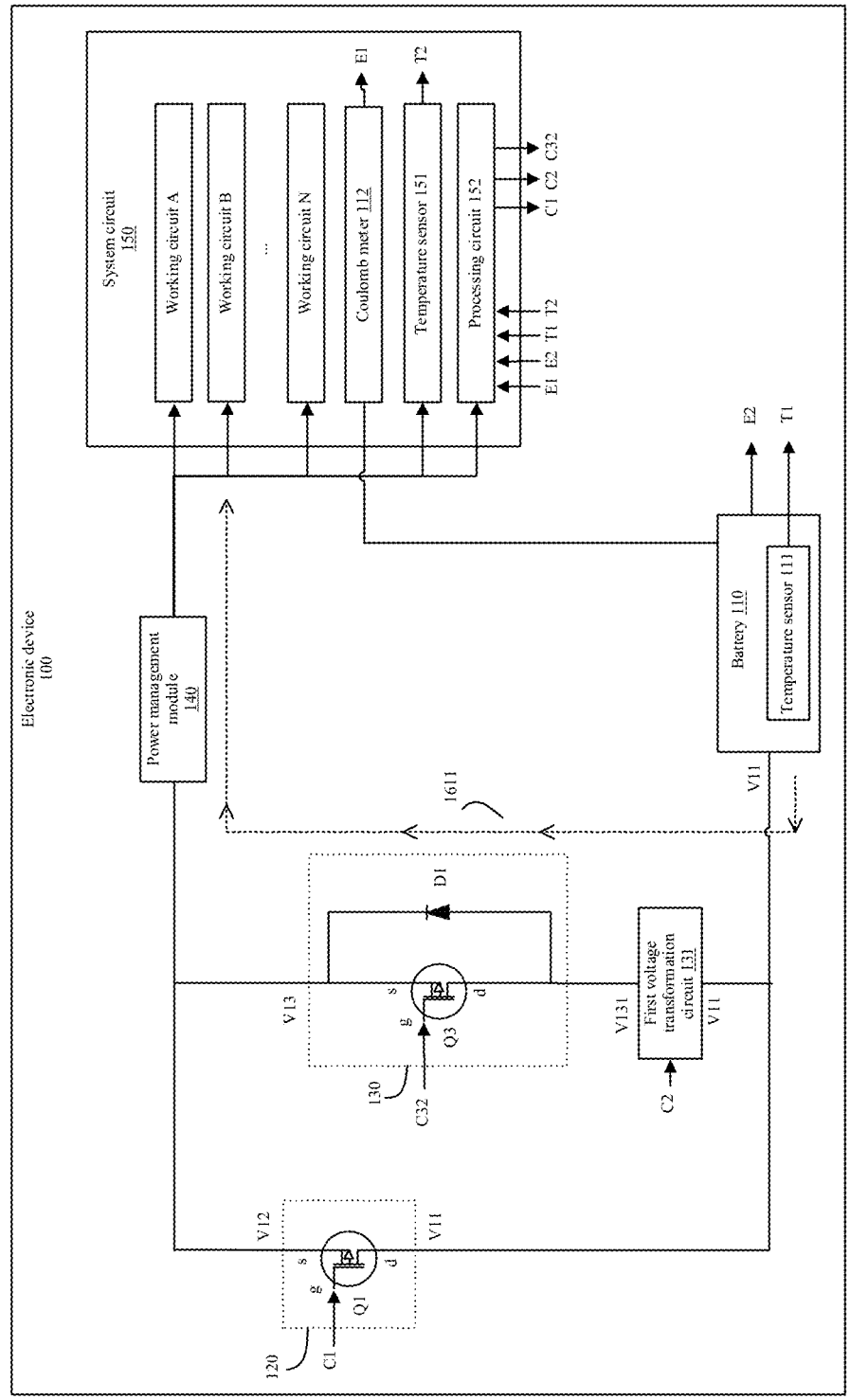
Figure 15C:
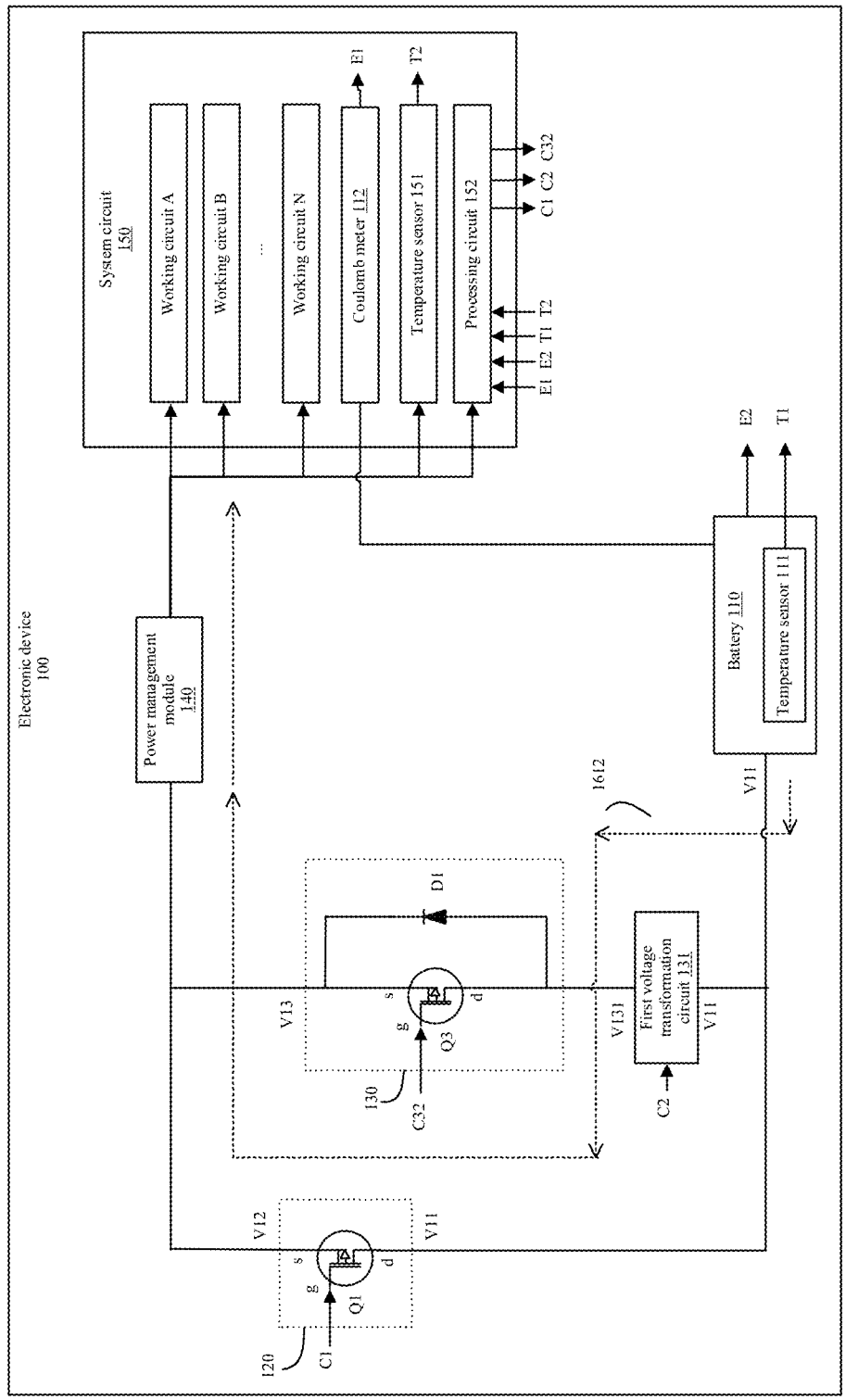

FIG. 15A to FIG. 15C show an implementation of the first switch 120, the third switch 1304, and the first unidirectional conductive switch 1301 in FIG. 7A to FIG. 7C. The first switch 120 may include the switch Q1, the third switch 1304 may include the switch Q3, and the first unidirectional conductive switch 1301 may include the diode D1.

In this embodiment of this disclosure, the diode D1 may be a part of the switch Q3, so that an area of a circuit board occupied by the diode D1 can be reduced, and more electronic components can be placed on the circuit board.

As shown in FIG. 15A, a path 160 indicates a current flow direction from the battery 110 to the system circuit 150 through the switch Q1 and the power management module 140. As shown in FIG. 15B, a path 1611 indicates a current flow direction from the battery 110 to the system circuit 150 through the first voltage transformation circuit 131, the diode D1, and the power management module 140. As shown in FIG. 15C, a path 1612 indicates a current flow direction from the battery 110 to the system circuit 150 through the first voltage transformation circuit 131, the switch Q3, and the power management module 140. The processing circuit 152 may control, through a signal circuit C32, the switch Q3 to be turned on. In response to that an input signal of a control end of the switch Q3 is at a low level, the switch Q3 is turned on, and the path 1612 is turned on. Alternatively, the processing circuit 152 may control, through a signal circuit C32, the switch Q3 to be turned off. In response to that an input signal of a control end of the switch Q3 is an open circuit, the switch Q3 is turned off, and the path 1612 is disconnected. For a manner in which the processing circuit 152 controls the path 1611 to be connected or disconnected, refer to specific descriptions in a related embodiment in FIG. 11A and FIG. 11B. Details are not described herein again.

As shown in FIG. 15A, when the path 160 is connected, and the processing circuit 152 detects that the electronic device 100 meets a first condition, the processing circuit 152 may control the path 1611 to be connected, may further control the path 160 to be disconnected after the path 1611 is connected, and may further control the path 1612 to be connected after the path 160 is disconnected, so that the path 1611 is disconnected. Alternatively, when the path 160 is connected, and the processing circuit 152 detects that the electronic device 100 meets a first condition, the processing circuit 152 may control the path 1612 to be connected, and may further control the path 160 to be disconnected after the path 1612 is connected. For details, refer to the embodiment related to FIG. 7A to FIG. 7C. Details are not described herein again.

As shown in FIG. 15C, when the path 1612 is connected, and the processing circuit 152 detects that the electronic device 100 meets a second condition, the processing circuit 152 may control the switch Q3 to be turned off, so that the path 1612 is disconnected and the path 1611 is connected. When the path 1611 is connected, the processing circuit 152 may control the path 160 to be connected, and may further control the path 1611 to be disconnected after the path 160 is connected. For details, refer to the embodiment related to FIG. 7A to FIG. 7C. Details are not described herein again.

Figure 16A:
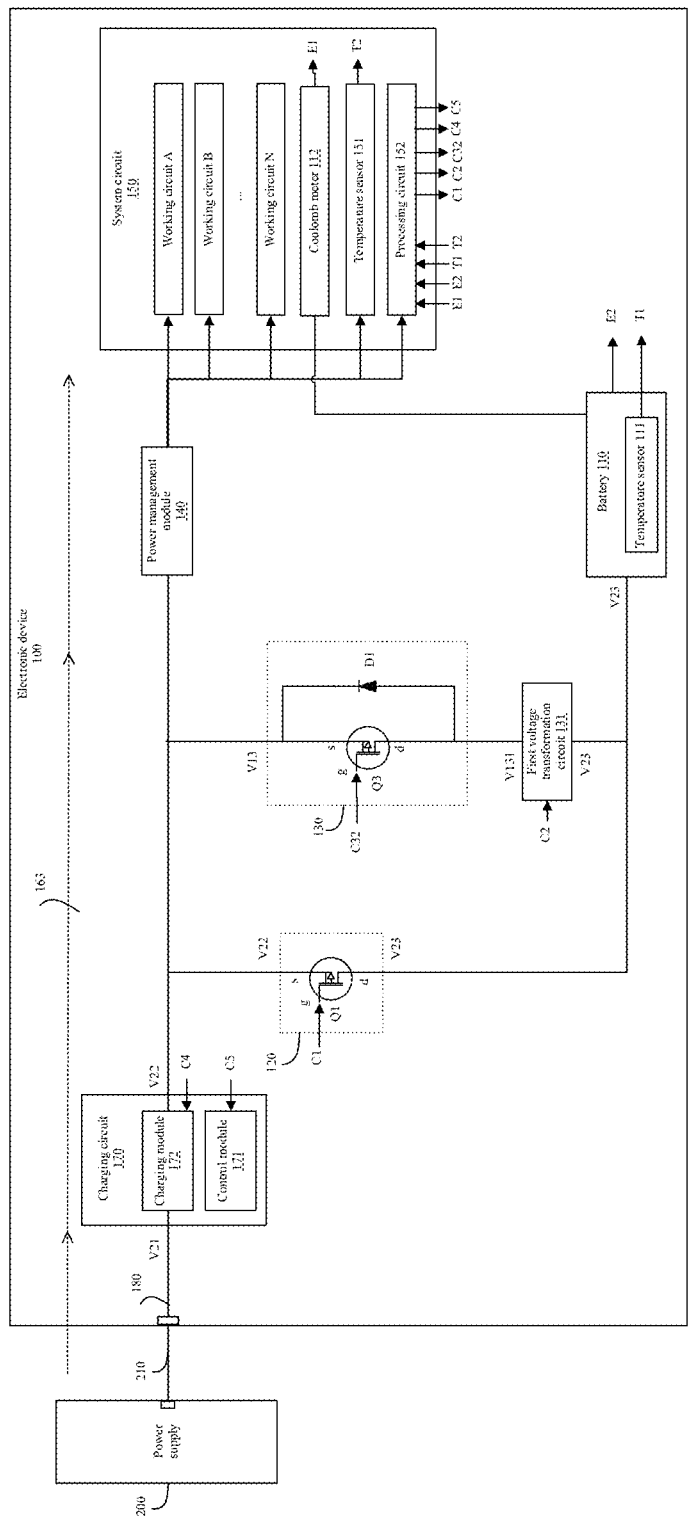
FIG. 16A to FIG. 16C are diagrams of structures of another group of electronic devices according to an embodiment of this disclosure.
Figure 16B:
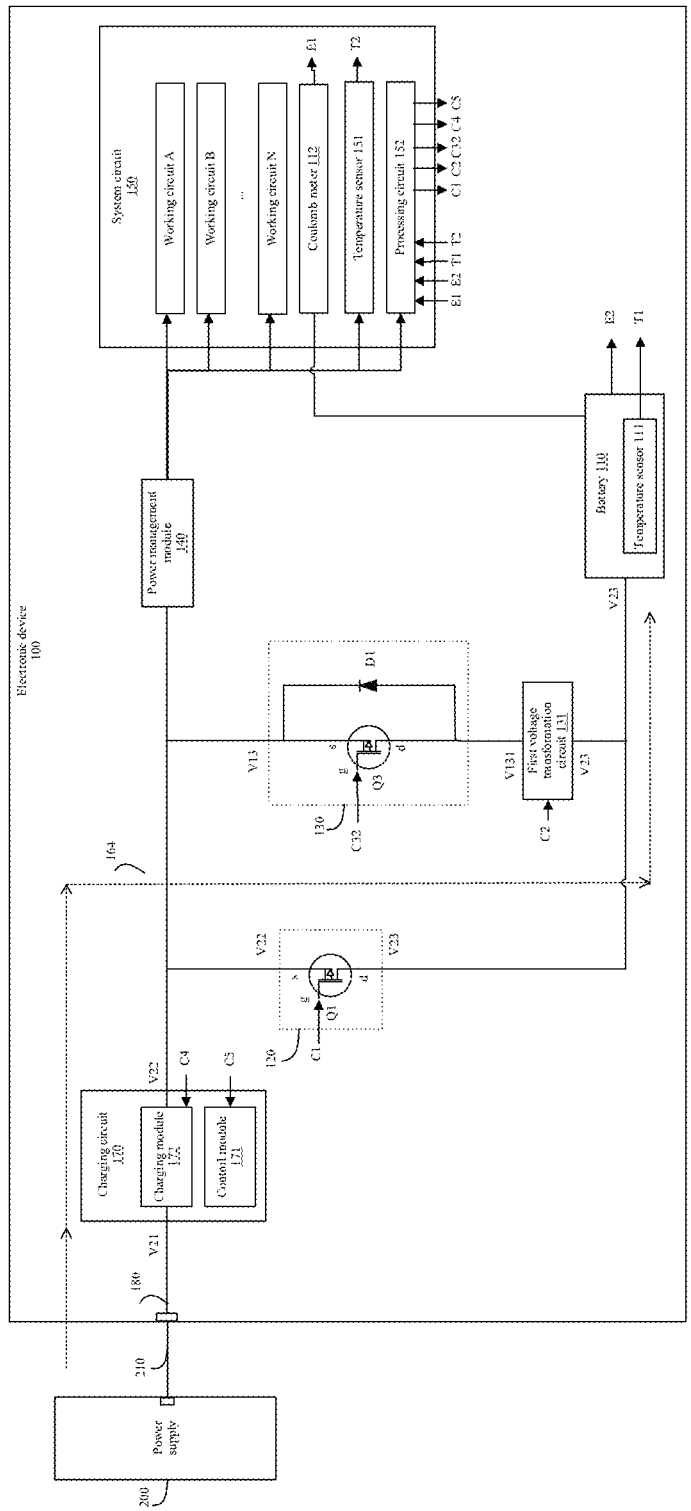
Figure 16C:
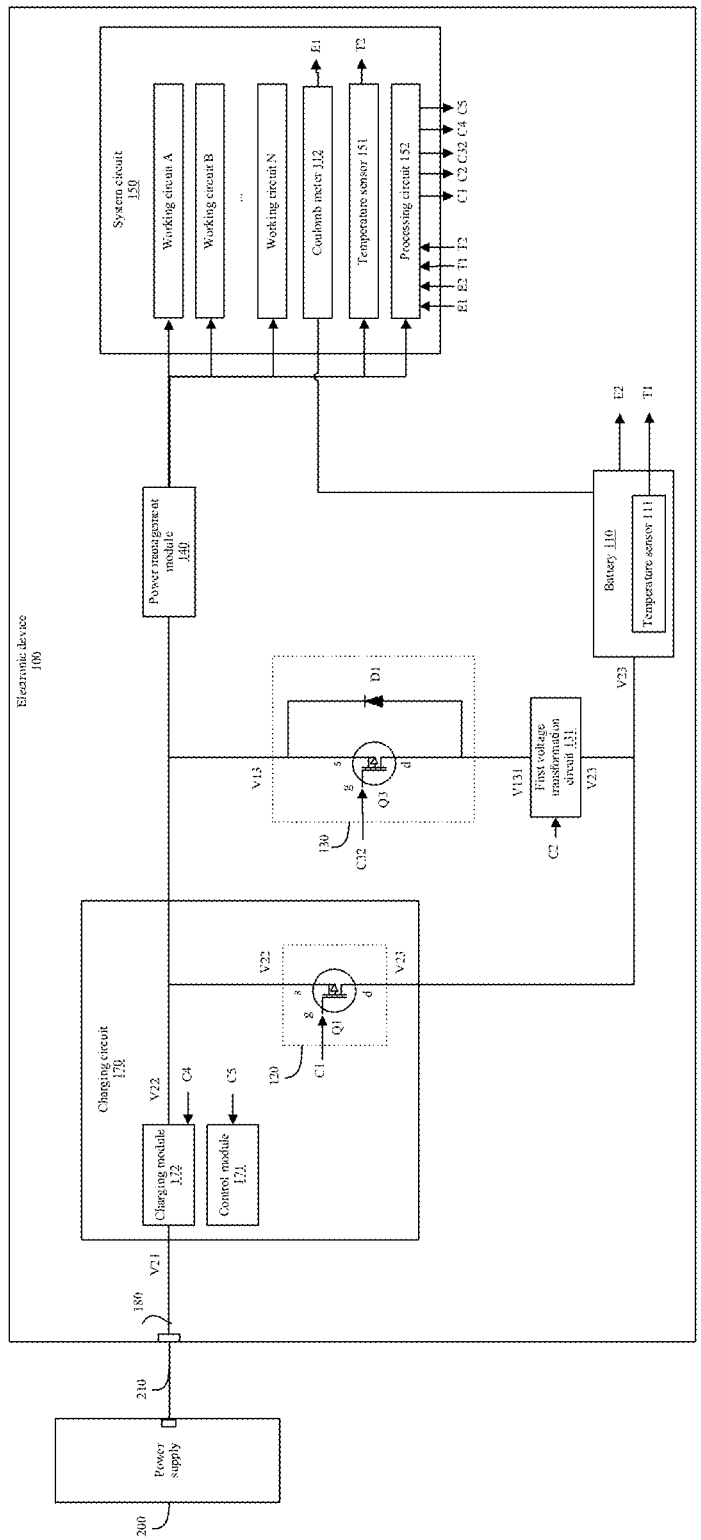

FIG. 16A to FIG. 16C each are a diagram of a structure of another electronic device according to an embodiment of this disclosure. As shown in FIG. 16A to FIG. 16C, based on the electronic device 100 shown in FIG. 15A to FIG. 15C, the electronic device 100 may further include a charging circuit 170 and an external power supply interface 180, and an external power supply 200 may be electrically connected to the electronic device 100 through the external power supply interface 180. It should be noted that, for the charging circuit 170, the external power supply interface 180, and the external power supply 200, refer to related descriptions in the foregoing other embodiments. Details are not described herein again.

FIG. 16A to FIG. 16C show an implementation of the first switch 120, the first unidirectional conductive switch 1301, and the third switch 1304 in FIG. 8A to FIG. 8C. The first switch 120 may include the switch Q1, the first unidirectional conductive switch 1301 may include the diode D1, and the third switch 1304 may include the switch Q3. For example, as shown in FIG. 16B, a path 164 indicates a current flow direction from the external power supply 200 to the battery 110 through the charging module 172 and the switch Q1. For a manner in which the processing circuit 152 controls the path 164 to be connected or disconnected, refer to specific descriptions in a related embodiment in FIG. 12A to FIG. 12C. Details are not described herein again.

As shown in FIG. 15C, when the battery 110 supplies power to the system circuit 150 through a path 1612, and the processing circuit 152 detects that the external power supply 200 is connected, the processing circuit 152 may control, through a signal circuit C32, the switch Q3 to be turned off. In response to that an input signal of a control end of the switch Q3 is a turn-off signal, the switch Q3 is turned off, the path 1612 is disconnected, and a path 1611 is connected. When the path 1611 is connected, the processing circuit 152 may control a path 163 to be connected; may further control the path 1611 to be disconnected after the path 163 is connected; and may further control the path 164 to be connected. Alternatively, when the path 1611 is connected, the processing circuit 152 may control a path 160 to be connected; and may further control the path 1611 to be disconnected after the path 160 is connected, and then control the path 163 and the path 164 to be connected, so that the path 160 is disconnected. Alternatively, when the path 1611 is connected, the processing circuit 152 may control the path 160 to be connected, and then control the path 163 and the path 164 to be connected, so that the path 160 is disconnected; and may further control the path 1611 to be disconnected after the path 160 is disconnected. For details, refer to the embodiment related to FIG. 8A to FIG. 8C. Details are not described herein again.

FIG. 17A to FIG. 17D show an implementation of the first switch 120, the second switch 1303, the third switch 1304, the first unidirectional conductive switch 1301, and the second unidirectional conductive switch 1302 in FIG. 9A to FIG. 9D. The first switch 120 may include the switch Q1, the second switch 1303 may include the switch Q2, the third switch 1304 may include the switch Q3, the first unidirectional conductive switch 1301 may include the diode D1, and the second unidirectional conductive switch 1302 may include the diode D2. The processing circuit 152 may control working statuses of the switch Q2, the switch Q3, the switch Q1, and the first voltage transformation circuit 131.

In this embodiment of this disclosure, the diode D1 may be a part of the switch Q3, the diode D2 may be a part of the switch Q2, so that an area of a circuit board occupied by the diode D1 and the diode D2 can be reduced, and more electronic components can be placed on the circuit board.

Figure 17A:
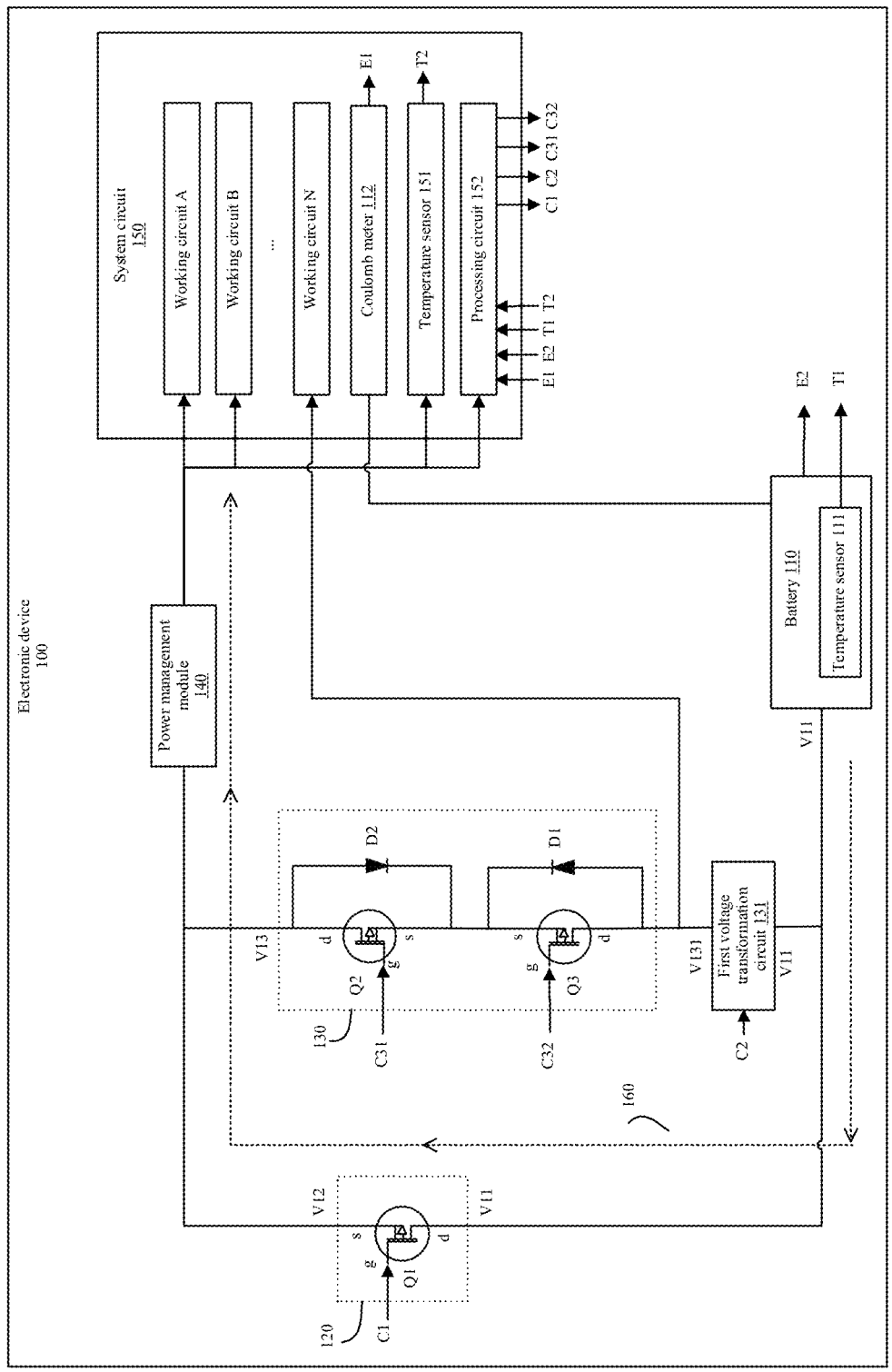
FIG. 17A to FIG. 17D are diagrams of structures of another group of electronic devices according to an embodiment of this disclosure.
Figure 17B:
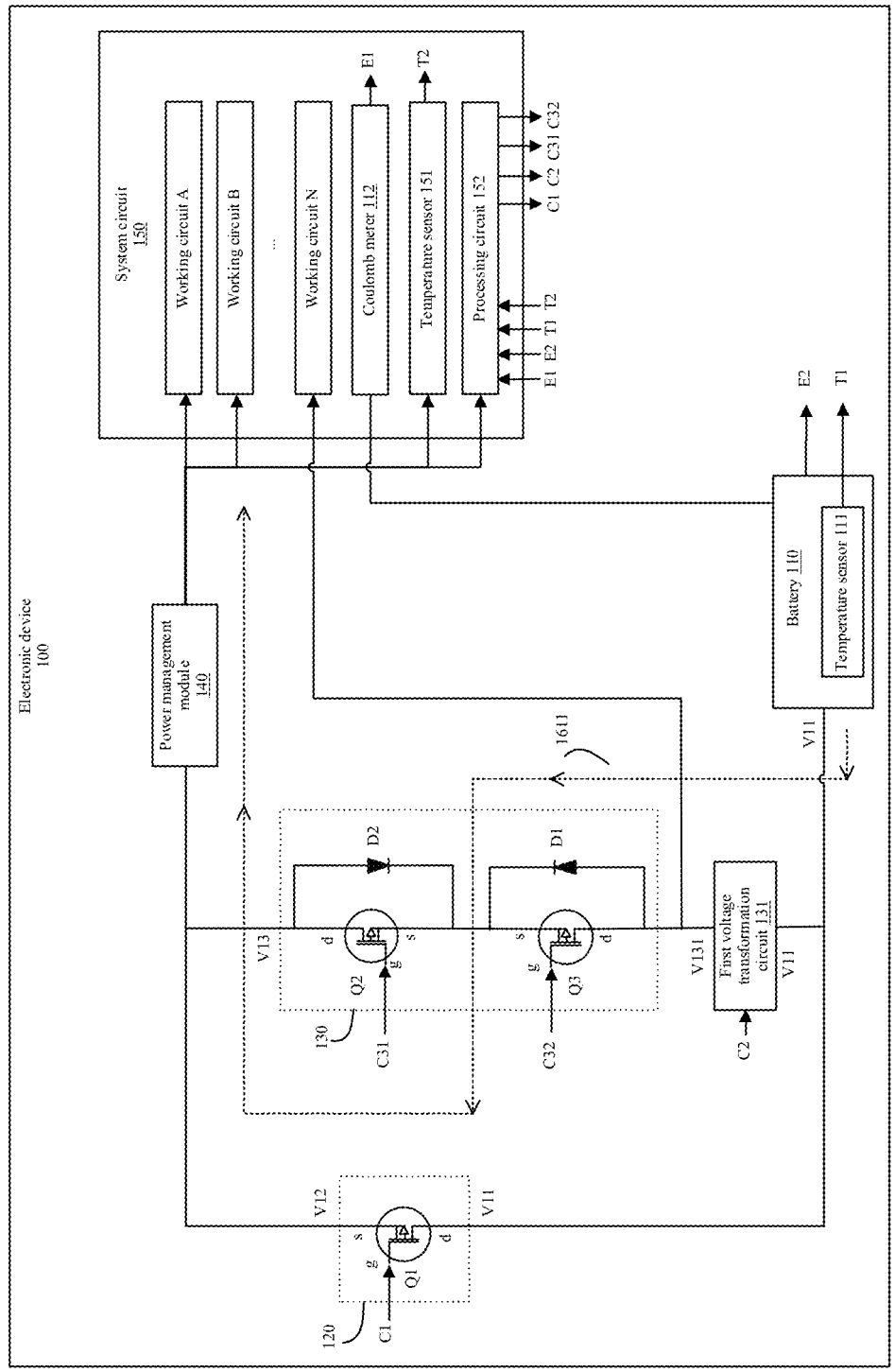
Figure 17C:
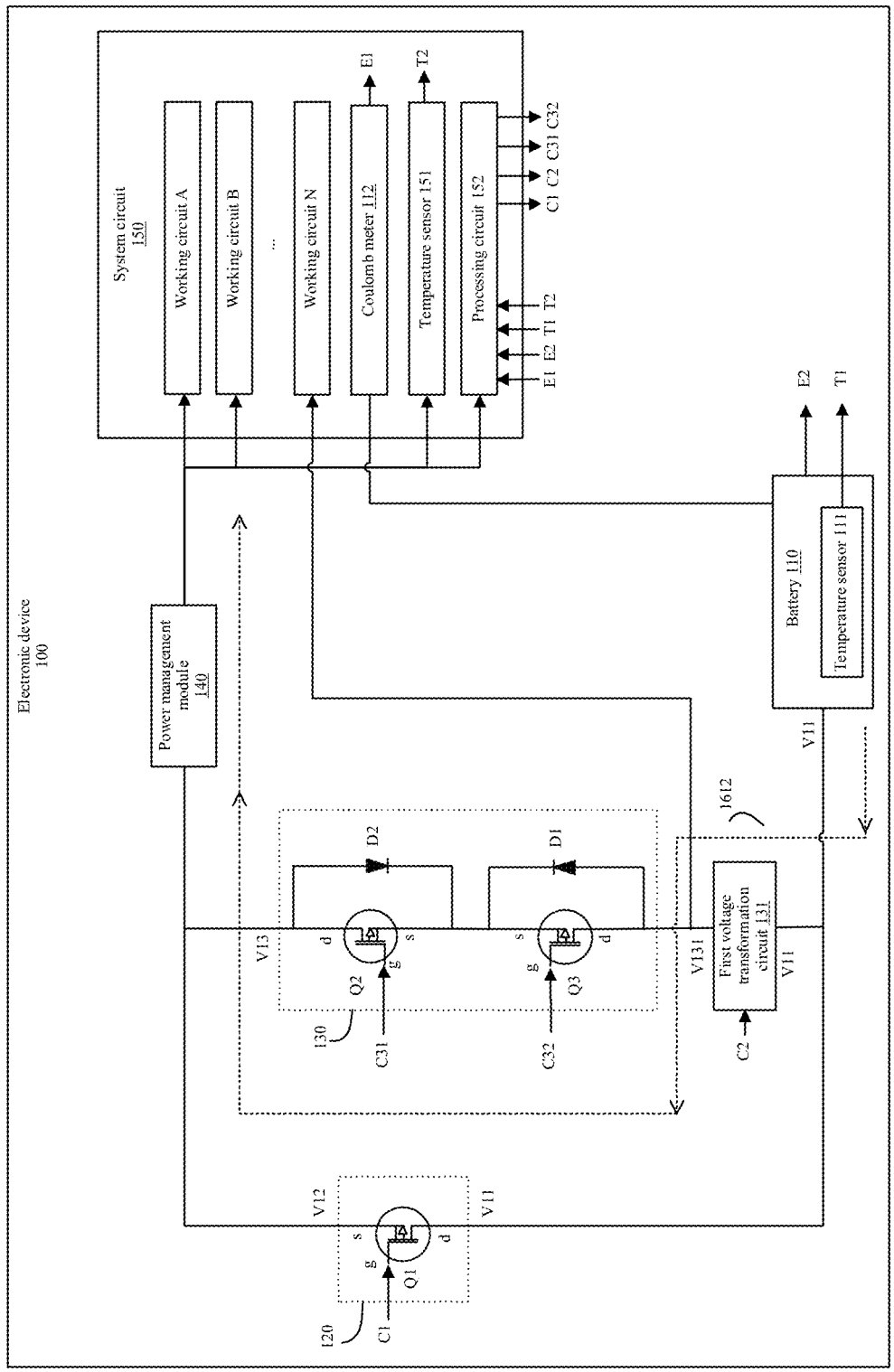

As shown in FIG. 17A, a path 160 indicates a current flow direction from the battery 110 to the system circuit 150 through the switch Q1 and the power management module 140. As shown in FIG. 17B, a path 1611 indicates a current flow direction from the battery 110 to the system circuit 150 through the first voltage transformation circuit 131, the diode D1, the switch Q2, and the power management module 140. As shown in FIG. 17C, a path 1612 indicates a current flow direction from the battery 110 to the system circuit 150 through the first voltage transformation circuit 131, the switch Q3, the switch Q2, and the power management module 140. The processing circuit 152 may control, through a signal circuit C32, the switch Q3 to be turned on, and may control, through a signal circuit C31, the switch Q2 to be turned on. When the switch Q3 and the switch Q2 are turned on, the path 1612 is connected. Alternatively, the processing circuit 152 may control, through a signal circuit C32, the switch Q3 to be turned off, and may control, through a signal circuit C32, the switch Q2 to be turned off. When any one or more of the switch Q3 or the switch Q2 are turned off, the path 1612 is disconnected. For a manner in which the processing circuit 152 controls the path 1611 to be connected or disconnected, refer to specific descriptions in a related embodiment in FIG. 13A to FIG. 13C. Details are not described herein again.

As shown in FIG. 17A, when the path 160 is connected, and the processing circuit 152 detects that the electronic device 100 meets a first condition, the processing circuit 152 may control the path 1611 to be connected, may further control the path 160 to be disconnected after the path 1611 is connected, and may further control the path 1612 to be connected after the path 160 is disconnected, so that the path 1611 is disconnected; or when the processing circuit 152 detects that the electronic device 100 meets a first condition, the processing circuit 152 may control the path 1612 to be connected, and may further control the path 160 to be disconnected after the path 1612 is connected. For details, refer to the embodiment related to FIG. 9A to FIG. 9C. Details are not described herein again.

As shown in FIG. 17C, when the path 1612 is connected, and the processing circuit 152 detects that the electronic device 100 meets a second condition, the processing circuit 152 may control the switch Q3 to be turned off, so that the path 1612 is disconnected and the path 1611 is connected. When the path 1611 is connected, the processing circuit 152 may control the path 160 to be connected, and may further control the path 1611 to be disconnected after the path 160 is connected. For details, refer to the embodiment related to FIG. 9A to FIG. 9C. Details are not described herein again.

Figure 17D:
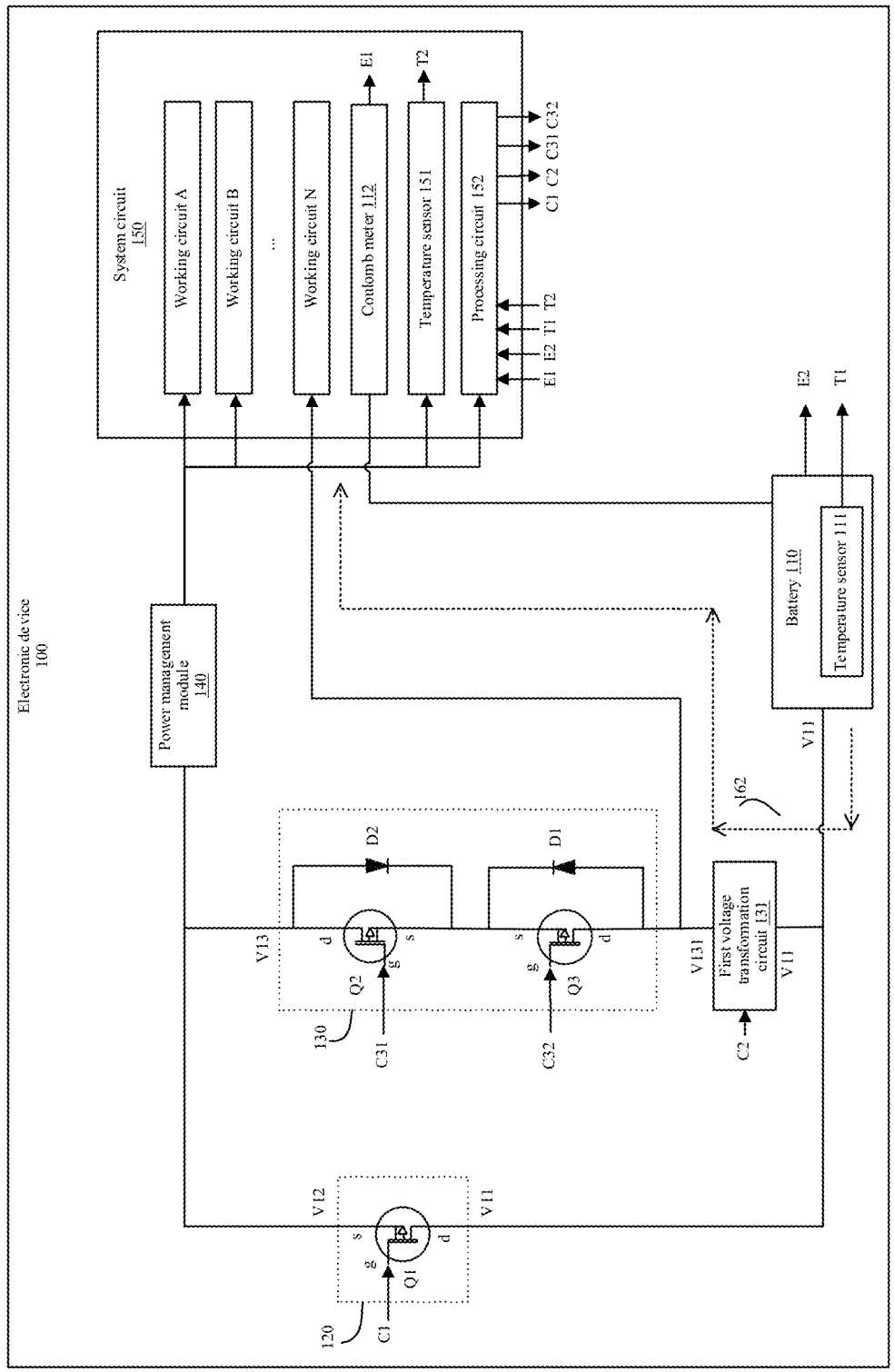

As shown in FIG. 17D, the battery 110 may further supply power to some working circuits of the system circuit 150 through a path 162. For details, refer to the embodiment related to FIG. 9A to FIG. 9C. Details are not described herein again.

Figure 18A:
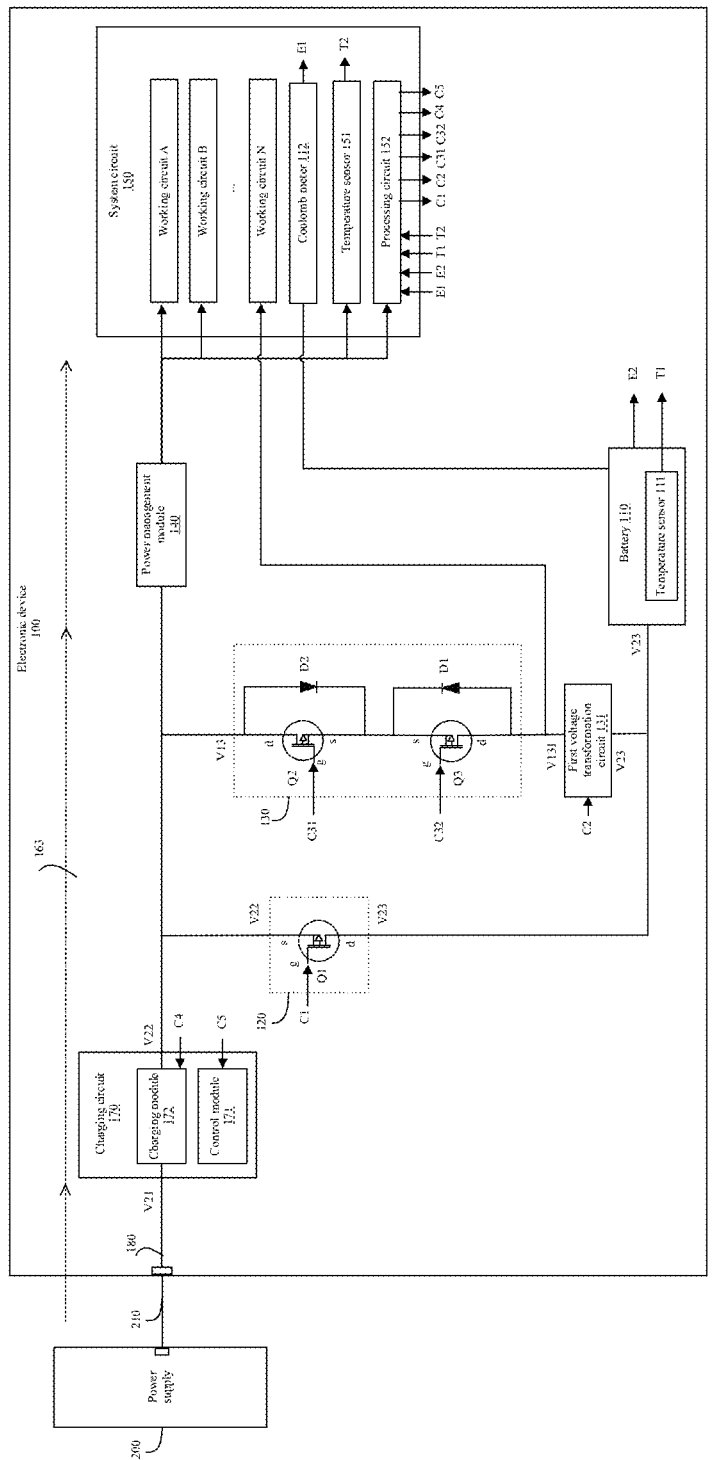
FIG. 18A to FIG. 18C are diagrams of structures of another group of electronic devices according to an embodiment of this disclosure.
Figure 18B:
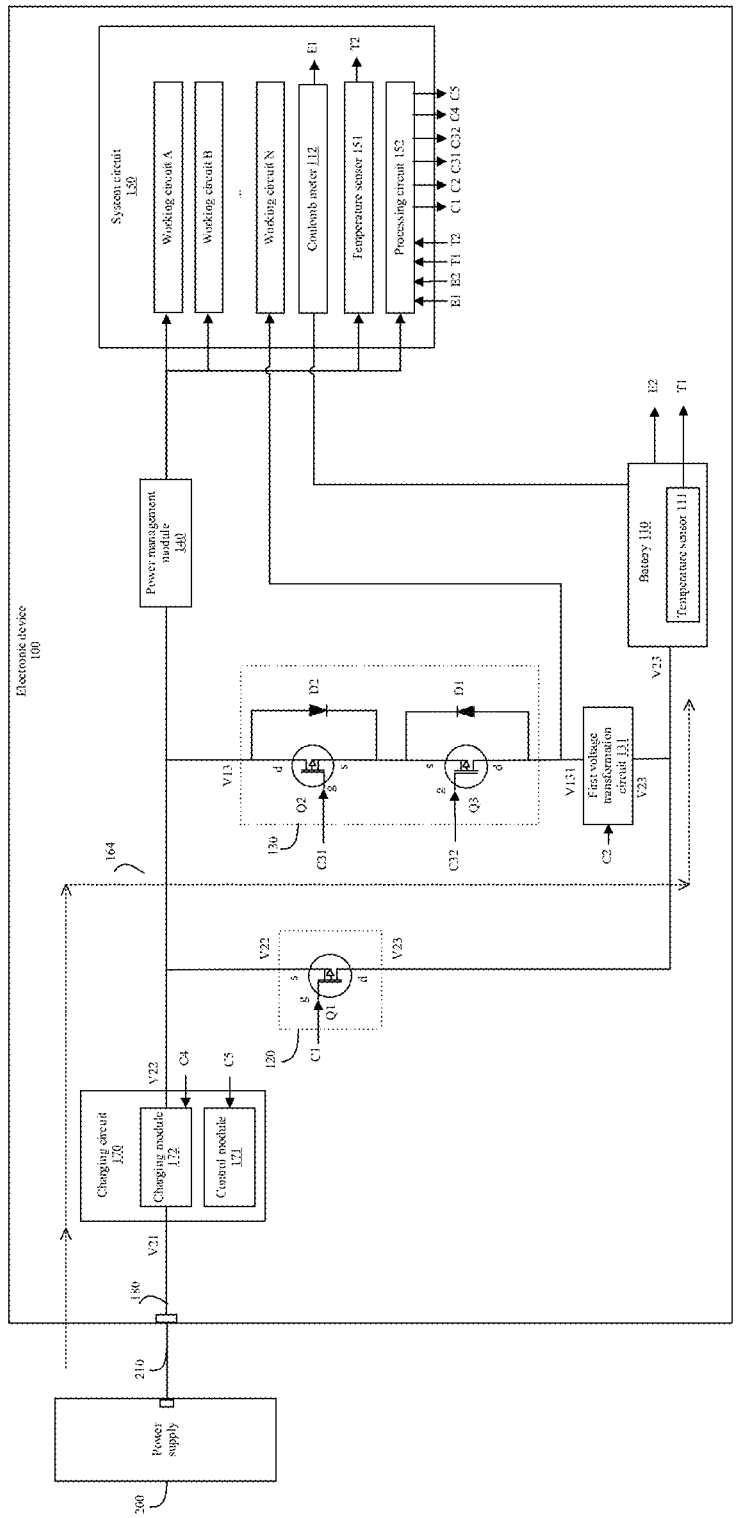
Figure 18C:
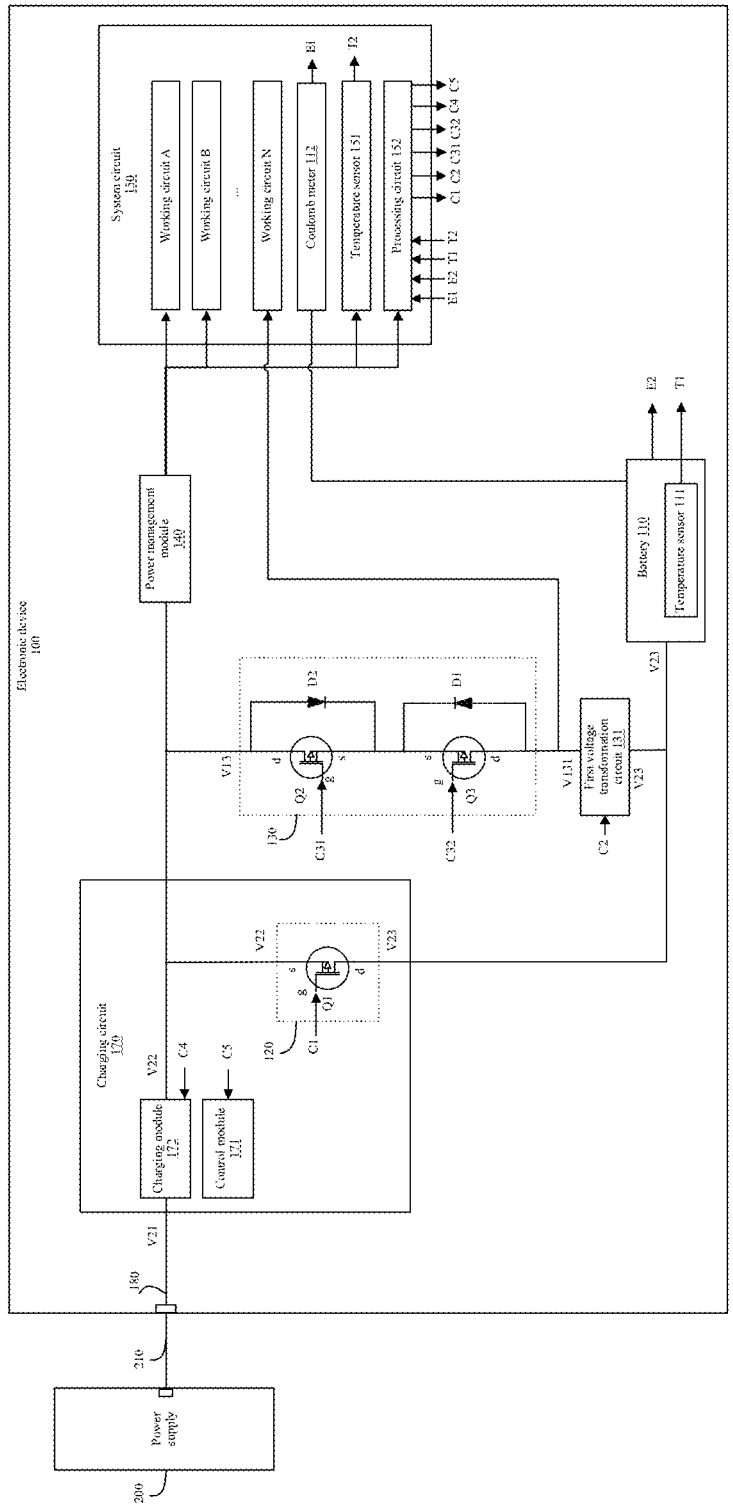

FIG. 18A to FIG. 18C each are a diagram of a structure of another electronic device according to an embodiment of this disclosure. As shown in FIG. 18A to FIG. 18C, based on the electronic device 100 shown in FIG. 17A to FIG. 17C, the electronic device 100 may further include a charging circuit 170 and an external power supply interface 180, and an external power supply 200 may be electrically connected to the electronic device 100 through the external power supply interface 180. It should be noted that, for the charging circuit 170, the external power supply interface 180, and the external power supply 200, refer to related descriptions in the foregoing other embodiments. Details are not described herein again.

FIG. 18A to FIG. 18C show an implementation of the first switch 120, the second switch 1303, the third switch 1304, the first unidirectional conductive switch 1301, and the second unidirectional conductive switch 1302 in FIG. 10A to FIG. 10C. The first switch 120 may include the switch Q1, the second switch 1303 may include the switch Q2, the third switch 1304 may include the switch Q3, the first unidirectional conductive switch 1301 may include the diode D1, and the second unidirectional conductive switch 1302 may include the diode D2. For example, as shown in FIG. 18B, a path 164 indicates a current flow direction from the external power supply 200 to the battery 110 through the charging module 172 and the switch Q1. For a manner in which the processing circuit 152 controls the path 164 to be connected or disconnected, refer to specific descriptions in a related embodiment in FIG. 12A to FIG. 12C. Details are not described herein again.

As shown in FIG. 17C, when the battery 110 supplies power to the system circuit 150 through a path 1612, and the processing circuit 152 detects that the external power supply 200 is connected, the processing circuit 152 may control, through a signal circuit C32, the switch Q3 to be turned off. In response to that an input signal of a control end of the switch Q3 is a turn-off signal, the switch Q3 is turned off, the path 1612 is disconnected, and a path 1611 is connected. When the path 1611 is connected, the processing circuit 152 may control a path 163 to be connected; may further control the path 1611 to be disconnected after the path 163 is connected; and may further control the path 164 to be connected. Alternatively, when the path 1611 is connected, the processing circuit 152 may control a path 160 to be connected; and may further control the path 1611 to be disconnected after the path 160 is connected, and then control the path 163 and the path 164 to be connected, so that the path 160 is disconnected. Alternatively, when the path 1611 is connected, the processing circuit 152 may control the path 160 to be connected, and then control the path 163 and the path 164 to be connected, so that the path 160 is disconnected; and may further control the path 1611 to be disconnected after the path 160 is disconnected. For details, refer to the embodiment related to FIG. 10A to FIG. 10C. Details are not described herein again.

Figure 19A:
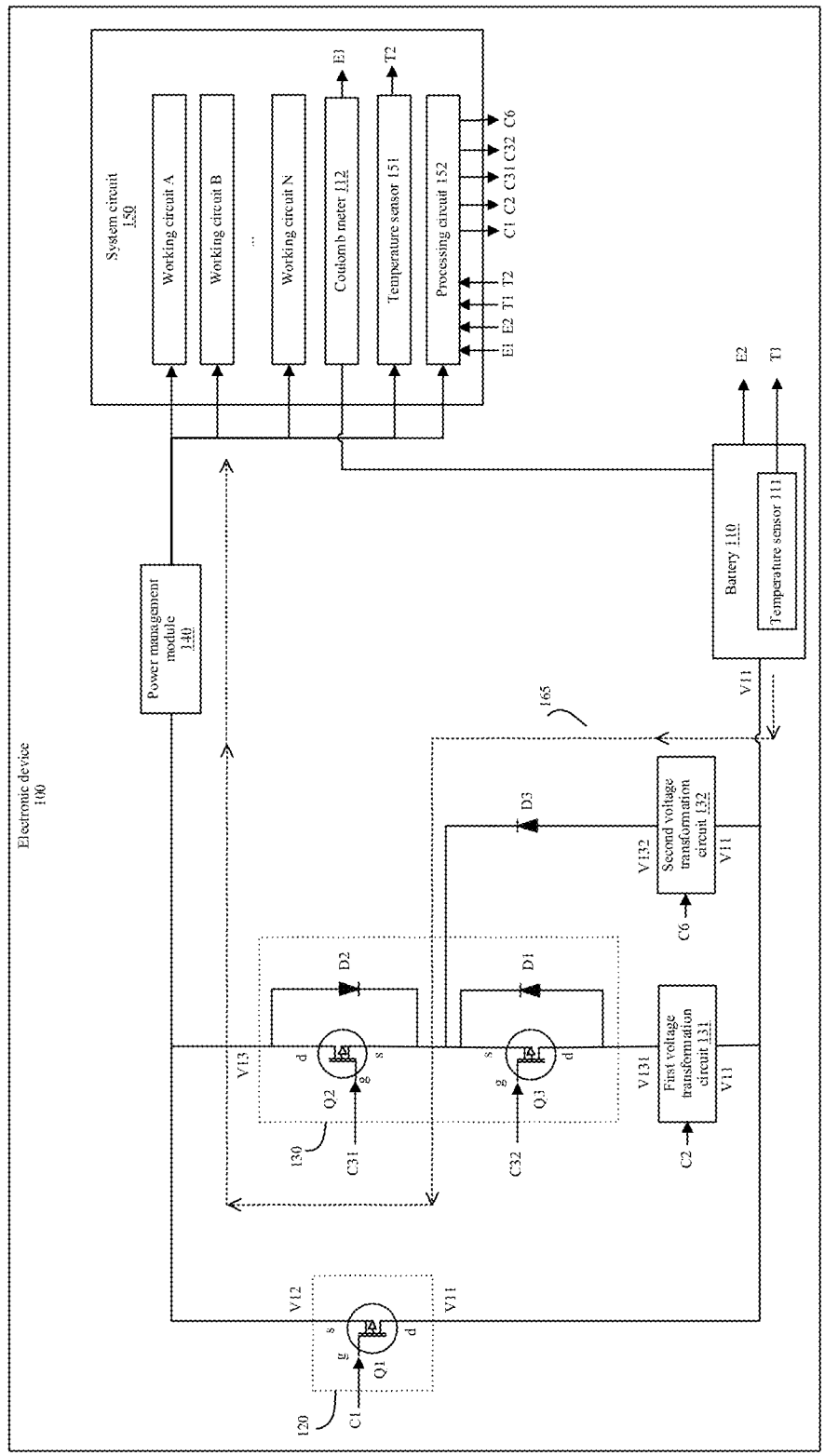
FIG. 19A and FIG. 19B are diagrams of structures of another group of electronic devices according to an embodiment of this disclosure.
Figure 19B:
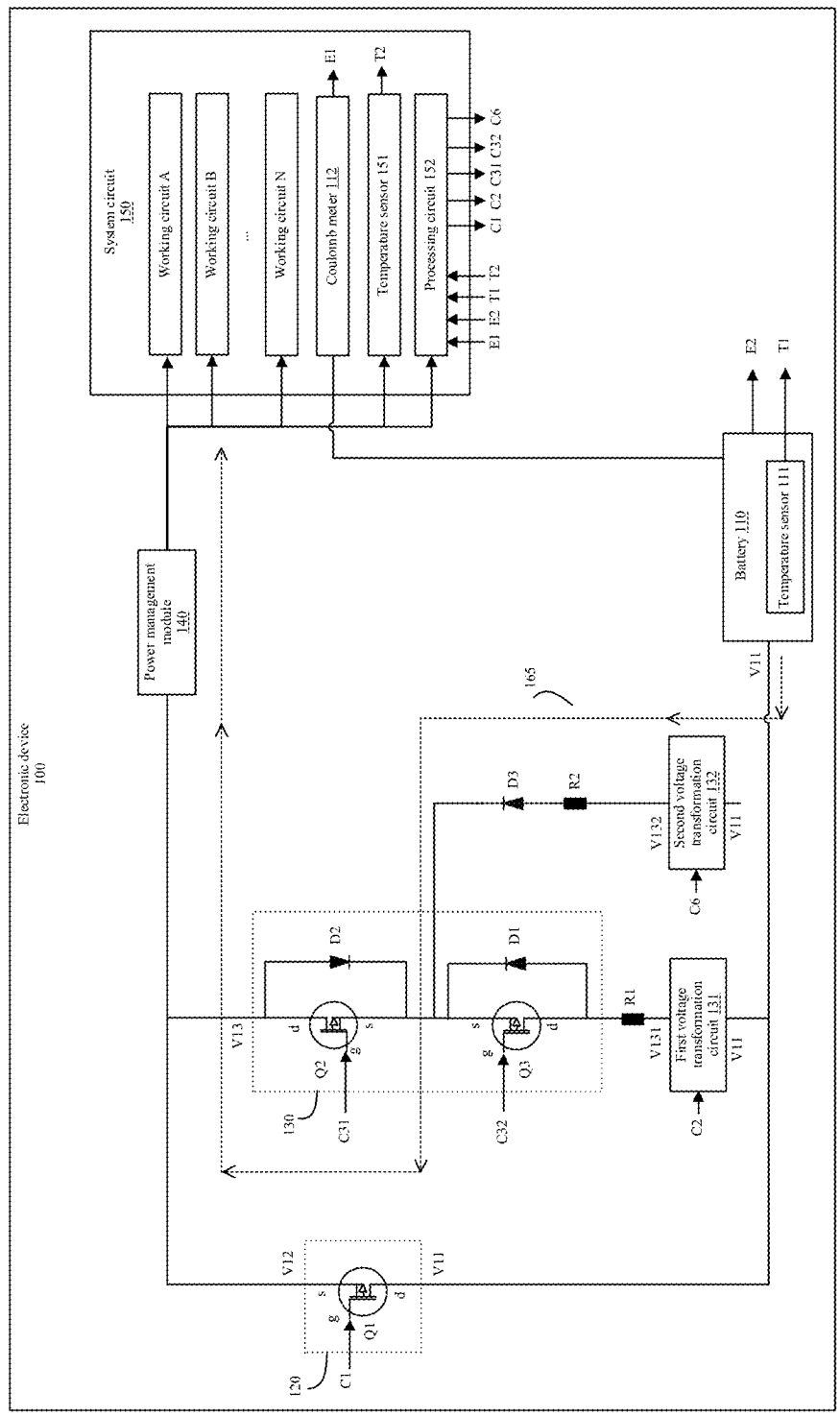

FIG. 19A and FIG. 19B each are a diagram of a structure of another electronic device according to an embodiment of this disclosure.

As shown in FIG. 19A, based on the electronic device 100 shown in FIG. 17A to FIG. 17D, the electronic device 100 may further include a second voltage transformation circuit 132 and a diode D3, and the processing circuit 152 may control a working status of the second voltage transformation circuit 132. The battery 110 may be electrically connected to an input end of the second voltage transformation circuit 132, a first output end of the second voltage transformation circuit 132 may be electrically connected to an anode of the diode D3, and a cathode of the diode D3 may be electrically connected to a cathode of the diode D1.

It should be noted that the processing circuit 152 may include one or more processing units, and the processing circuit 152 may control, through a signal circuit C6, the second voltage transformation circuit 132 to work or be disconnected. In response to that an input signal of a control end of the second voltage transformation circuit 132 is a working signal (for example, the working signal received by the control end of the second voltage transformation circuit 132 may be a signal output by the processing circuit 152, or may be a signal generated based on a signal output by the processing circuit 152), the second voltage transformation circuit 132 works. Alternatively, in response to that an input signal of a control end of the second voltage transformation circuit 132 is a disconnected signal (for example, the disconnected signal received by the control end of the second voltage transformation circuit 132 may be a signal output by the processing circuit 152, or may be a signal generated based on a signal output by the processing circuit 152), the second voltage transformation circuit 132 is disconnected. For ease of description, that the processing circuit 152 may control, through the signal circuit C6, the second voltage transformation circuit 132 to work or be disconnected, and in response to that the input signal of the control end of the second voltage transformation circuit 132 is the working signal or the disconnected signal, the second voltage transformation circuit 132 works or is disconnected is used as a uniform description in the following embodiments.

As shown in FIG. 19A, when the processing circuit 152 detects that the electronic device 100 meets a first condition, the processing circuit 152 may control, through the signal circuit C6, the second voltage transformation circuit 132 to work. In response to that the input signal of the control end of the second voltage transformation circuit 132 is the working signal, the second voltage transformation circuit 132 works. After performing voltage conversion on an input voltage, the second voltage transformation circuit 132 may output a voltage V133 through the first output end. When the output voltage V133 is higher than a forward conduction voltage of the diode D3, the diode D3 is conducted. The processing circuit 152 may control, through a signal circuit C31, the switch Q2 to be turned on. When the diode D3 is conducted and the switch Q2 is turned on, the battery 110 may supply power to the system circuit 150 through a path 165, and the path 165 indicates a current flow direction from the battery 110 to the system circuit 150 through the second voltage transformation circuit 132, the diode D3, the switch Q2, and the power management module 140, an output voltage and an output current of the battery 110 may be coupled to the system circuit 150 through the second voltage transformation circuit 132, the diode D3, the switch Q2, and the power management module 140 to supply power to the system circuit 150.

In this embodiment of this disclosure, before both a path 1611 and the path 165 are connected, the processing circuit 152 may control any one or more of the first voltage transformation circuit 131 or the second voltage transformation circuit 132 to adjust an output voltage, so that after the output voltage V132 of the second voltage transformation circuit 132 passes through the diode D3, an output voltage of the diode D3 is equal to an output voltage obtained after the output voltage V131 of the first voltage transformation circuit 131 passes through the diode D1, and then an output current provided by the battery 110 for the system circuit 150 through the path 1611 is equal to an output current provided by the battery 110 for the system circuit 150 through the path 165. This avoids a case in which when an input current required by the system circuit 150 is large, the current obtained by the system circuit 150 through the path 1611 is excessively large; further, an output current of the first voltage transformation circuit 131 is excessively large and exceeds an overcurrent threshold of the first voltage transformation circuit 131; and consequently the first voltage transformation circuit 131 enables overcurrent protection and cannot work normally; and can also avoid a case in which when an input current required by the system circuit 150 is large, the current obtained by the system circuit 150 through the path 165 is excessively large; further, an output current of the second voltage transformation circuit 132 is excessively large and exceeds an overcurrent threshold of the second voltage transformation circuit 132; and consequently the second voltage transformation circuit 132 enables overcurrent protection and cannot work normally. For the path 1611, refer to specific descriptions in the foregoing embodiments. Details are not described herein again.

In some embodiments, before both the path 1612 and the path 165 are connected, either of the first voltage transformation circuit 131 or the second voltage transformation circuit 132 also cannot enable current protection. For details about the path 1612 and a method for preventing either of the first voltage transformation circuit 131 or the second voltage transformation circuit 132 from enabling current protection, refer to descriptions in the foregoing embodiments. Details are not described herein again.

In the foregoing embodiments, because the electronic device may supply power to the power management module 140 through both the path 1611 and the path 165, a larger input current may be provided for the power management module 140, so that a higher system load can be supported.

As shown in FIG. 19B, the electronic device 100 may further include a resistor R1 and a resistor R2. The resistor R1 is electrically connected in series to the path 1611 and the path 1612. In this case, the path 1611 is a current flow direction from the battery 110 to the system circuit 150 through the first voltage transformation circuit 131, the resistor R1, the diode D1, the switch Q2, and the power management module 140, and the path 1612 is a current flow direction from the battery 110 to the system circuit 150 through the first voltage transformation circuit 131, the resistor R1, the switch Q3, the switch Q2, and the power management module 140. The resistor R2 is electrically connected in series to the path 165. In this case, the path 165 is a current flow direction from the battery 110 to the system circuit 150 through the second voltage transformation circuit 132, the diode D3, the resistor R2, the switch Q2, and the power management module 140.

In this embodiment of this disclosure, the resistor R1 and the resistor R2 have a current equalization function. When both the path 1611 and the path 165 are connected, and a voltage obtained after the output voltage V131 of the first voltage transformation circuit 131 passes through the resistor R1 and the diode D1 is higher than a voltage obtained after the output voltage V133 of the second voltage transformation circuit 132 passes through the resistor R2, an output current provided by the battery 110 for the system circuit 150 through the path 1611 is greater than an output current provided by the battery 110 for the system circuit 150 through the path 165, and the resistor R1 may obtain a higher voltage. Further, an output voltage obtained after the output voltage of the battery 110 passes through the first voltage transformation circuit 131, the resistor R1, and the diode D1 is reduced, and finally is equal to an output voltage obtained after the output voltage of the battery 110 passes through the second voltage transformation circuit 132, the diode D3, and the resistor R2, so that the output current provided by the battery 110 for the system circuit 150 through the path 1611 is equal to the output current provided by the battery 110 for the system circuit 150 through the path 165. This avoids a case in which when an input current required by the system circuit 150 is large, the current obtained by the system circuit 150 through the path 1611 is excessively large; further, the output current of the first voltage transformation circuit 131 is excessively large and exceeds the overcurrent threshold of the first voltage transformation circuit 131; and consequently the first voltage transformation circuit 131 enables overcurrent protection and cannot work normally. On the contrary, when a voltage obtained after the output voltage V133 of the second voltage transformation circuit 132 passes through the diode D3 and the resistor R2 is higher than a voltage obtained after the output voltage V131 of the first voltage transformation circuit 131 passes through the resistor R1 and the diode D1, an output current provided by the battery 110 for the system circuit 150 through the path 165 is greater than an output current provided by the battery 110 for the system circuit 150 through the path 1611, and the resistor R2 may obtain a higher voltage. Further, an output voltage obtained after the output voltage of the battery 110 passes through the second voltage transformation circuit 132, the diode D3, and the resistor R2 is reduced, and finally is equal to an output voltage obtained after the output voltage of the battery 110 passes through the first voltage transformation circuit 131, the resistor R1, and the diode D1, so that the output current provided by the battery 110 for the system circuit 150 through the path 165 is equal to the output current provided by the battery 110 for the system circuit 150 through the path 1611. This avoids a case in which when an input current required by the system circuit 150 is large, the current obtained by the system circuit 150 through the path 165 is excessively large; further, the output current of the second voltage transformation circuit 132 is excessively large and exceeds the overcurrent threshold of the second voltage transformation circuit 132; and consequently the second voltage transformation circuit 132 enables overcurrent protection and cannot work normally. For the path 1611, refer to specific descriptions in the foregoing embodiments. Details are not described herein again.

In some embodiments, when both the path 1612 and the path 165 are connected, the resistor R1 and the resistor R2 have a same current equalization function as in the foregoing embodiments. Details are not described herein again. For the path 1612, refer to specific descriptions in the foregoing embodiments. Details are not described herein again.

It should be noted that a function of the second voltage transformation circuit 132 is the same as a function of the first voltage transformation circuit 131, and a function of the diode D3 is the same as a function of the diode D1. For functions and related descriptions of the second voltage transformation circuit 132 and the diode D3, refer to specific descriptions of the first voltage transformation circuit 131 and the diode D1 in the foregoing embodiments. Details are not described herein again.

Figure 20:
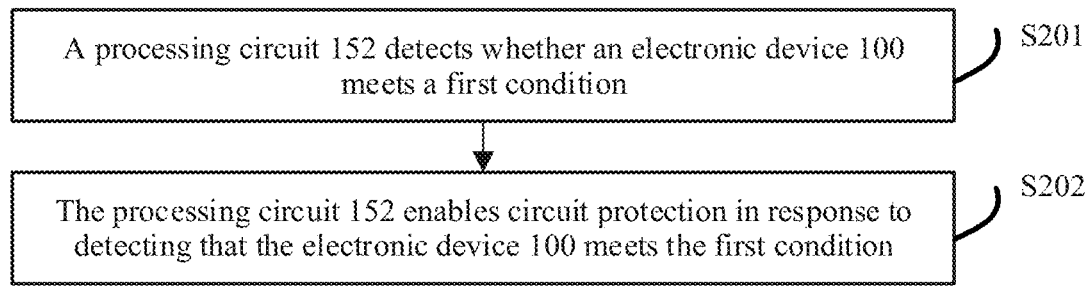
FIG. 20 is a method flowchart of a power supply method according to an embodiment of this disclosure.

FIG. 20 is a method flowchart of a power supply method according to an embodiment of this disclosure. The method includes but is not limited to step S201 and step S202. The following describes a method procedure of the power supply method in detail.

S201: A processing circuit 152 detects whether an electronic device 100 meets a first condition.

For example, the first condition may include at least one of four conditions: a temperature of the battery 110 is not higher than a first preset temperature threshold, power of the battery 110 is not higher than a first preset battery capacity threshold, a voltage of the battery 110 is not higher than a first preset voltage threshold, and an ambient temperature is not higher than a second preset temperature threshold. It should be noted that, for the first condition, refer to related descriptions in the foregoing embodiments. Details are not described herein.

S202: The processing circuit 152 enables circuit protection in response to detecting that the electronic device 100 meets the first condition.

For example, when the processing circuit 152 detects that the electronic device 100 meets the first condition, the processing circuit 152 may start the power supply circuit in any one of the foregoing embodiments to supply power to the electronic device 100, so that the electronic device 100 can work normally, to avoid abnormal working of the electronic device 100.

Figure 21A:
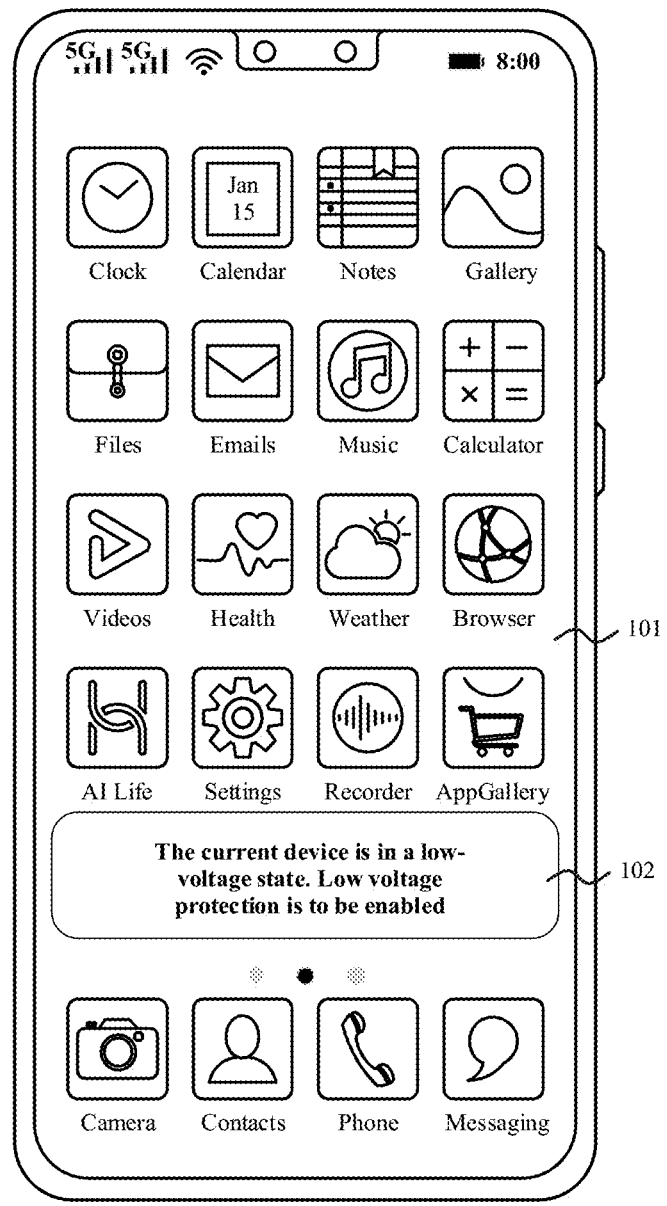
FIG. 21A to FIG. 21C show a group of graphical user interfaces according to an embodiment of this disclosure.
Figure 21B:
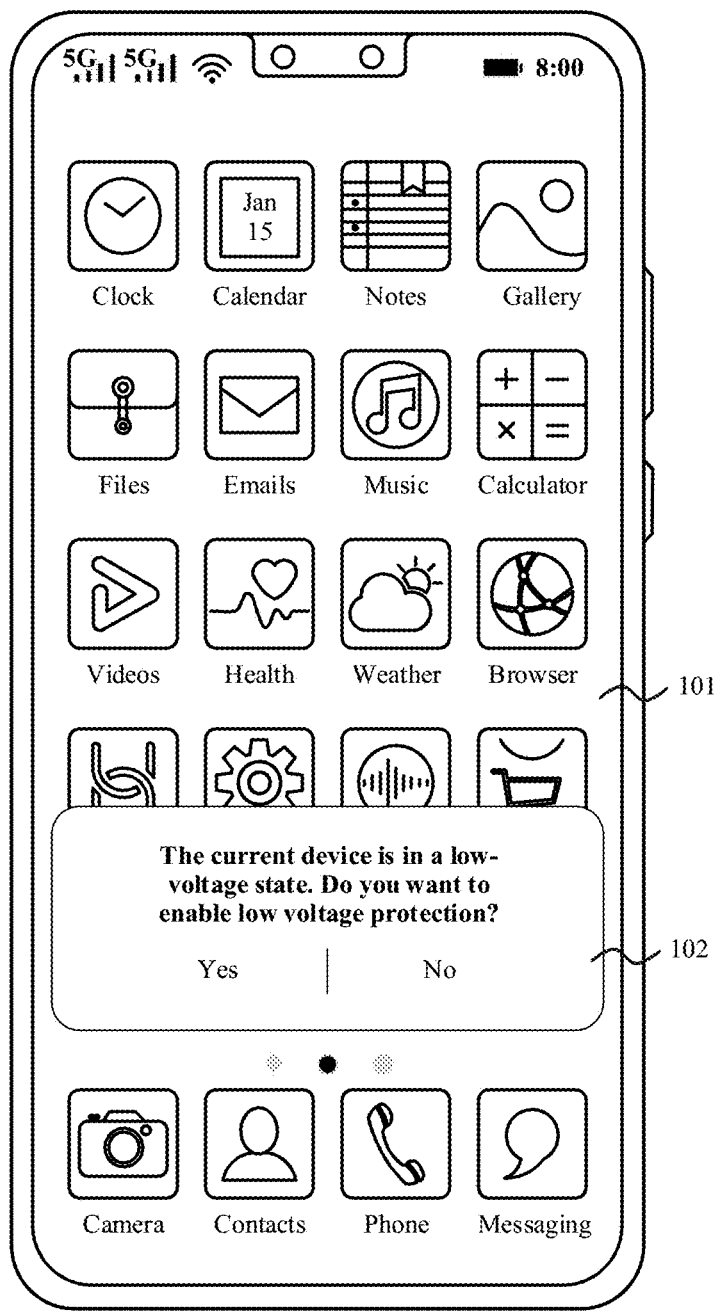
Figure 21C:
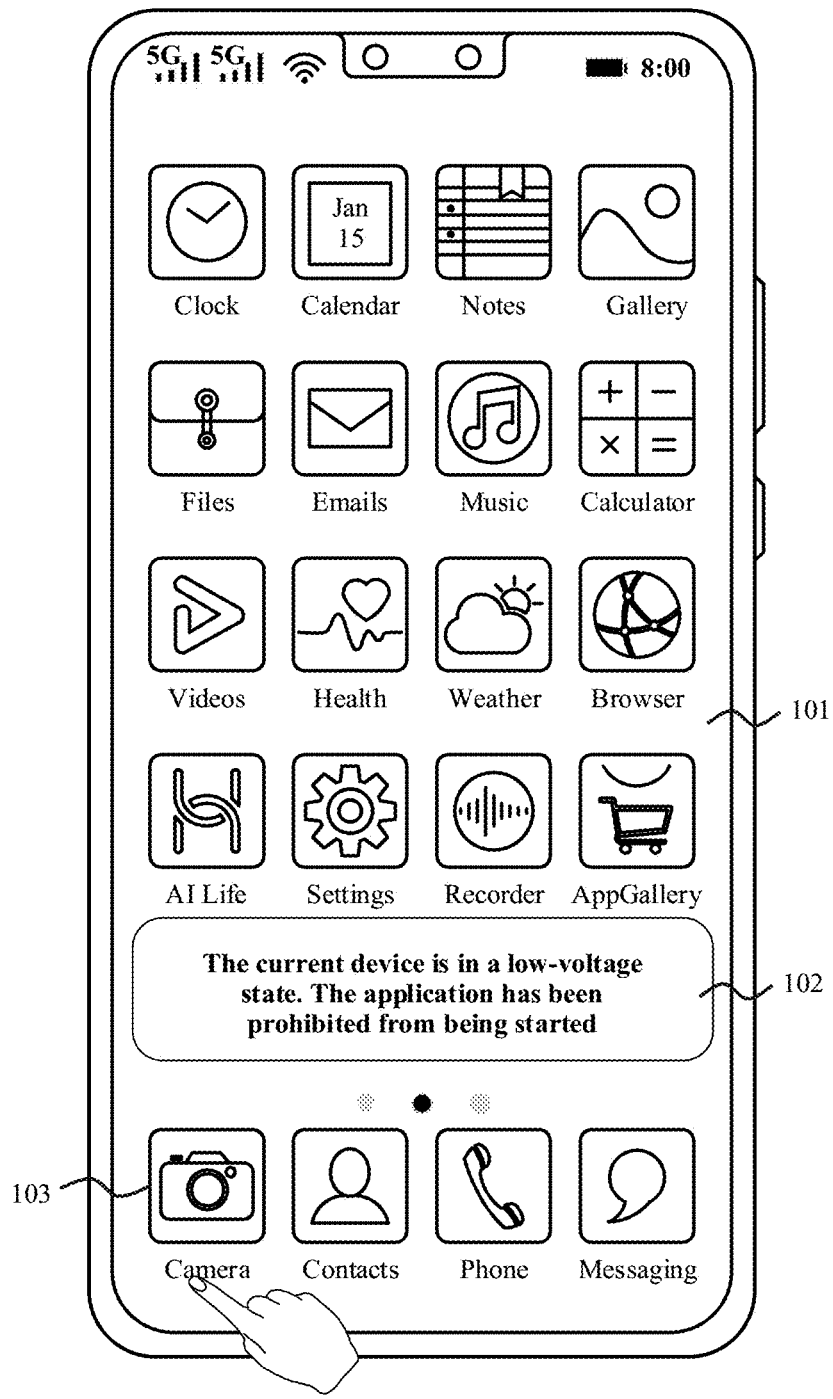

In this embodiment of this disclosure, FIG. 21A to FIG. 21C show a group of graphical user interfaces according to this embodiment of this disclosure. As shown in FIG. 21A, the electronic device 100 includes a display interface 101. When the processing circuit 152 detects that the electronic device 100 meets the first condition, the processing circuit 152 may start the power supply circuit in any one of the foregoing embodiments to supply power to the electronic device 100. Before the power supply circuit is started, the electronic device 100 may display a prompt box 102 on the display interface 101, where the prompt box 102 displays content indicating that "The current device is in a low-voltage state. Low voltage protection is to be enabled".

In some embodiments, as shown in FIG. 21B, the electronic device 100 includes a display interface 101. Before the power supply circuit is started, the electronic device 100 may display a prompt box 102 on the display interface 101, where the prompt box 102 displays content indicating that "The current device is in a low-voltage state. Do you want to enable low voltage protection?", and options of "yes" and "no" are displayed in the prompt box 102. When a user selects "yes", the foregoing voltage boost method is started; or when a user selects "no", the foregoing voltage boost method is not started.

In this embodiment of this disclosure, the electronic device 100 has a preset first list, where the first list includes one or more applications installed on the electronic device 100. When the processing circuit 152 detects that the electronic device 100 meets the first condition, the processing circuit 152 may start the power supply circuit in any one of the foregoing embodiments to supply power to the electronic device 100. In this case, the electronic device 100 may keep running a currently running application. When the user chooses to start a new application, the electronic device 100 determines whether the application is an application in the first list. If the application is an application in the first list, the application is allowed to be run; or if the application is not an application in the first list, the application is not started.

In some embodiments, the application in the first list may be any one or more of high-power-consumption applications such as Flash, Game, Video recording, Photo, and Speaker. It should be noted that this is not limited in embodiments of this disclosure.

In some embodiments, as shown in FIG. 21C, the electronic device 100 includes a display interface 101, and the interface 101 includes an icon 103 of a camera application. When the processing circuit 152 detects that the electronic device 100 meets the first condition, the processing circuit 152 may start the power supply circuit in any one of the foregoing embodiments to supply power to the electronic device 100. When the user selects an application (for example, a Camera application) that is not in the first list, the electronic device 100 does not run the application. Before the application is not run, the electronic device 100 may display a prompt box 102 on the display interface 101, where the prompt box 102 displays content indicating that "The current device is in a low-voltage state. The application has been prohibited from being started".

In this embodiment of this disclosure, when the processing circuit 152 enables circuit protection, the user may choose to exit the circuit protection. For example, the user may choose to exit the circuit protection by performing a touch operation (for example, a tap operation or a touch and hold operation), or the user may indicate, by using a voice, the electronic device 100 to exit the circuit protection.

An embodiment of this disclosure provides an electronic device. The electronic device includes one or more processing circuits and one or more memories. The one or more memories store one or more computer programs, and the one or more computer programs include instructions. When the instructions are run by the one or more processing circuits, the electronic device 100 is enabled to perform the technical solutions in the foregoing embodiments. An implementation principle and technical effect thereof are similar to those of the foregoing method-related embodiments. Details are not described herein again.

An embodiment of this disclosure further provides a computer program product including instructions. When the instructions are run on an electronic device 100, the electronic device 100 is enabled to perform the technical solutions in the foregoing embodiments. An implementation principle and technical effect thereof are similar to those of the foregoing method-related embodiments. Details are not described herein again.

It should be further noted that, in embodiments of the present disclosure, relational terms such as first, second, and third are only used to distinguish one entity or operation from another, and do not necessarily require or imply that any actual relationship or sequence exists between these entities or operations. Moreover, the terms "include", "contain", or any other variant thereof are intended to cover a non-exclusive inclusion, so that a method or device that includes a list of elements not only includes those elements but also includes other elements that are not expressly listed, or further includes elements inherent to such a method or device. An element preceded by "includes . . . " or "contains . . . " does not, without more constraints, preclude the presence of additional identical elements in the method or device that includes the elements.

A relationship between resistance values, a relationship between voltage values, and a high/low state of a logical level in the embodiments of the present disclosure are merely an implementation of embodiments of the present disclosure, and parameter values may be appropriately adjusted based on a circuit requirement.

The sequence numbers in the foregoing embodiments of the present disclosure are merely for illustrative purposes, and are not intended to indicate priorities of embodiments. A person of ordinary skill in the art may understand that all or some of the steps in the foregoing embodiments may be implemented by hardware, or a program instructing related hardware. The program may be stored in a computer-readable storage medium. The storage medium may be a read-only memory, a magnetic disk, an optical disc, or the like.

The foregoing descriptions are merely specific implementations of embodiments, but are not intended to limit the protection scope of embodiments. Any variation or replacement within the technical scope disclosed in embodiments shall fall within the protection scope of embodiments. Therefore, the protection scope of embodiments shall be subject to the protection scope of the claims.

What is claimed is:

1. A circuit, comprising:
   a first power supply path configured to be electrically connected in series between a battery of an electronic device and a first working circuit of the electronic device and comprising a first switch configured to provide a first voltage of the battery for the first working circuit;
   a second power supply path configured to be electrically connected in series between the battery and the first working circuit and comprising:
      a first boost circuit configured to:
         be electrically connected to the battery; and
         perform, based on the first voltage, boost conversion to obtain a second voltage; and
      a first unidirectional conductive switch configured to:
         be electrically connected in series between the first boost circuit and the first working circuit, wherein a conduction direction of the first unidirectional conductive switch is from the first boost circuit to the first working circuit; and
         provide, in response to the second power supply path being connected, the second voltage to the first working circuit;
   a third power supply path configured to be electrically connected in series between the battery and the first working circuit and comprising:
      the first boost circuit; and
      a second switch electrically connected in parallel to the first unidirectional conductive switch and configured to:
         provide the second voltage for the first working circuit; and
         enable the third power supply path to supply a first power to the first working circuit when the second switch is turned on; and
   a processing circuit configured to:
      control, in response to the electronic device meeting a first preset condition, the second power supply path to be connected when a second power is supplied to the first working circuit through the first power supply path and when the second power supply path and the third power supply path are disconnected;
      control, after the second power supply path is connected, the first switch to be turned off; and
      after the first switch is turned off:
         control the second switch to be turned on; and
         control the first unidirectional conductive switch to be turned off.

2. The circuit of claim 1, wherein the processing circuit is further configured to control the second voltage to not be higher than the first voltage.

3. The circuit of claim 1, wherein the processing circuit is further configured to control, in response to the second switch being turned on, the first boost circuit to reduce the second voltage.

4. The circuit of claim 1, further comprising:
   a first temperature sensor configured to:
      be disposed in the battery; and
      detect a first temperature;
   a second temperature sensor configured to detect a second temperature;
   a power detection circuit configured to detect a third power of the battery; and
   a voltage detection circuit configured to detect the first voltage,
   wherein the first preset condition comprises at least one of the following:
      the first temperature is not higher than a first preset temperature threshold;
      the third power is not higher than a first preset battery capacity threshold;
      the first voltage is not higher than a first preset voltage threshold; or
      the second temperature is not higher than a second preset temperature threshold.

5. The circuit of claim 1, wherein the processing circuit is further configured to control, in response to detecting that the electronic device meets a second preset condition, the second power supply path to be connected when the first power is supplied to the first working circuit through the third power supply path and the second switch, wherein in response to the second power supply path being connected, the second power supply path is further configured to provide, through the first unidirectional conductive switch and to the first working circuit, the second voltage, wherein the third power supply path is further configured to be disconnected after the second power supply path is connected, wherein the processing circuit is further configured to control, after the second power supply path is connected and in response to detecting that the electronic device meets the second preset condition, the first switch to be turned on, wherein the first power supply path is further configured to supply, in response to the first switch being turned on, to the first working circuit, and through the first switch, third power, and wherein the processing circuit is further configured to control, after the first switch is turned on, the second power supply path to be disconnected.

6. A method, comprising:
when a first power is supplied to a first working circuit of an electronic device through a first power supply path, when a second power supply path of the electronic device and a third power supply path of the electronic device are disconnected, and in response to the electronic device meeting a first preset condition:
connecting the second power supply path; and
supplying a second power to the first working circuit through the first power supply path and the second power supply path;
after the second power supply path is connected:
disconnecting the first power supply path; and
supplying a third power to the first working circuit through the second power supply path; and
after the first power supply path is disconnected:
connecting the third power supply path;
disconnecting the second power supply path; and
supplying a fourth power to the first working circuit through the third power supply path.

7. The method of claim 6, wherein when the first power is supplied to the first working circuit through the first power supply path, when the second power supply path and the third power supply path are disconnected, and in response to the electronic device meeting the first preset condition, the method further comprises:
connecting the second power supply path; and
supplying the second power to the first working circuit through the first power supply path and the second power supply path, and
wherein a first voltage provided by a first boost circuit in the second power supply path for the first working circuit through a first unidirectional conductive switch in the second power supply path is not higher than a second voltage provided by the first power supply path for the first working circuit.

8. The method of claim 6, further comprising:
detecting, by a first temperature sensor of the electronic device configured to be disposed in a battery, a first temperature;
detecting, by a second temperature sensor of the electronic device, a second temperature;
detecting, by a power detection circuit of the electronic device, a fifth power of the battery; and
detecting, by a voltage detection circuit of the electronic device, a first voltage of the battery,
wherein the first preset condition comprises at least one of the following:
the first temperature is not higher than a first preset temperature threshold;
the fifth power is not higher than a first preset battery capacity threshold;
the first voltage is not higher than a first preset voltage threshold; or
the second temperature is not higher than a second preset temperature threshold.

9. The method of claim 6, further comprising:
when the fourth power is supplied to the first working circuit through the third power supply path and in response to the electronic device meeting a second preset condition:
disconnecting the third power supply path;
connecting, after the third power supply path is disconnected, the second power supply path; and
supplying the third power to the first working circuit through the second power supply path;
after the second power supply path is connected:
connecting the first power supply path; and
supplying the second power to the first working circuit through the first power supply path and the second power supply path,
wherein a first voltage provided by the second power supply path for the first working circuit is not higher than a second voltage provided by the first power supply path for the first working circuit; and
after the first power supply path is connected:
disconnecting the second power supply path; and
supplying the first power to the first working circuit through the first power supply path.

10. The method of claim 9, further comprising:
detecting, by a first temperature sensor of the electronic device configured to be disposed in a battery, a first temperature;
detecting, by a second temperature sensor of the electronic device, a second temperature;
detecting, by a power detection circuit of the electronic device, a fifth power of the battery; and
detecting, by a voltage detection circuit of the electronic device, a third voltage of the battery,
wherein the second preset condition comprises at least one of the following:
the first temperature is higher than a third preset temperature threshold;
the fifth power is higher than a second preset battery capacity threshold;
the third voltage is higher than a second preset voltage threshold; or
the second temperature is higher than a fourth preset temperature threshold.

11. The method of claim 9, wherein connecting the first power supply path after the second power supply path comprises adjusting, after the second power supply path is connected and before the first power supply path is connected, an output voltage of a first boost circuit.

12. The method of claim 6, further comprising:
when the fourth power is supplied to the first working circuit through the third power supply path, and in response to an external power supply device being electrically connected to a power supply interface of the electronic device:
connecting the second power supply path;
disconnecting, after the second power supply path is connected, the third power supply path; and
supplying the third power to the first working circuit through the second power supply path; and
after the second power supply path is connected and the third power supply path is disconnected, supplying a fifth power to the first working circuit from the external power supply device, wherein a first voltage of the external power supply device for the first working circuit is not lower than a second voltage of the second power supply path for the first working circuit.

13. The method of claim 12, wherein after the second power supply path is connected, the method further comprises:
turning on a first switch that is electrically connected in series between a battery and the power supply interface of the electronic device; and
supplying the fifth power to the first working circuit through the external power supply device; and
charging the battery from the external power supply device.

14. The method of claim 6, further comprising:
when the fourth power is supplied to the first working circuit through the third power supply path, and in response to an external power supply device being electrically connected to the electronic device:
connecting the second power supply path;
disconnecting, after the second power supply path is connected, the third power supply path; and
supplying the third power to the first working circuit through the second power supply path;
when the third power is supplied to the first working circuit through the second power supply path:
connecting the first power supply path; and
supplying the second power to the first working circuit through the first power supply path and the second power supply path,
wherein a first voltage provided by the first power supply path for the first working circuit is not lower than a second voltage provided by the second power supply path for the first working circuit; and
after the first power supply path is connected:
turning on a first switch that is electrically connected in series between a battery and a power supply interface of the electronic device; and
supplying a fifth power to the first working circuit from the external power supply device that supplies power to charge the battery,
wherein a third voltage of the external power supply device for the first working circuit is not lower than the second voltage.

15. The method of claim 6, further comprising performing boost conversion by a first boost circuit to supply a fifth power to a second working circuit of the electronic device.

16. The method of claim 6, wherein when the electronic device meets the first preset condition, the method further comprises:
turning on a first unidirectional conductive switch in the second power supply path;
turning off a second switch in the third power supply path;
supplying the second power to the first working circuit through the first power supply path;
supplying the third power to the first working circuit through the first unidirectional conductive switch;
after the second power supply path is connected:
turning off a first switch in the first power supply path; and
supplying the third power to the first working circuit through the second power supply path; and
after disconnecting the first power supply path:
turning on the second switch; and
turning off the first unidirectional conductive switch to disconnect the second power supply path and supply the fourth power to the first working circuit through the third power supply path.

17. The method of claim 6, wherein when the first power is supplied to the first working circuit through the first power supply path and when the second power supply path and the third power supply path are disconnected, the method further comprises:
performing boost conversion by a first boost circuit to obtain a voltage to supply the first power to a second working circuit;
disconnecting the second power supply path; and
turning off a second switch in the third power supply path,
wherein when the electronic device meets the first preset condition, the method further comprises:
turning on a third switch in the third power supply path;
turning off the second switch;
supplying the first power to the first working circuit through the first power supply path; and
supplying the fourth power to the first working circuit through the third switch and a first unidirectional conductive switch in the third power supply path;
wherein after the second power supply path is connected, the method further comprises:
turning off a first switch in the first power supply path; and
supplying the third power to the first working circuit through the second power supply path, and
wherein after the first power supply path is disconnected, the method further comprises:
turning on the second switch to supply the fourth power to the first working circuit through the third power supply path; and
turning off the first unidirectional conductive switch to disconnect the second power supply path.

18. An electronic device, comprising:
a battery;
a first working circuit;
a first power supply path electrically connected in series between the battery and the first working circuit and comprising a first switch configured to provide a first voltage of the battery for the first working circuit;
a second power supply path electrically connected in series between the battery and the first working circuit and comprising:
a first boost circuit configured to:
be electrically connected to the battery; and
perform, based on the first voltage, boost conversion to obtain a second voltage; and
a first unidirectional conductive switch configured to:
be electrically connected in series between the first boost circuit and the first working circuit, wherein a conduction direction of the first unidirectional conductive switch is from the first boost circuit to the first working circuit; and
provide, in response to the second power supply path being connected, the second voltage to the first working circuit;
a third power supply path configured electrically connected in series between the battery and the first working circuit and comprising:
the first boost circuit; and
a second switch electrically connected in parallel to the first unidirectional conductive switch and configured to provide the second voltage to the first working circuit, wherein the third power supply path is configured to supply, in response to the second switch being turned on, first power to the first working circuit;

at least one memory configured to store instructions; and
at least one processing circuit coupled to the at least one memory and configured to execute the instructions to:
when second power is supplied to the first working circuit through the first power supply path, when the second power supply path and the third power supply path are disconnected, and in response to the electronic device meeting a first preset condition:
connecting the second power supply path; and
supplying third power to the first working circuit through the first power supply path and the second power supply path;
after the second power supply path is connected:
disconnecting the first power supply path; and
supplying fourth power to the first working circuit through the second power supply path; and
after the first power supply path is disconnected:
connecting the third power supply path;
disconnecting the second power supply path; and
supplying the first power to the first working circuit through the third power supply path.

19. The electronic device of claim 18, wherein the at least one processing circuit is further configured to control the second voltage to not be higher than the first voltage.

20. The electronic device of claim 18, wherein the at least one processing circuit is further configured to control, in response to the second switch being turned on, the first boost circuit to reduce the second voltage.

* * * * *